United States Patent
Sudo et al.

[11] Patent Number: 6,025,832
[45] Date of Patent: Feb. 15, 2000

[54] SIGNAL GENERATING APPARATUS, SIGNAL INPUTTING APPARATUS AND FORCE-ELECTRICITY TRANSDUCING APPARATUS

[75] Inventors: Hajime Sudo, Matsudo; Akihiro Koga, Kawasaki; Tamane Takahara, Tokyo-to; Kenji Shimano, Matsudo, all of Japan

[73] Assignee: Kabushiki Kaisha Toshiba, Kawasaki, Japan

[21] Appl. No.: 08/722,465

[22] Filed: Sep. 27, 1996

[30] Foreign Application Priority Data

Sep. 29, 1995 [JP] Japan .................................... 7-253301

[51] Int. Cl.[7] .................................................. G09G 5/08
[52] U.S. Cl. ............................................ 345/158; 345/157
[58] Field of Search ..................................... 345/156, 157, 345/158, 161, 163, 173, 179, 159

[56] References Cited

U.S. PATENT DOCUMENTS

| | | | |
|---|---|---|---|
| 4,534,376 | 8/1985 | Brown | 137/83 |
| 4,879,556 | 11/1989 | Duimel | 345/161 |
| 4,982,618 | 1/1991 | Culver | 345/161 |
| 5,349,370 | 9/1994 | Katayama et al. | 345/159 |
| 5,355,148 | 10/1994 | Anderson . | |
| 5,432,530 | 7/1995 | Arita et al. | 345/159 |
| 5,518,078 | 5/1996 | Tsujioka et al. | 178/18 |
| 5,555,894 | 9/1996 | Doyama et al. | 128/782 |
| 5,673,066 | 9/1997 | Toda et al. | 345/157 |
| 5,691,747 | 11/1997 | Amano | 345/158 |
| 5,717,610 | 2/1998 | Baba | 364/558 |

FOREIGN PATENT DOCUMENTS

| | | |
|---|---|---|
| 5-298018 | 11/1993 | Japan . |
| 7-319618 | 12/1995 | Japan . |

*Primary Examiner*—Richard A. Hjerpe
*Assistant Examiner*—Ronald Laneau
*Attorney, Agent, or Firm*—Oblon, Spivak, McClelland, Maier & Neustadt, P.C.

[57] ABSTRACT

A cursor can be operated continuously from a picture now being displayed to another picture not yet displayed. Further, an icon area arranged in another picture not yet displayed can be pointed out accurately without depending upon the operational characteristics of operators. When depressed by an operator, a pad-type input section (5) detects the two-dimensional position and the magnitude of the depression force at a pressure point. The detected data are applied to an encode section (14) through a signal amplifier (13). The encode section (14) detects the two-dimensional coordinates and the pressure value at the pressure point. On the other hand, a domain registering section (15) registers respective partitions on each of a plurality of pictures (8) as a domain group (11) of three-dimensional position domains. Therefore, when the output of the encode section (14) is compared by a comparing section (17) with respect to the positional data, if both match, the data detected by the pad-type input section (5) are assigned to a representative position (12) in a picture of the domain group (11), so that it is possible to accurately allow an input applied onto the pad-type input section (5) to correspond to a two-dimensional area of each of a plurality of pictures (8).

20 Claims, 39 Drawing Sheets

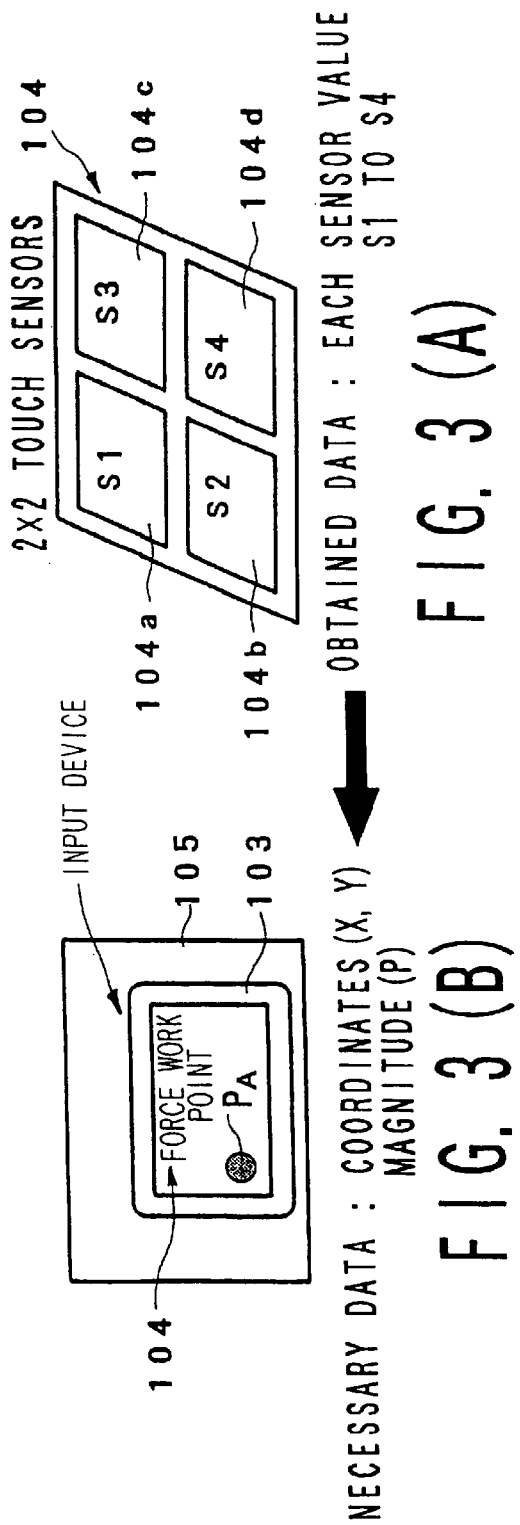
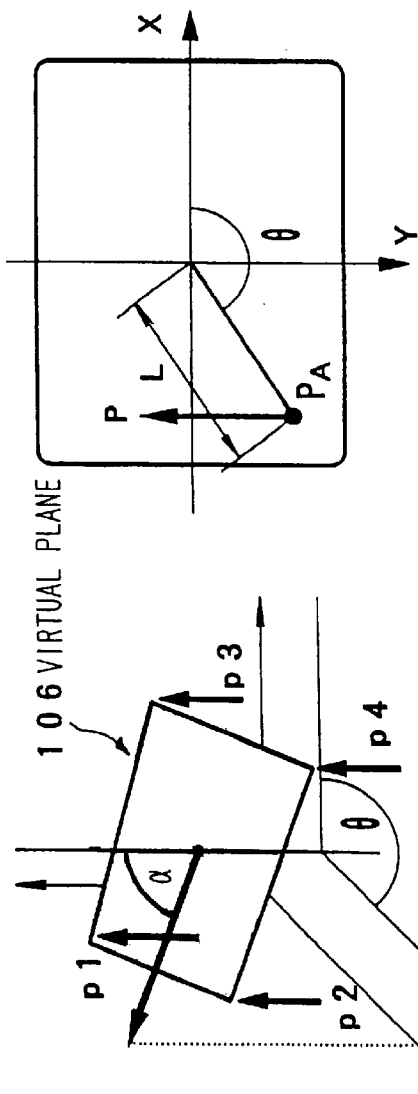
FIG. 3 (A), FIG. 3 (B), FIG. 3 (C), FIG. 3 (D)

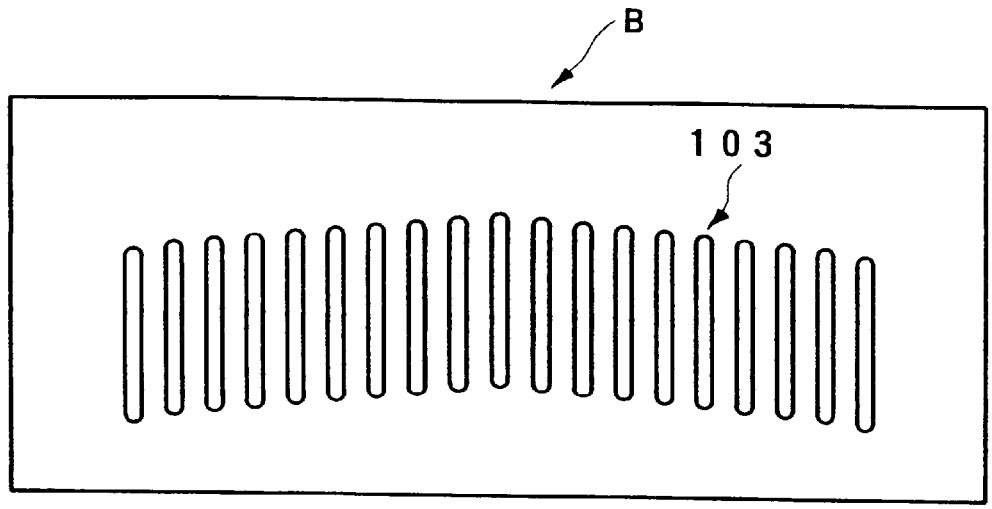
F I G. 5 (A)
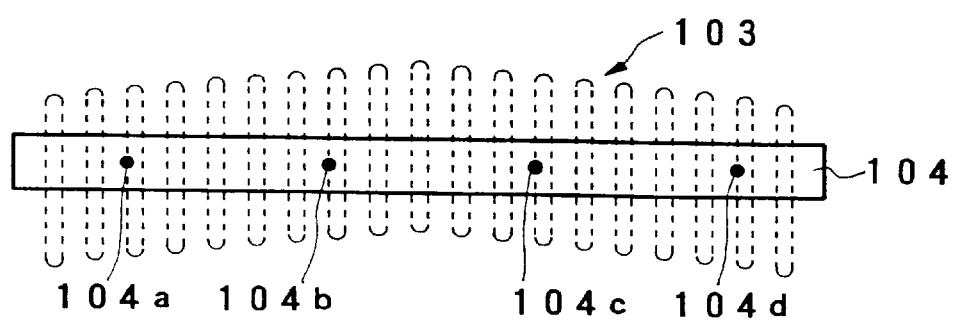
F I G. 5 (B)
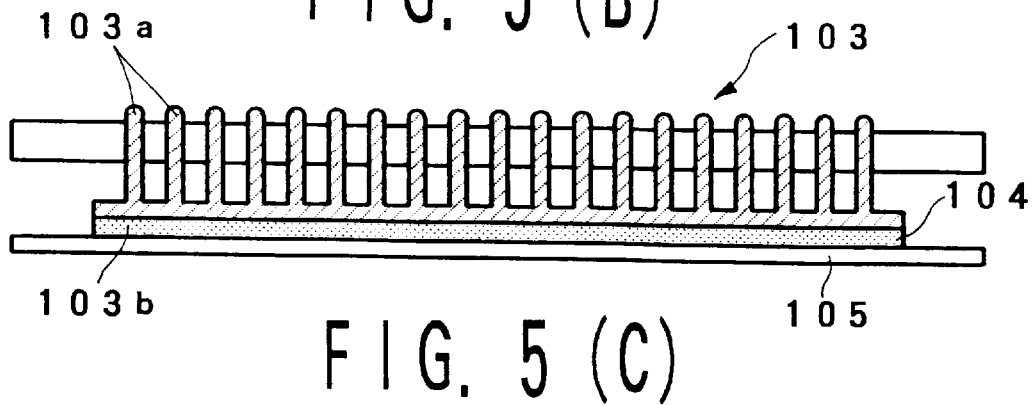
F I G. 5 (C)

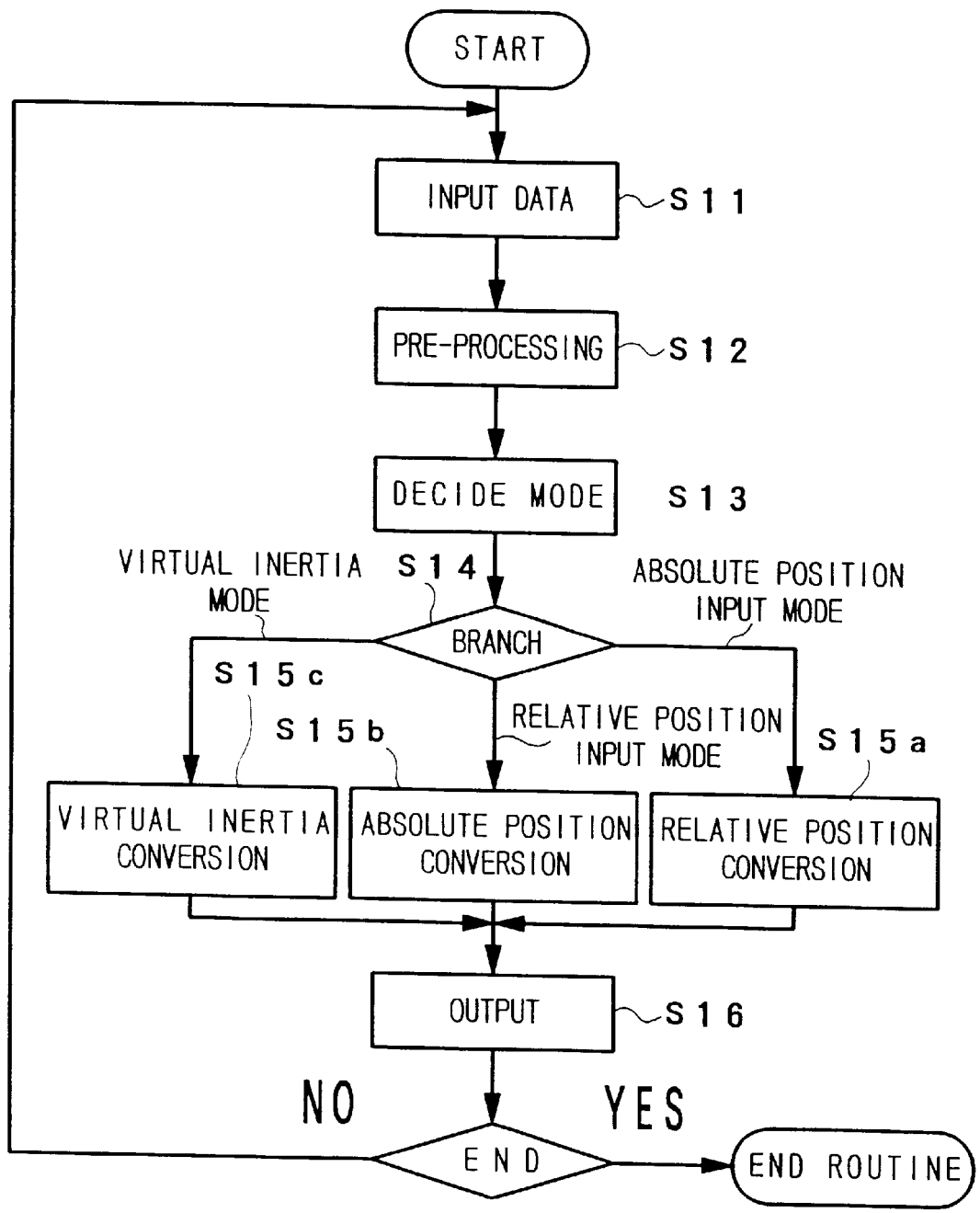
F I G. 11

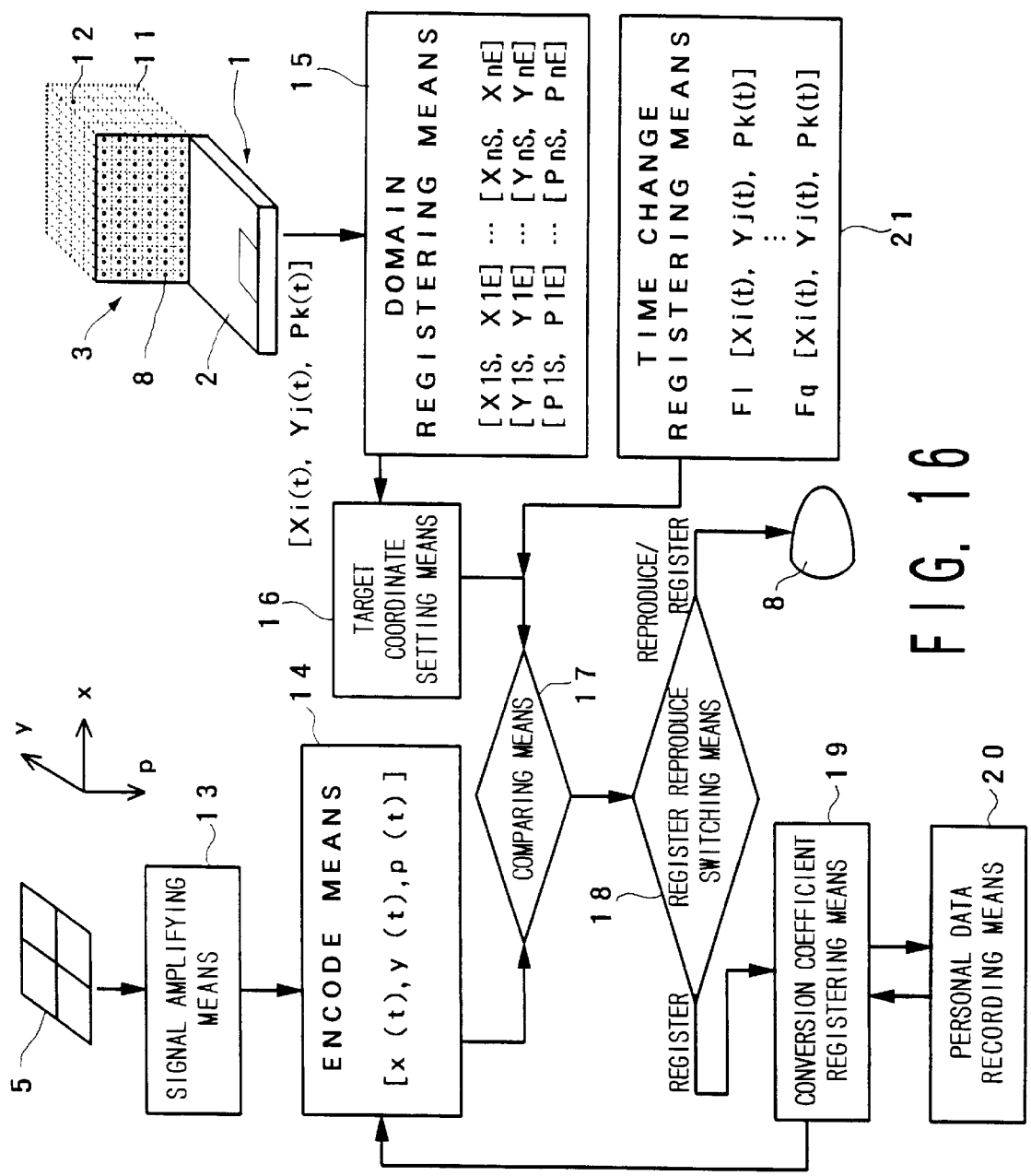
F I G. 16

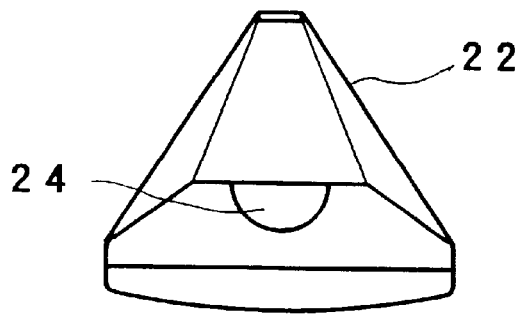
F I G. 17 (A)
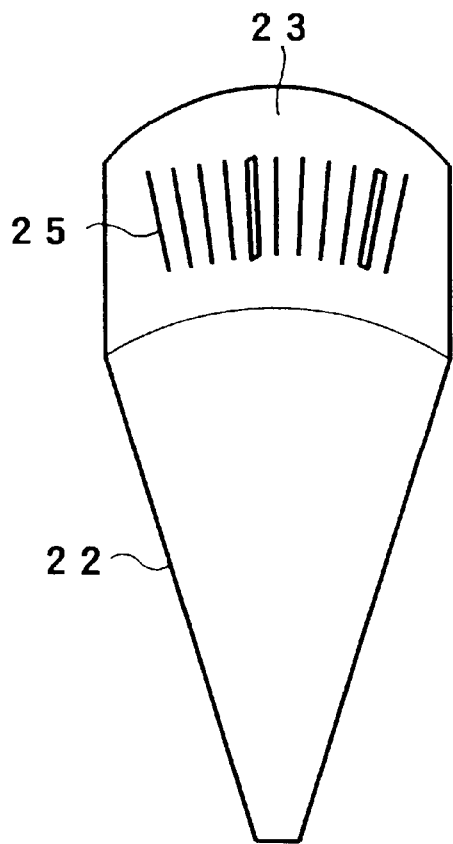
F I G. 17 (B)
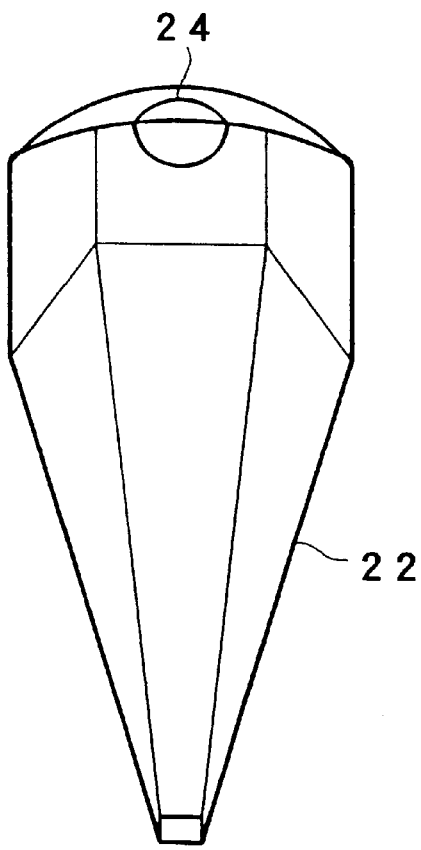
F I G. 17 (C)

FIG. 18

SIGNAL GENERATING APPARATUS, SIGNAL INPUTTING APPARATUS AND FORCE-ELECTRICITY TRANSDUCING APPARATUS

BACKGROUND OF THE INVENTION

1. Field of the Invention

The present invention relates to an apparatus to generate control signals according to the movement of human finger end or palm of finger. Further, the present invention relates to a signal inputting apparatus, and more specifically to a pointing device structure for coding control mode from applied force by a human finger to input signals to a personal computer so that an pointer or cursor corresponding thereto can be directed the position on a display unit. Further, the present invention relates to a force-electricity transducing apparatus.

2. Description of the Prior Art

In usual, when electronic home appliances such as television sets, air conditioners, etc. and information processing apparatus such as personal computers are commanded, a remote controller or a keyboard both provided with a plurality of buttons or keys is widely used. Recently, however, a pointing device for moving a cursor on a display picture has been widely used subsidiarily together with the above-mentioned signal inputting device.

In the signal generating apparatus such as the remote controller or the pointing device, in general, a conductive rubber element (as a force-electricity transducing element) is arranged under each of the base portions of a plurality of buttons arranged being spatially separated from each other. Therefore, when a compression force is applied to each conductive rubber element through each button, a predetermined electric signal can be generated to generate a predetermined command.

In addition, when the button is depressed plural times simultaneously, it is possible to generate another predetermined command. In this case, after the compression force detected by the conductive rubber element has been once converted into an electric signal, separately, these electric signals are superposed upon each other to generate a new signal. In other words, when the signal transducing apparatus is handled, two commands can be generated; that is, one command can be generated by the movement of a single finger, and the other command can be generated by the movement of a plurality of fingers.

Further, as a modification of the signal transducing apparatus, there exists such a method that when the same button is depressed plural times intermittently, the number of compression times is measured to assign the measured compression times to commands, respectively.

For the feature, although there exists such a tendency that functions of the home appliances and the information processing apparatus increase more and more, there exists a limit of the number of the buttons arranged on the surface of the signal transducing apparatus. Therefore, a complicated operation such that a plurality of buttons are depressed at the same time or the same button is depressed plural times will be required, as described above.

In the prior art signal transducing apparatus, however, there exist the following problems:

In the case of the prior art remote controller or a pointing device, a single force-electricity transducing element is assigned to each button. Therefore, in the case where a plurality of buttons are arranged on one force-electricity transducing element, a signal obtained when a plurality of buttons are depressed continuously by the user's finger is indicated as a resultant force from the spatial standpoint, it has been so far impossible to distinguish the mutual positional relationship among the buttons.

Further, in the method of depressing the same button plural times intermittently, since the force-electricity transducing element can detect only a resultant force of the compression forces as described above, the effect is the same as with the case where only a single button is prepared.

Further, there exists a pointing device which is provided with such a function as to detect the user's arm or finger movement, convert the detected movement into an electric signal, and input the converted signal to the apparatus. However, the above-mentioned pointing device has been mainly used as a device (referred to as a mouse or track ball) for a computer or a device (referred to as a joy stick) for a game apparatus.

On the other hand, recently, with the spread of portable personal computers, such a signal inputting apparatus that an operator's finger movement is directly detected and the detected movement is inputted to the personal computer has been widely used in order to improve the operability of the personal computer. In this apparatus, in general, a conductive rubber element and the other force-electricity transducing element are arranged on a plane, and a compression force of the human finger moved thereon is converted into an electric signal. Therefore, the operator can perform the subsidiary operation by use of such a pointing device in parallel to the main keyboard operation.

In general, in the pointing device as described above, the change of the operator's finger end with respect to time is detected to execute an operation on the picture now being displayed. For instance, in the case of the pointing device using a flat conductive rubber element, when an object to be operated is a cursor displayed on a picture, the movement direction and the movement speed of the cursor can be controlled according to the movement direction and the movement speed of the finger on the pointing device.

In this case, the input operation is executed, irrespective of the compression force applied by the operator's finger end onto the pointing device.

On the other hand, as a pointing device used for the game, there are rod-shaped heads. In this case, a pressure sensitive element having a gauge for detecting distortion is often disposed at the base portion thereof. In this pointing device, the movement direction and the movement speed of the cursor are decided according to the direction and the magnitude of the depression force applied by the operator to the rod.

In the above-mentioned prior art pointing devices, no problem arises when the cursor is only moved on the picture now being displayed. However, in the case where the cursor is moved to an icon displayed at a predetermined position on a picture to select the icon by a single click or a double click and the cursor is further moved for another operation, as with the case of a mouse, some operation corresponding to click is additionally required.

In the case of the pointing device using the conductive rubber element, the click operation can be realized by depressing the same position at a short time interval by the finger end without moving the finger, that is, by depressing the pointing device quickly. On the other hand, in the case of the rod-shaped head, an additional switch is provided to input a signal corresponding to a click. This is the same as with the case of the prior art track ball type pointing device, so that an additional click switch is indispensable.

As described above, in the prior art pointing device, as far as the cursor is moved mainly on the picture now being displayed. The pointing device can be used as it is without causing any problem. However, when the current picture is switched to another picture and further the succeeding operation is required, it is necessary to provide an additional operation or additional operating means for the pointing device. In other words, when two continuous operations are linked with each other, an operation for moving the preceding operation to the succeeding operation is indispensable. This is the same when two icons each for deciding one operation are displayed on two different pictures, respectively. In this case, an additional operation for displaying the succeeding picture now being not displayed is necessary.

Further, when the two ions displayed on the two continuous pictures, respectively are arranged at two different positions on the pictures, the cursor is first stopped at a first position on the first picture; and after the picture has been switched to the succeeding picture, the cursor must be moved to the icon position on the new picture. In other words, whenever the cursor is moved on the two pictures, it is unavoidable to move the cursor plural times intermittently. For instance, even if the icon position of the succeeding picture can be predicted, the cursor position must be moved again for accurate cursor locating operation, so that it is impossible to omit the succeeding cursor operation. On the other hand, when the picture is returned to the original picture, the cursor operation is quite the same as above; that is, it is impossible to perform the two cursor operations for two different pictures continuously or reversibly.

Further, even if a pointing device of predictable operation would be considered, it may be impossible to accurately point out an icon position of the succeeding picture now not yet displayed. In addition, when the pointing device is operated by the operator, since there exists an operator's peculiarity in depression force characteristics, even if the optimum characteristics are set to a specific operator, there exists a problem in that the set characteristics are not appropriate to the other operators. In summary, it has been so far extremely difficult to predict an icon position accurately on the succeeding picture now not yet displayed.

The causes of the above-mentioned problems may be partially attributable to the problem of hierarchical structure of software. On the other hand, however, the cause of the hierarchical software structure is related to the problem on the characteristics of the force-electricity converting element. For instance, in the case of the conductive rubber element, a low resolving power of the depression force remains as the basic problem. On the other hand, in the case of the pressure sensitive element, since positions cannot be designated on a plane on the principle and further since the direction and the magnitude of depression force are converted into two dimensional data, there exists a problem in that the pressure sensitive element cannot be used to designate an absolute position on a plane.

In other words, in the prior art pointing devices, only two-dimensional data can be obtained as the reproducible data, and further there exists such a problem in that it is impossible to execute the simultaneous operation on both the present picture now being displayed and the succeeding picture now not yet displayed.

FIG. 24 is a perspective view showing a first prior art signal inputting apparatus. In the drawing, a notebook-type personal computer 1 is composed of an operation section 2 and a display section 3. In the operation section 2, a keyboard 4 and a pad-type input section 5 (as a pointing device) are arranged. Further, on the display section 3, a picture 8 is displayed. On the picture of the display section 3, a plurality of icons 61 to 68 are displayed, and one of these ions can be selected by a pointer 7 displayed on the same picture 8.

Further, the pad-type inputting section 5 using a conductive rubber element can move the pointer 7 on the picture 8 according to the movement of the operator's finger. Here, the operation obtained when the finger end is moved in an arrow direction B on the pad-type input section 5 to move the pointer 7 to the icon 64 on the picture 8 will be described hereinbelow.

Although the basic unit of the movement speed of the pointer 7 on the picture 8 is decided by a predetermined coefficient, the practical movement speed thereof is determined by the frequency of the finger movements on the upper surface of the pad-type input section 5. In practice, however, since the size of the pad-type input section is fairly smaller than that of the picture 8, even when the finger end moves along the arrow B1 on the pad-type input section 5, the pointer 7 moves only a short distance as shown by an arrow A1 in FIG. 24. Therefore, it is necessary for the operator to move his finger end plural times on the pad-type input section 5 to move the pointer 7 on the picture 8 in the order of an arrow A2, an arrow A3, and an arrow A4 at a target icon position 64 in sequence. In other words, the operator must depress the pad-type input section 5 plural times for each movement of the pointer 7. Further, in practice, since the pointer 7 is moved in dependence upon the sense of the operator, it is difficult to move the pointer 7 straight to the target position on the picture 8. Therefore, the finger end must be moved in various directions to the target icon 6 along various paths.

FIG. 25 is a perspective view showing a second prior art signal input apparatus. In this signal input apparatus, pressure sensitive elements are arranged into a matrix form under a pad of the pad-type input section 5 in such a way that the depression position on the pad may correspond to the position of the pointer 7 on the picture 8.

The pad-type input section 5 calculates the finger depression position on the basis of the detection values of a plurality of the pressure sensitive elements arranged into matrix form, and allows the finger position on the pad-type input section 5 to correspond to the pointer (7) position on the picture B.

As a result, when the pointer 7 is required to be moved to the icon 64, the finger end is placed at a position Cl and then depresses the pad-type input section 5, as shown in FIG. 25. In this case, the pointer 7 can be moved to the icon 64 directly as shown by the arrow A5 in FIG. 25.

In practice, however, as shown in FIG. 26, a plurality of hierarchical hidden pictures 81, 82 and 83 are prepared in addition to the picture 8 now being displayed. Further, a plurality of pictures are overlapped with each other as a single picture according to circumstances. In any case, the hierarchical pictures 81, 82 and 83 are all hidden behind the actual picture 8.

In the case where the icon operation on the picture 8 is the main work and thereby the three pictures 81, 82 and 83 are changed over in sequence for a series of operations, in general since a command for changing the picture 8 is inputted to select a desired picture and then the pad-type input section 5 is depressed on the basis of an icon displayed on the newly displayed picture, a serious problem will not occur. However, when the operator has been skilled in a series of operations, the troublesome picture change-over work may reduce the work efficiency, so that it may be considered that the higher efficiency can be expected when the hidden picture is changed over by pointing out the icon 6 directly on the hidden picture. Further, as with the case shown in FIG. 26, where the icon (6) position on the picture 8 is almost the same as the icon (6) position on the hidden pictures 81, 82 and 83, a special training or skill is not needed to predict the icon position on the hidden picture.

In this case, it may be considered that the work efficiency can be improved, when the picture is changed over by directly pointing out any one of the icons 6 on the hidden pictures 81, 82 and 83 from the picture 8, while adjusting the finger end depression force applied onto the pad-type input section 5, as compared with when another special work is intervened.

In this case, however, since the pad-type input section 5 is operated by a human being in practice, even if the position C2 can be specified, it may be difficult to point out any one of a plurality of pictures 81, 82 and 83 on the basis of difference in the finger end depression force decided for each corresponding picture. In this case, however, when the detection resolving power and the reproducibility of the pressure sensitive elements of the pad-type input section 5 are sufficiently high, it is practically possible to designate any one of the hidden pictures from the technical standpoint.

However, even if the depression force can be controlled and thereby any one of the pictures 81, 82 and 83 can be selected, the direction of the applied depression force is a serious problem. For instance, as shown in FIG. 27, when a depression force is applied at the same position C2 on the pad-type input section 5, if the depression direction differs for each depression operation as shown by arrows D1, D2 and D3, since the designated position of the pointer 7 differs on each picture, the pointer position 7 on the picture differs as follows: a pointer is located at a position 71 in the picture 81, a pointer is located at a position 72 in the picture 82, and a pointer is located at a position 73 in the picture 83, respectively. As a result, it is at all impossible to change over the pictures continuously, while locating the pointer 7 on the picture. Much more, the work becomes difficult when the operator changes.

As described above, in the prior art signal inputting apparatus, it has been impossible to assign a relatively large number of commands to a plurality of buttons. In addition, although data limited in two-dimensional directions can be inputted at some accuracy, when data are inputted while changing over two or more pictures, since the operation is subjected to the influence of the operational characteristics (e.g., depression force) of the operator, there exists a problem in that the accurate operation has been so far impossible.

SUMMARY OF THE INVENTION

With these problems in mind, therefore, it is the object of the present invention to provide a signal converting apparatus which can assign a relatively large number of commands to a plurality of buttons and which can input signals on the basis of the operator's sense.

Further, the other object of the present invention is to provide the signal inputting apparatus which can operate a cursor continuously on both the picture now being displayed and the other pictures not yet displayed and further which can designate the icon area displayed on the picture not yet displayed accurately without depending upon the operational characteristics of the operator.

To achieve the above-mentioned object, the present invention provides a signal converting apparatus, having a pressure receive portion for receiving pressure, and a force-electricity converting section connected to the pressure receive portion to convert pressure received by the pressure receive portion into an electric signal corresponding thereto, wherein: the force-electricity converting section is provided with at least four unit elements all fixed to a member rigid enough against pressure received by the pressure receive portion.

Here, it is preferable that the unit elements of the force-electricity converting section are arranged in a matrix form. Further, it is also preferable that the pressure receive portion is formed with a plurality of projections.

Further, the present invention provides a signal converting apparatus, comprising: a pressure receive portion for receiving pressure; a force-electricity converting section composed of at least four unit elements and connected to said pressure receive portion, for converting pressure received by said pressure receive portion into electric signals corresponding thereto; a base fixed to said force-electricity converting section and so formed as to be rigid enough against pressure applied to a plurality of said unit elements via said pressure receive portion; and a calculating section for allowing pressure data received by said pressure receive portion to correspond to a specific operation command on the basis of output signals of said force-electricity converting section.

Here, it is preferable that said calculating section processes the electric signals converted by the unit elements of said force-electricity converting section by adding vectors of these electric signals.

Further, the present invention provides a signal inputting apparatus, comprising: input detecting means for detecting two dimensional coordinates of a pressure point of an inputted depression force, and pressure coordinates on the basis of the inputted depression force; and coordinate detecting means for detecting a positional domain within a three-dimensional domains on the basis of the detected two dimensional coordinates and the detected pressure coordinates, and for assigning a representative point to each detected positional domain.

Here, it is preferable that said coordinate detecting means includes domain registering means for registering three-dimensional domains composed of a plurality of pictures corresponding to the pressure coordinates and partitioned pictures corresponding to the two-dimensional coordinates, and representative points each corresponding thereto.

Further, it is preferable that said input detecting means includes registering means for registering conversion coefficients used to convert the depression force to the two-dimensional coordinates and the pressure coordinates, respectively.

Further, it is preferable that said input detecting means and said coordinate detecting means both include data varying with the lapse of time as parameters, respectively.

Further, it is preferable that in said input detecting means, a group composed of a plurality of pressure detecting elements are arranged at each of a plurality of positions; the pressure coordinates are detected on the basis of angular data at the detection positions obtained by the pressure detecting elements; and a compression force is detected on the basis of all the outputs of said pressure detecting elements.

Further, the present invention provides a signal inputting apparatus having a pressure receive portion for receiving an inputted compression pressure, a force-electricity transducing section for transducing pressure data sensed by the pressure receive portion into an electric signal, and a display unit for displaying a picture corresponding to the electric signal converted by the force-electricity transducing section, which comprises: encoding means provided between the force-electricity transducing section and the display unit, for designating two-dimensional codes related to a display position on a picture displayed on the display unit and any operation codes other than the two-dimensional codes at the same time, on the basis of the pressure data converted into the electric signal; and means for allowing a plurality of codes generated by said encoding means to correspond to spatial picture domains, respectively, the spatial picture domains being composed of present picture domains obtained by dividing a picture now being displayed on the display unit and hidden picture domains obtained by dividing each picture now not yet displayed on the display unit but displayed by an input operation.

Here, it is preferable that the apparatus further comprises compression given force data storing means for storing time-series change of the inputted compression force, said encoding means forming a time-series compression pattern on the basis of contents stored in said compression data storing means.

Further, it is preferable that the apparatus further comprises a registering and reproducing section for registering and reproducing the contents of the encoding means, or a section for connecting said encoding means to a registering and reproducing apparatus.

Further, it is preferable that at least two sets of the force-electricity converting sections are mounted on the pressure receive portion in such a way that the pressure receive portion is supported by each set of the force-electricity converting sections in cantilever fashion, two axial lines of the two sets of the force-electricity converting sections substantially intersecting each other in a cantilever area on a plane including the pressure receive portion.

Further, the present invention provides a force-electricity converting apparatus having a flat plate to which a depression force is applied as an input data, and a plurality of pressure-sensitive sensors coupled with the flat plate, wherein a plurality of pairs of the pressure-sensitive sensors are arranged at two different angular positions away from a central point of the flat plate.

Further, the present invention provides a signal inputting apparatus, comprising: a depressed portion having an area to which a force is applied as an input; a force-electric signal detecting section for detecting a force applied to said depressed portion and converting the detected force into an electric signal; a data outputting section for outputting data indicative of at least a magnitude and a position of the force applied to said depressed portion on the basis of the electric signal outputted by said force-electricity signal detecting section; and an arithmetic section for deciding characteristics of the inputted force on the basis of the data outputted by said data outputting section, and for executing various calculations to set switching operations and to display the decided result and a designated position on a picture on the basis of the decided characteristic result, said arithmetic section comprising: a repetitive arithmetic control section for controlling predetermined calculating processing repeatedly for each elapse of predetermined time; a cumulative calculating section for calculating a cumulative addition of the magnitudes and the positions of the inputted depression forces, respectively and outputting the calculated results; a subtraction calculating section for subtracting a value from the calculated result of said cumulative calculating section and outputting the calculated result; a dividing section for dividing the output of the subtracting calculating section by a predetermined value and outputting the divided result; and an addition section for adding the output of said dividing section to a present designated position, and outputting the added result as an updated designated position, said cumulative calculating section, said subtracting calculating section, said dividing section and said adding section being all controlled with respect to time by said repetitive arithmetic control section.

Here, it is preferable that in of said cumulative calculating section, said subtracting calculating section, said dividing section and said adding section, data are calculated being divided into x-axis direction components and y-axis direction components, respectively.

Further, it is also preferable that said arithmetic section comprises a mode deciding section for deciding an input mode as a mode A when change in the depression position is large, the magnitude of the depression force is small; and change in magnitude of the depression force is small; as a mode B when change in the depression position is small, the magnitude of the depression force is large; and change in magnitude of the depression force is small; and as a mode C when change in the depression position is large, the magnitude of the depression force is large or small; and change in magnitude of the depression force is large; and a designated position calculating section for deciding a designated position in such a way that the depression force and the depression position correspond to a moving speed of the designated portion when said mode deciding section decides the input mode as the mode A; a designated position in such a way that the depression position correspond to a position of the designated portion when said mode deciding section decides the input mode as the mode B; and for deciding a designated position in such a way that the depression force and the depression position correspond to an acceleration of the designated portion when said mode deciding section decides the input mode as the mode C.

Further, it is preferable that said mode deciding section comprises: a depression position change rate calculating section for calculating a change rate of the depression position; a depression force change rate calculating section for calculating a change rate of the depression force; a first deciding section for deciding whether the calculated depression position change rate is smaller or larger than a predetermined value; and a second deciding section for deciding whether the calculated depression force change rate is smaller or larger than a predetermined value.

Further, it is also preferable that said arithmetic section comprises: a low-frequency passing filter for passing only low-frequency signal components of data indicative of at least one of both the magnitude and position of the depression force.

Here, it is preferable that said low-frequency passing filter passes the low-frequency components of the data signals by adding by a predetermined number of sampled signals and by dividing the added value by a predetermined constant.

Further, it is also preferable that said arithmetic section comprises a constant setting section for setting various constants used for the calculations, optimum constants being decided automatically by said arithmetic section on the basis of the characteristics of the inputted depression force.

Here, it is preferable that said constant setting section obtains data required for decision from the characteristics of a plurality of inputted depression forces.

Further, it is preferable that when a maximum continuous depression time is set to decide a click operation, said constant setting section sets a value longer than the maximum continuous depression time of a plurality of data related to the maximum continuous depression time obtained during click by a plurality of inputted depression forces, as the maximum continuous depression time for deciding the click operation.

Further, it is preferable that when a maximum non-input time between two depressions is set to decide a double click operation, said constant setting section sets a value longer than the maximum value of a plurality of data related to the maximum non-input time between two depressions obtained during double click by a plurality of inputted data, as the maximum non-input time between two depressions for deciding the double click operation.

Further, it is preferable that said constant setting section is provided with such a function of executing a trial operation by use of a constant set as a candidate value on the basis of the characteristics of the inputted depression forces, and further confirming whether the candidate value can be set as a proper constant value before set.

Further, the present invention provides a signal inputting apparatus for a personal computer such that a cursor on a picture can be shifted by applying a tracing force onto a pointing device, wherein the cursor can be shifted on the picture by a distance at an acceleration determined on the basis of a depression force applied onto the pointing device, a shift direction of the depression force on the pointing device, a depression time, a virtual inertia of a previously set cursor mass, and a virtual friction generated by the cursor movement on the previously set picture.

Further, the present invention provides a signal inputting apparatus of a remote controller for a personal computer such that a cursor on a picture displayed on a separated display unit can be shifted by applying a tracing force onto a pointing device, wherein the cursor can be shifted on the picture by a distance at an acceleration determined on the basis of a compression force applied onto the pointing device, a shift direction of the compression force on the pointing device, a compression time, a virtual inertia of a previously set cursor mass, and a virtual friction generated by the cursor movement on the previously set picture.

Here, it is preferable that the acceleration can be determined by an expression as: (compression force virtual-friction)/virtual inertial, and that the distance can be determined by an expression as: cursor acceleration×compression time×compression time.

In the signal transducing apparatus according to the present invention, since each of the four unit elements can detect each magnitude of pressure and since the four signals indicative of four pressure data are processed on a virtual plane, it is possible to detect the position and the direction of the applied pressure (a position and a direction where the force is applied).

Here, when the pressure data obtained by these four unit elements are processed on the virtual plane, in case the mutual positional relationship between these four unit elements changes, the pressure direction, in particular cannot be detected. Therefore, in the present invention, the force-electricity transducing elements are fixed to a member rigid enough against the applied pressure, so that the detection precision of the pressure force can be detected securely.

Further, in the present invention, since the magnitude and the direction of the pressure can be assigned to only a single button (single element), it is possible to set a relatively large number of commands to a single element. Further, when the shape of the button (element) is considered from the human engineering standpoint, it is possible to operate an apparatus to be operated sensitively by single-hand (finger) touch.

Further, in the present invention, as the force-electricity transducing element, high pressure-sensitive elements of high resolution are arranged in a matrix form. Further, operation codes of a single compression are formed on the basis of the three-dimensional data (two-dimensional force distribution data and one-dimensional force magnitude data detected by each element), so that it is possible to allow the operation codes formed by the encoding means to correspond to the cursor position on one of a plurality of pictures (including both a picture now being displayed and hierarchical hidden pictures now not yet displayed).

In other words, when each of all the pictures including hidden pictures (now not yet displayed) is divided into a plurality of areas, it is possible to move the cursor quickly to any desired position on the hidden picture by shifting the cursor from an area of the picture now being displayed to another area on the same picture.

Further, when the time-related data of the compression force are processed by the encoding means in addition to the three-dimensional operation codes obtained by the pointing device, it is possible to generate another operation command directly, when the cursor is being located at a position on the picture now being displayed or the pictures not yet displayed.

Here, since the above-mentioned operation depends upon the compression force of each operator, the optimum manipulability differs according to each operator. Further, when the cursor is moved automatically to a desired position of the divided areas of the picture, the cursor position differs according to the work contents. Therefore, the movement characteristics of the cursor are stored and then read, thus realizing more excellent manipulability.

BRIEF DESCRIPTION OF THE DRAWINGS

FIGS. 3(A), 3(B), 3(C) and 3(D) are an illustration showing an example of the force-electricity transducing element, an illustration for explaining the operation thereof, a coordinate diagram showing a pressure application position, and a view showing a virtual plane 106 respectively, all for assistance in explaining the procedure of detecting pressure data by the force-electricity transducing element;

FIGS. 5(A), 5(B) and 5(C) are a top view, plane view, and cross-section view, respectively each showing a second embodiment of the signal transducing apparatus according to the present invention;

FIG. 11 is a flowchart showing the other main control operation executed by the central arithmetic section;

FIG. 16 is a system diagram for realizing the embodiments of the signal inputting apparatus according to the present invention;

FIGS. 17(A), 17(B) and 17(C) are a side view, a top view, and a back view, respectively each showing the signal inputting apparatus according to the present invention, which can be handled by a single hand;

FIG. 18 is an illustration showing the functions of the signal inputting apparatus shown in FIGS. 17(A) to 17(C), in which numerical values are inputted as the practical data;

DETAILED DESCRIPTION OF THE PREFERRED EMBODIMENTS

Figure 1:
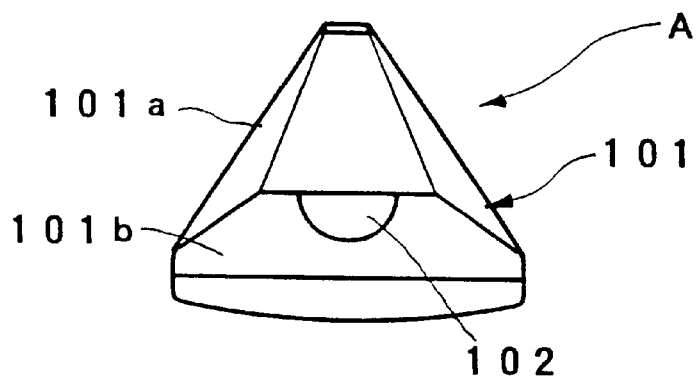
FIGS. 1(A), 1(B) and 1(C) are a side view, top view, and back view, respectively each showing a first embodiment of the signal transducing apparatus according to the present invention.
Figure 1:
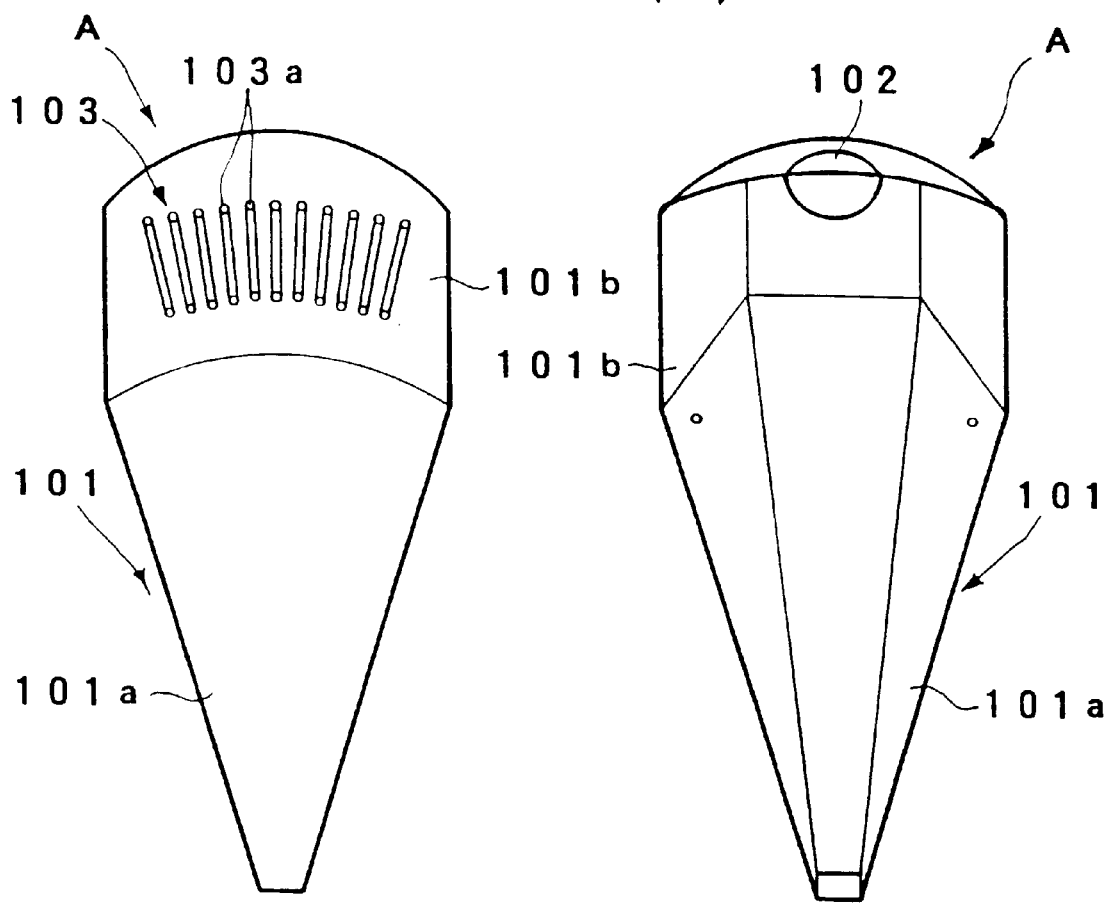

A first embodiment of the signal transducing apparatus according to the present invention will be described hereinbelow with reference the attached drawings. FIGS. 1(A), 1(B) and 1(C) are side, plane and back views of the first embodiment thereof, respectively.

The signal transducing apparatus A is provided with a casing 101 of such a size (equivalent to a well-known remote controller device) as to be griped by a human hand. The casing 101 is composed of a roughly conical grip portion 101a, an operating portion 101b formed with a plurality of slits in adjoining to the grip portion 101a. Further, on the side surface of the operating portion 101b, a signal generating portion 102 for irradiating infrared signals upon a home electric appliance or an information processing apparatus to be operated controllably is provided.

Figure 2:
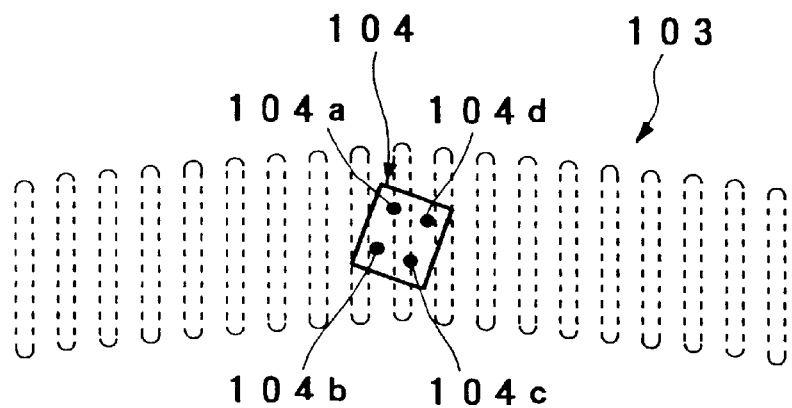
FIGS. 2(A) and 2(B) are a top view and a cross-sectional view, respectively each showing an internal structure of the signal transducing apparatus shown in FIGS. 1(A), 1(B) and 1(C)
Figure 2:
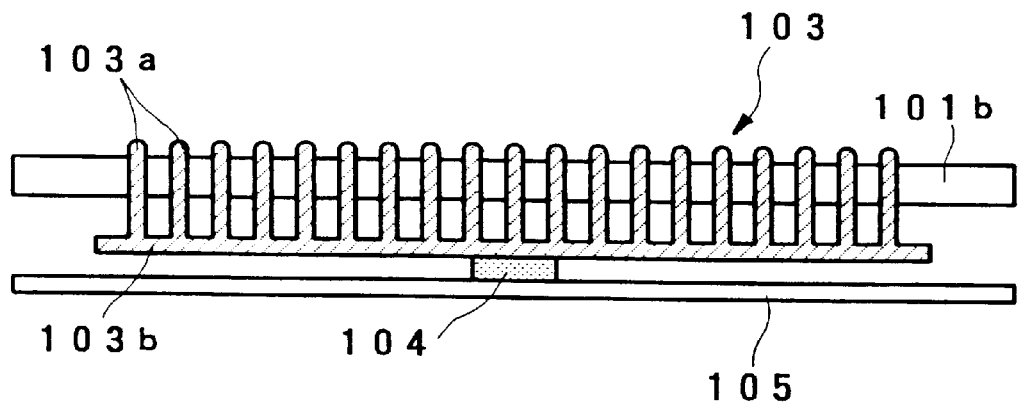

The operating portion 101b is formed with a rectangular pressure receive portion 103 so as to project from the outer surface of the operating portion 101b. FIGS. 2(A) and 2(B) show a more detailed internal structure of this pressure receive portion 103. As shown, the pressure receive portion 103 is formed into a comb shape in cross section, in such a way that a plurality of top end contact surfaces 103a project from the outer surface of the operating portion 101b in cross section and further connected to each other so as to form a gentle outer circular arc shape as a whole when seen from above, under consideration of the movable range of the human finger. Further, the root portions 103b thereof are formed integral with each other, as shown in FIG. 2(B). Further, under the root portion 103b of the pressure receive portion 103, a force-electricity transducing element 104 is attached.

On the force-electricity transducing element 104, four unit elements 104a to 104d are formed. Each of the unit elements 104a to 104d is a silicon diaphragm formed on a silicon wafer by etching method, for instance. Each of these unit elements 104a to 104d can detect the compression force (or pressure) and generates an electric signal corresponding thereto. Further, although not shown, a signal processing section for processing the generated detection signals is provided within the casing 101 to generate infrared signals, so that the generated infrared signals can be irradiated to the outside of the casing through the signal generating portion 102.

Further, between the upper surface of the unit elements 104a to 104d and the lower surface of the root portion 103b of the pressure receive portion 103, a space is formed so as to be filled with silicone oil which serves to transmit the force received by the contact surfaces 103a to each of the unit elements 104a to 104d, respectively. Further, an electrode is arranged around each silicon diaphragm to output each force signal detected by each unit element.

Further, in the above-mentioned force-electricity transducing element 104, when the unit elements 104a to 104d are all formed on the silicon wafer, no problem may arise. In the case where the force-electricity transducing element 104 is manufactured by use of a material which is easily deformed or distorted, it is preferable to fix the force-electricity transducing element 104 on a member of a relatively large rigidity. For instance, it may be considered to fix the force-electricity transducing element 104 to a base 105 of a high rigidity.

In the signal transducing apparatus A constructed as described above, when an operator depresses the contact surfaces 103a of the pressure receive portion 103, it is possible to detect the position and the magnitude of compression force (or pressure) applied to the contact surfaces 103a, respectively. The method of detecting the compression force according to the present invention will be described in further detail hereinbelow.

First, the construction of the force-electricity transducing element 104 will be explained with reference to FIGS. 3(A) to 3(D).

Here, the assumption is made that the force-electricity transducing element 104 is formed by four unit elements 104a to 104d arranged in a 2×2 matrix form as shown in FIG. 3(A) and further that a pressure point PA on the surface (detection area) of the force-electricity transducing element 104 is depressed by a finger end at a force P as shown in FIG. 3(B). Here, the pressure receive portion 103 is assumed to be flat (as a plane) for brevity. Then, the force data at the pressure point PA can be detected by the four unit elements 104a to 104d as four detection signals p1 to p4, as shown in FIG. 3(D).

Here, the coordinates of the pressure point PA are denoted by X, Y on the plane; a distance between the pressure point PA and the coordinate center is denoted by L; and the angle of the pressure point PA with respect to the X-axis is denoted by θ (a force working direction), as shown in FIG. 3(C).

Then, the X-axis component of the force P applied to the pressure point PA can be expressed by four unit elements 104a to 104d as follows:

$$P(x)=(p3+p4)-(p1+p2) \quad (1)$$

In the same way, the Y-axis component of the force P applied to the pressure point PA can be represented by four unit elements 104a to 104d as follows:

$$P(y)=(p1+p3)-(p2+p4) \quad (2)$$

Accordingly, the working direction θ of the force P can be expressed by the ratio of P(y) to P(x) as follows:

$$\theta=\mathrm{Tan}^{-1}(P(y)/P(x))=\mathrm{Tan}^{-1}[\{(p3+p4)-(p1+p2)\}/\{(p1+p3)-(p2+p4)\}] \quad (3)$$

Further, as shown by FIG. 3(D), a virtual plane 106 obtained by the four output values (vectors) p1 to p4 of the four unit elements 104a to 104d is assumed. Further, an angle between a normal vector starting from a gravity center of this virtual plane 106 and a vertical direction (Z-axis direction) with respect to the detection area plane is denoted as α. Then, it is possible to allow the obtained angle α to correspond to the distance L between the pressure point PA and the coordinate center as shown in FIG. 3(C), to decide the distance L by the angle α.

Further, although a plane can be defined by three spatial points in general, the virtual plane 106 is defined by use of four vector points in the present invention. In other words, since the plane can be originally decided by three points, additional point is decided subsidiarily. In the present invention, however, since being so constructed as to define the plane by use of four points, the force-electricity transducing element 104 must be formed by use of a silicon wafer of a high rigidity in such a way that the unit elements 104a to 104d will not be deformed or distorted, with the result that it is possible to obtain accurate pressure detection values. Further, when the base 105 to which the force-electricity transducing element 104 is fixed is formed by a rigid member, the similar effect can be of course obtained.

Figure 4:
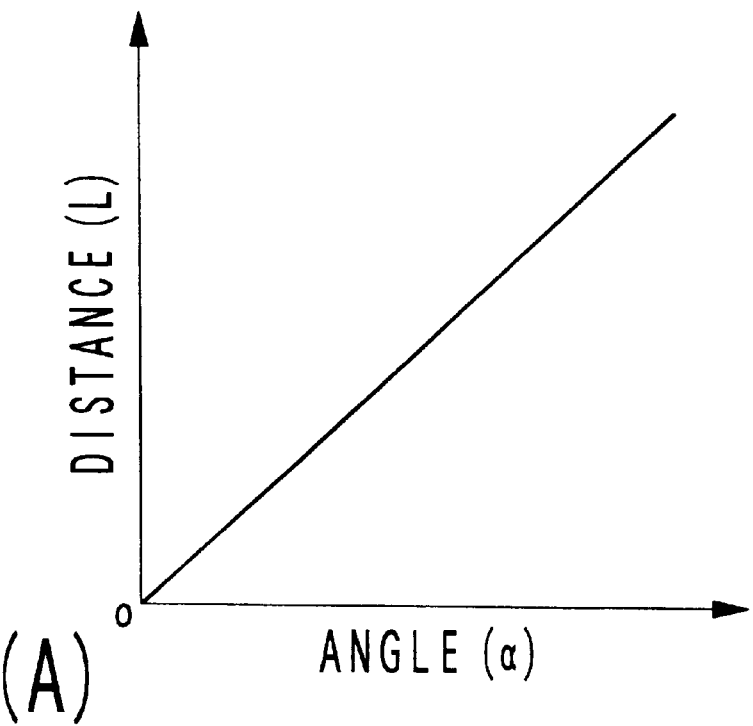
FIGS. 4(A) and 4(B) are a graphical representation showing the relationship between L and a shown in FIG. 3(C) and FIG. 3(D) which are defined by a linear curve, and a graphical representation showing the relationship between L and a shown in FIG. 3(C) and FIG. 3(D) which are defined by a quadratic curve, respectively.
Figure 4:
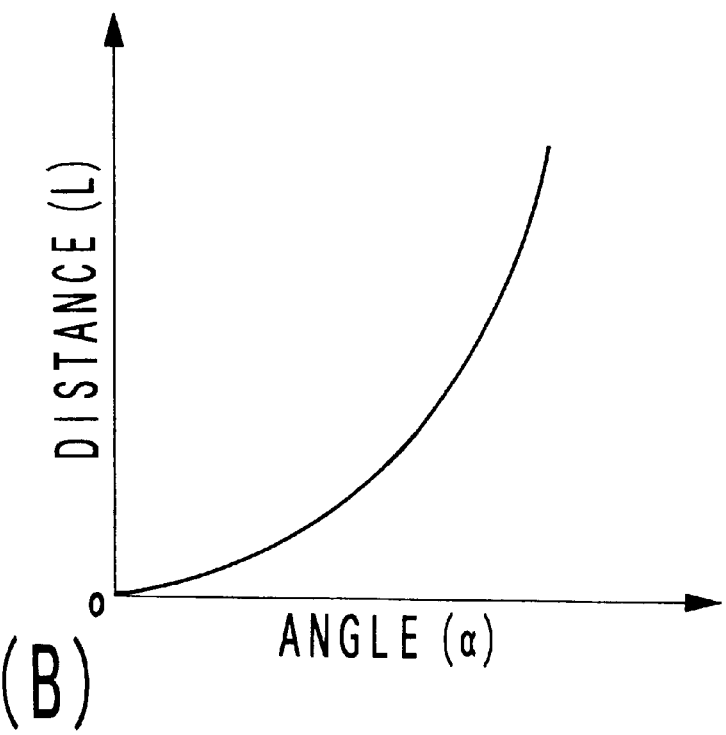

Here, FIGS. 4(A) and 4(B) show the relationship between L and α by way of example, in which FIG. 4(A) defines the relationship between both by a linear equation and FIG. 4(B) defines the relationship between both by a quadratic equation. Further, it is considered that the optimum value of the relationship between both differs according to the operators and the work contents of the signal transducing apparatus A. Therefore, in order to improve the position detection precision at the pressure point PA and to mitigate the fatigue feeling during work, it is preferable to prepare a plurality of patterns in such a way that the optimum pattern can be selected by the operator whenever the system is started or in operation.

Lastly, the magnitude of the force P applied at the pressure point PA can be defined by a sum total of the absolute values of the respective unit elements 104a to 104d as follows:

$$P=|p1|+|p2|+|p3|+|p4| \quad (4)$$

Figure 9:
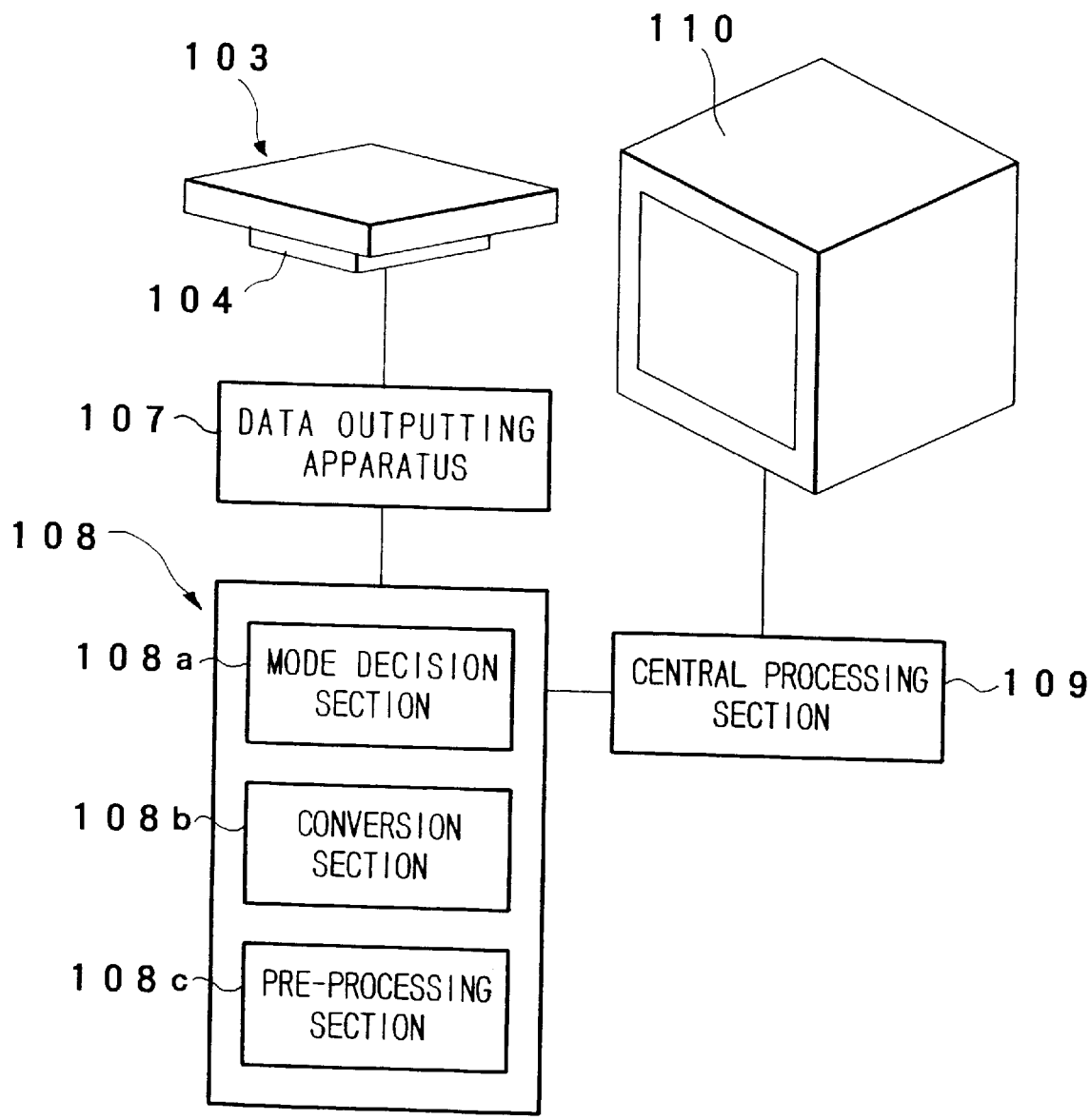
FIG. 9 is a block diagram showing the control construction used when the signal transducing apparatus according to the present invention is applied to a personal computer, for instance.

As described above, when the output signals obtained by the respective unit elements 104a to 104d are processed to obtain the mutual relationship among them, it is possible to detect the position and the magnitude of the force applied in the detection area. Further, a series of the above-mentioned signal processing is executed by a data outputting apparatus 107 as shown in FIG. 9, as described later.

The signal transducing apparatus A according to the present invention is characterized in that the force-electricity transducing element 104 is composed of the four unit elements 104a to 104d and further these unit elements 104a to 104d are rigid enough against the pressure received at the pressure receive portion 103.

Therefore, in the signal transducing apparatus A according to the present invention, it is also possible to detect the pressure direction (a position PA at which pressure is applied in the pressure receive portion 103) by detecting the respective output values indicative of force magnitudes p1 to p4 of the four unit elements 104a to 104d and by adding these four output values p1 to p4 as vectors by use of a virtual plane 106 through signal processing.

In particular, when the force data of the four unit elements are added by vector processing to obtain a virtual plane, if the positional relationship between the unit elements changes, it is difficult to detect the pressure direction. In the present invention, however, since the force-electricity transducing element is so constructed as to be held in a rigid state, it is possible to secure the detection precision.

Further, in the present invention, since the magnitude and the direction of force (or pressure) can be detected by use of a single button, a relatively large number of commands can be assigned to a single button. Further, when the shape of the button is designed on the basis of the human engineering, an apparatus to be operated by the signal transducing apparatus can be manipulated by a single-hand (finger) operation, so that the apparatus to be operated can be handled in an extremely sensible status.

Further, when a plurality of projections (contact surfaces 103a) are provided as shown in FIGS. 1(B) and 2(B), it is possible to detect the position and the magnitude at which a force or pressure is applied on the contact surfaces (projections).

Further, in the above description, although the angle α is defined as an angle between a normal vector having a start point at the gravity center on a virtual plane and the vertical direction (Z direction) with respect to the detection area plane, it is also possible to define the angle α as the normal vector having a start point at the origin of the X and Y coordinate axes and the vertical direction (Z direction) with respect to the detection area plane, for instance. In this case, although the calculations somewhat differ between both the definitions, the same function can be obtained as the signal transducing apparatus A.

Here, as a preferred example to which the signal transducing apparatus A as shown in FIGS. 1(A) to 1(C) can be applied, a method of reproducing video data recorded on a video tape recorder or a digital video disk will be described hereinbelow.

As understood by the shape of the pressure receive portion 103 of the signal transducing apparatus A, it is possible to consider a method of utilizing the signal transducing apparatus A in such a way that the picture reproduction speed can be changed, whenever the user moves his finger left and right on the contact surface 103a of the signal transducing apparatus A. In this method, the picture reproduction speed can be adjusted by the human feeling close to turning over the leaves of a book. In more detail:

(A) The movement speed of the operator's finger is allowed to correspond to the reproduction speed of the picture data. That is, when the finger is moved quickly, the reproduction speed is increased, and when moved slowly, the reproduction speed is decreased. Further, when the finger motion stops, the reproduction operation is also stopped to display a still picture. Of course, it is possible to realize a reverse reproduction such that picture is displayed in the reverse direction with respect to time.

Further, it is also possible to control the reproduction speed according to the finger compression force. In this case, first the finger pressure is detected when the finger is still, and the initial acceleration when the finger is moved is determined larger with increasing finger pressure.

In the above-mentioned method of unitizing the signal transducing apparatus, since the picture data (e.g., movie) for long hour can be fed on the basis of the finger motion with extremely sensible feeling, it is possible to access a desired picture quickly.

(B) The position at which the pressure is applied is allowed to correspond to a command. For instance, when the operator touches the right side of the pressure receive portion 103, the reproduction operation starts; when touches the left side thereof, the reverse reproduction operation starts; and when touches the middle portion thereof, the stop operation is executed. Further, it is also possible to allow the magnitude of the pressure to correspond to the reproduction speed. In this method, since the reproduction speed can be changed in the state where the finger is kept stopped at a point, it is possible to handle the picture with sensible feeling, in the same way as with the case of (A).

Further, without being limited only to the above-mentioned methods, the signal transducing apparatus according to the present invention can be used in various ways. In particular, the method of designating position data and force data to the respective buttons can be decided freely according to the apparatus to which the signal transducing apparatus is applied.

A second embodiment of the signal transducing apparatus according to the present invention will be described hereinbelow with reference to FIGS. 5(A) and 5(B), in which the same reference numerals have been retained for similar elements or parts having the same functions as with the case of the first embodiment shown in FIGS. 1(A) to 1(C).

This second embodiment is different from the first embodiment in the shape of the force-electricity transducing element and the arrangement of the unit elements.

In more detail, in the second embodiment of the signal transducing apparatus B, a long force-electricity transducing element 104 is formed extending in the connection direction of the contact surfaces 103a of the pressure receive portion 103, and further the plural members of units (in this example, four units elements) four unit elements 104a to 104d are arranged at regular intervals along the longitudinal direction of the contact surfaces 103a of the pressure receive portion 103.

In the signal transducing apparatus B constructed as described above, when the signals generated by the force-electricity transducing element 104 are processed in accordance with the same procedure as with the case of the first embodiment, it is possible to detect the position and magnitude of the pressure or force applied to the contact surfaces 103a.

Figure 6:
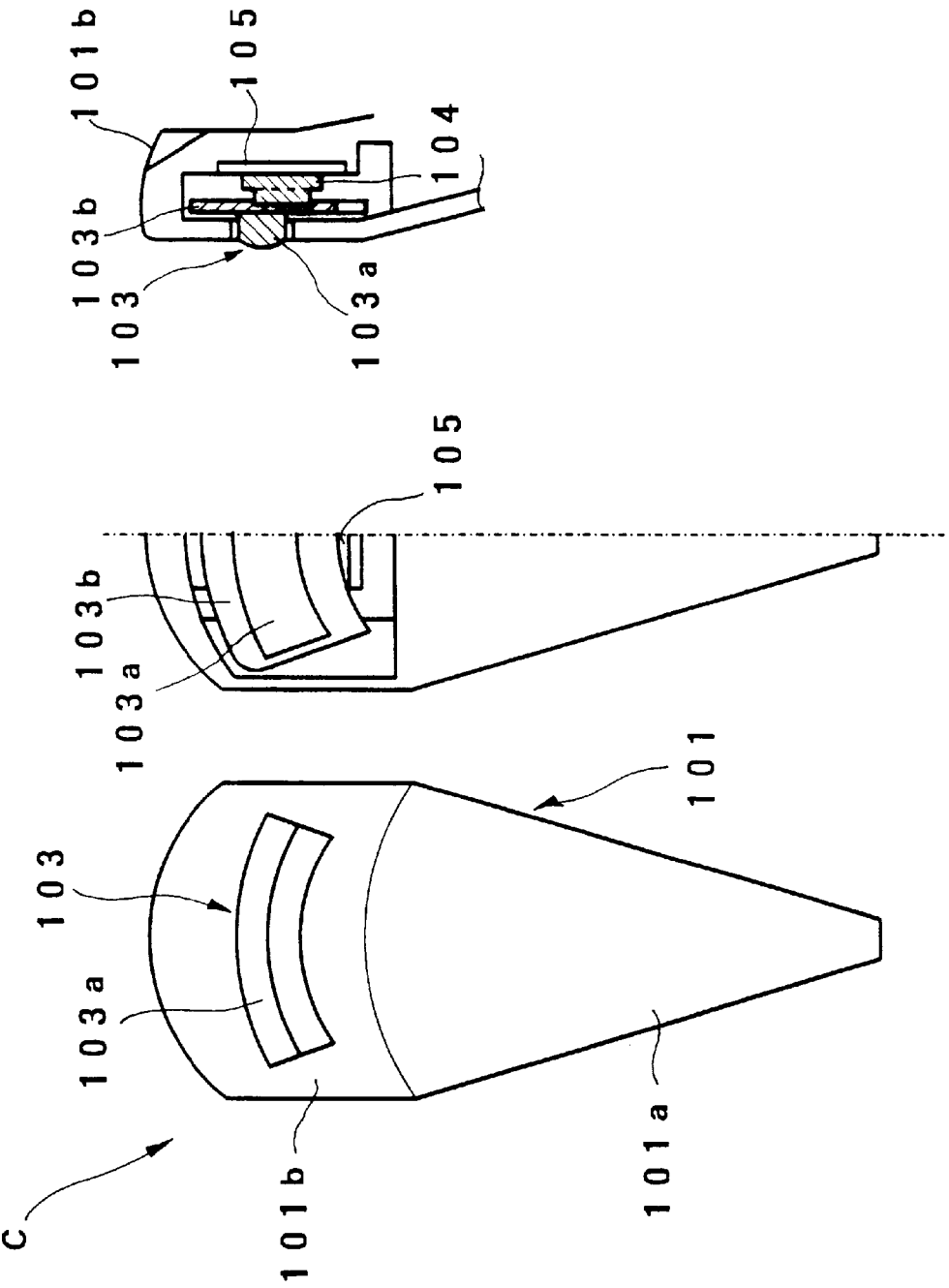
FIGS. 6(A), 6(B) and 6(C) are a top view, plane view, and cross-section view, respectively each showing a third embodiment of the signal transducing apparatus according to the present invention.

A third embodiment of the signal transducing apparatus C according to the present invention will be described hereinbelow with reference to FIGS. 6(A), 6(B) and 6(C).

The feature of this third embodiment is that the contact surface of the pressure receive portion is formed by a single surface. In other words, only a single slit is formed in the operating portion 101b of the casing 101 of the signal transducing apparatus C, and the contact surface 103a of the pressure receive portion 103 projects through the formed slit. Further, the contact surface 103a is formed into a convex shape in cross section; that is, so as project at the middle portion thereof along the longitudinal direction thereof, as shown in FIG. 6(C). Further, as the force-electricity transducing element 104, any one of the aforementioned embodiments can be used.

In the signal transducing apparatus C constructed as described above, when the signals generated by the force-electricity transducing element 104 are processed in accordance with the same procedure as the first and second embodiments, it is possible to detect the position and magnitude of the pressure or force applied to the contact surface 103a.

Figure 7:
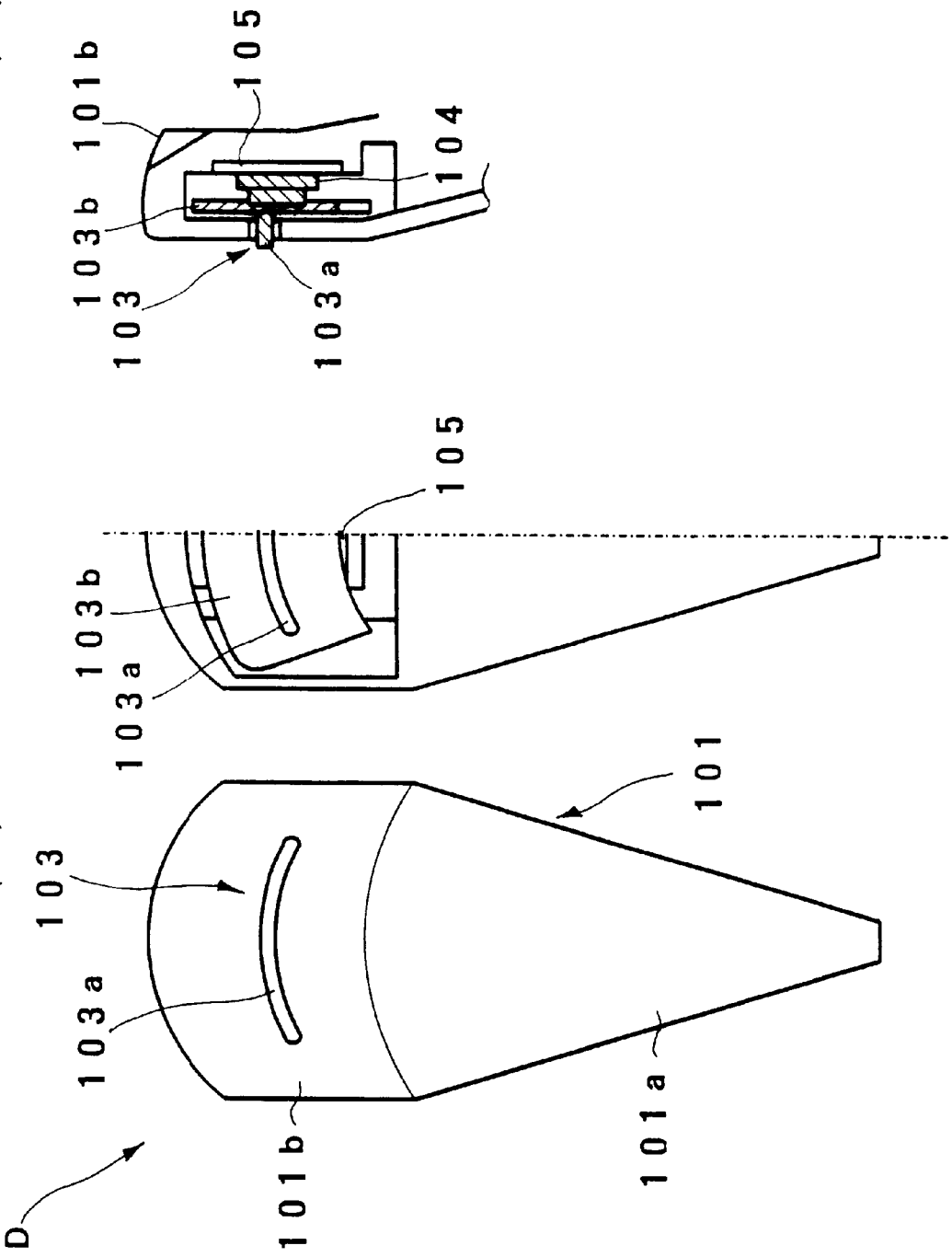
FIGS. 7(A), 7(B) and 7(C) are a top view, plane view, and partial cross-section view, respectively each showing a fourth embodiment of the signal transducing apparatus according to the present invention.

A fourth embodiment of the signal transducing apparatus D according to the present invention will be described hereinbelow with reference to FIGS. 7(A), 7(B) and 7(C).

In the same way as with the case of the third embodiment, only a single contact surface 103a is formed in the pressure receive portion 103. However, the width of the contact surface 103a is as narrow as several mm and formed into a roughly flat surface. Further, as the force-electricity transducing element 104, any one of the aforementioned embodiments can be used.

In the signal transducing apparatus D constructed as described above, when the signals generated by the force-electricity transducing element 104 are processed in accordance with the same procedure as with the case of the other embodiments, it is possible to detect the position and magnitude of the pressure or force applied to the contact surface 103a.

Further, in this fourth embodiment, since the area of the contact surface 103a is small and thereby the pressure receive position can be decided more easily, it is possible to detect the pressure receive position accurately.

A fifth embodiment of the signal transducing apparatus E according to the present invention will be described hereinbelow with reference to FIGS. 8(A) and 8(B).

In this fifth embodiment, the contact surfaces 103a of the pressure receive portion 103 are each formed as a dot on top view and further arranged into a roughly rectangular shape as a whole. Further, as the force-electricity transducing element 104, any one of the afore-mentioned embodiments can be used.

In the signal transducing apparatus E constructed as described above, when the signals generated by the force-electricity transducing element 104 are processed in accordance with the same procedure as with the case of the afore-mentioned embodiments, it is possible to detect the position and magnitude of the pressure or force applied to the contact surfaces 103a.

Further, in this fifth embodiment, since each of the contact surfaces 103a are formed as a small dot, it is possible to adopt such a method of assigning the entire contact surfaces 103a to a single command surface, without assigning each dot to each command, respectively. For instance, the roughly rectangular surface formed by the arranged contact surfaces 103 can be assigned to a whole display area of a personal computer, in such a way as to be used as a tool for commanding the movement direction and speed of a cursor.

The case when the signal transducing apparatus according to the present invention is applied to move a cursor on a display area of a personal computer will be described in detail hereinbelow.

FIG. 9 shows a control system used when the signal transducing apparatus according to the present invention is applied to a personal computer, for instance.

In FIG. 9, although the pressure receive portion 103 is shown as a flat surface, this implies that the dot-shaped contact surfaces as shown in FIGS. 8(A) and 8(B) form a plane as a whole. In other words, the pressure receive portion 103 is constructed as a virtual surface obtained by a group of dots or lines arranged in two dimensions or by a group of lines arranged in one dimension (as shown in FIG. 1(B)).

A data output apparatus 107 outputs data indicative of the position and the magnitude of the pressure or force applied onto the pressure receive portion 103 on the basis of the signals outputted by the force-electricity transducing element 104. The expressions (1) to (4) as already explained are calculated by the data outputting apparatus 107. Further, a special signal for setting a mode can be obtained by another sensor (not shown) and outputted as a switch signal.

An arithmetic section 108 receives the signals from the signal outputting apparatus 107, and decides the operation required by the operator on the basis of the position and the magnitude of the pressure or force applied onto the pressure receive portion 103. Further, on the basis of the decision results, a change-over switch is set or the decided results are displayed on a display unit 110 (e.g., a designated position is displayed as a cursor position on the display picture).

The arithmetic section 108 is composed of a mode decision section 108a, a conversion section 108b, and a pre-processing section 108c.

The mode decision section 108a extracts some commands intended to be operated by the user on the basis of the output signals of the data outputting apparatus 107, and outputs the most accurate data as a mode signal.

The conversion section 108b converts the data signal outputted by the data outputting apparatus 107 into a designated position on the display 110, on the basis of the mode signal outputted by the mode decision section 108a and in accordance with conversion algorithm according to the decided mode signal.

In more detail, the mode decision section 108a is provided with at least such a function for deciding and outputting "absolute position input mode" for allowing the depressed position data to correspond to an absolute position on the display 110 and "relative position input mode" for allowing the depressed position data to correspond to a relative position with respect to the current position of a cursor on the display 110. Further, the conversion section 108b allows the data signal of the data outputting apparatus 107 to correspond to the designated position on the display 110 in accordance with conversion algorithm according to the decided mode signal. The pre-processing section 108c extracts or calculates compression hysteresis data (e.g., a time elapsed after the compression start, a time interval of no continuous compression, the movement speed of the compression position (finger position), etc.) on the basis of the signals inputted by the data outputting apparatus 107, so that the calculated data can be used by the mode decision section 108a and the conversion section 108b.

A central processing section 109 executes necessary processing on the basis of the signals applied by the arithmetic section 108 composed of the mode decision section 108a, the conversion section 108b and the pre-processing section 108c, and displays the processed results on the display 110. Further, the central processing section 109 outputs signals to other outputting apparatus (e.g., printer, a disk driver, etc.) (not shown), and receives and transmits signals to and from another personal computer (e.g., data processing apparatus).

Figure 10:
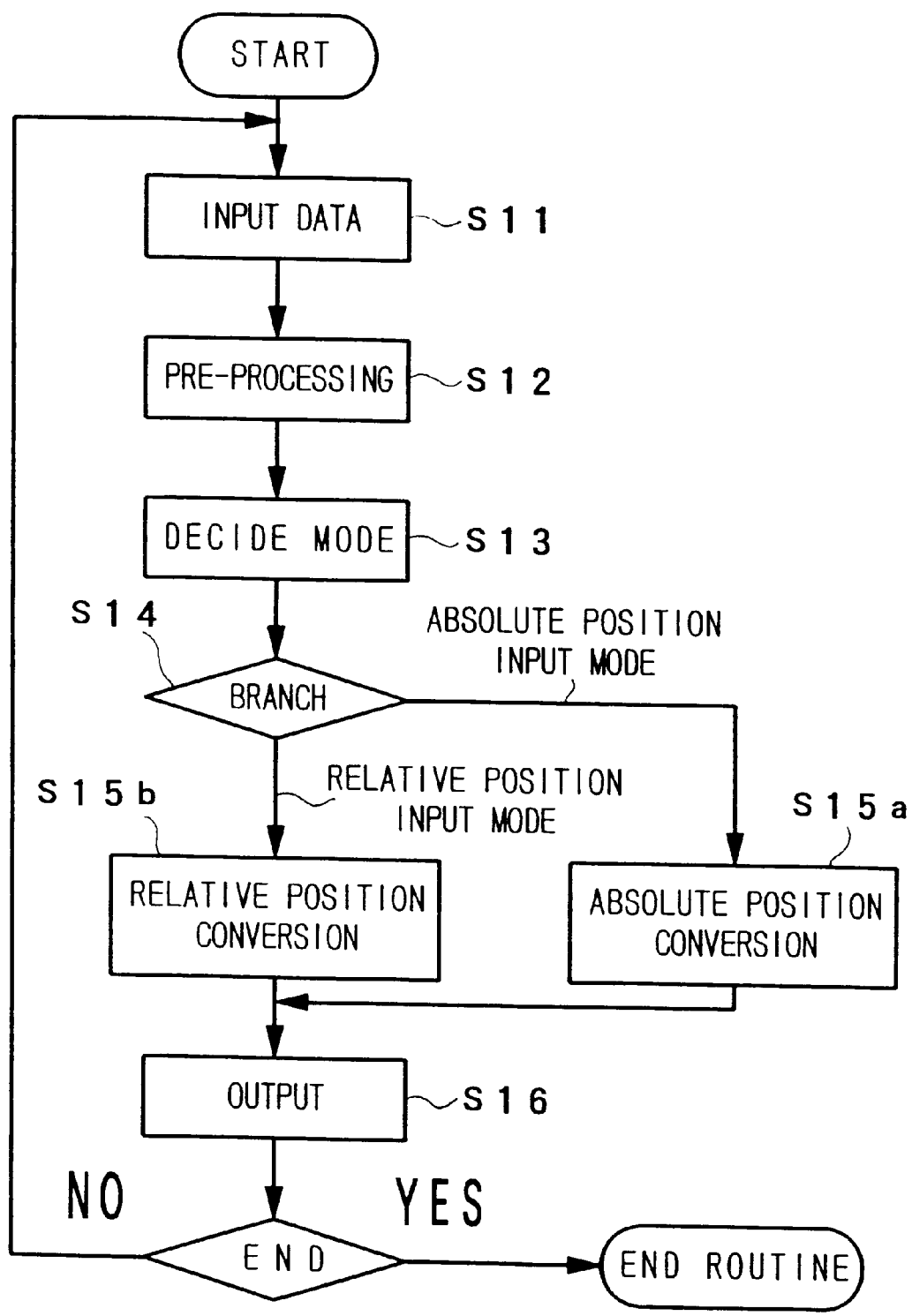
FIG. 10 is a flowchart showing the main control operation executed by the central arithmetic section.

The essential operation executed by the arithmetic section 108 will be explained with reference to a flowchart as shown in FIG. 10.

First, the magnitude and the position of depressed pressure or force are inputted from the data outputting apparatus 107 (in step S11).

Further, the compression hysteresis data (e.g., a time elapsed after the compression start, a time interval of no continuous compression, the movement speed of the compression position (finger position), etc.) are calculated by the pre-processing (in step S12). Further, the past and current data necessary for the succeeding and after routine are recorded.

Further, the mode is decided on the basis of the magnitude and the position of compression pressure or force, the change rate of the magnitude and the position of the compression pressure, the presence or absence of the mode switch signal, the past mode change, etc. (in step S13). Further, the absolute position input mode and the relative position input mode are discriminated (in step S13). Here, the other modes (e.g., single click mode, double click mode well known by the ordinary mouse operation) can be decided in the same flowchart shown in FIG. 10.

Further, the input mode is controlled separately after branched according to the absolute position input mode and the relative position input mode (in step S14).

Further, a designated position on the display 110 can be obtained on the basis of the compression position (x, y) and in accordance with each algorithm (in step S15a and S15b).

Further, the data indicative of the designated position (x, y) are outputted to the central processing section 109 (in step S16). Further, when the signal processing is further required, the above control operation returns to the input routine.

By the arithmetic section 108 having the above-mentioned functions, such a conversion as the absolute position input mode (by which the depressed position can be assigned to all over the display) picture can be executed, so that the cursor can be moved quickly and remotely on the display 110.

Further, as the matters to be decided as criteria in the mode decision step executed in step S13, various other methods can be considered. In this case, it is preferable that these matters are previously stored in the arithmetic section 108 as a program and used appropriately where necessary. Some example of deciding the modes executed in step S13 will be described hereinbelow:

(a) When the change of the compression position is smaller than a predetermined value after a predetermined time has elapsed after compression start, the mode is decided as the absolute position input mode.

(b) When the compression force is larger than a predetermined value, the mode is decided as the absolute position input mode.

(c) When the mode switch signal is detected, the mode is decided as the absolute position input mode.

In the above decision methods (a) and (b), since the absolute position input mode can be designated without operating any specific switch, the user's operability can be improved markedly. Further, the above-mentioned methods can be used in combination. Further, when the methods can be freely combined by the user, the operability can be further improved.

Here, some examples of deciding the position conversion executed in step S15a or S15b will be described hereinbelow:

(d) In the case of the absolute position input mode, a distance between the cursor position on the display (which corresponds to the compression position) and the current cursor position is detected, and a speed proportional to the detected distance is calculated. Further, the conversion is executed so that the designated position can approach a position corresponding to the depressed position on the display.

(e) In the case of the absolute position input mode, the speed is increased (or decreased) gradually according to the time elapsed. Further, the conversion is executed so that the designated position can approach a position corresponding to the compression position on the display.

(f) In the case of the absolute position input mode, the conversion is executed so that the designated position can approach a position corresponding to the depressed position on the display at a predetermined constant speed.

(g) In the case of the absolute position input mode, the conversion is executed so that the designated position can approach a position corresponding to the depressed position on the display, irrespective of the current designated position on the display.

(h) The conversion is executed so that the designated position can approach a position corresponding to the depressed position on the display at a speed proportional to the compression force.

(i) The conversion is executed so that the designated position can approach a position corresponding to the depressed position on the display at a speed obtained by adding the compression force.

In the above-mentioned methods (h) and (i), when the user increases the compression force intentionally, the cursor can be moved to a target position quickly, so that it is possible to reflect the user's intention upon the designated position operation intuitively. Further, when the methods (h) and (i) are combined with the methods (d), (e) and (f), it is possible to further improve the operability.

Further, in relation to the decision examples executed in step (S15a or S15b), the other decision examples executable by the central processing section 109 will be explained hereinbelow:

(j) When the designated position reaches a position corresponding to the compression position on the display within a predetermined distance, the absolute position input mode is switched to the relative position input mode.

(k) When the designated position reaches a position corresponding to the compression position on the display within a predetermined distance, a conversion coefficient of the absolute position input mode is changed over. Here, the conversion coefficient is increased to the maximum when all of the contact surfaces 103a are designated to all the display surface, but decreased when designated to a part of the display surface. By controlling the conversion coefficient, it is possible to easily change the movable speed and the locating precision of the designated position.

(l) When the designated position reaches a position corresponding to the compression position on the display, the absolute position input mode is switched to the relative position input mode.

(m) When the designated position reaches a position corresponding to the compression position on the display, a conversion coefficient of the absolute position input mode is changed over.

The above-mentioned four decision methods are preferable when a high precision locating operation is required at the final stage of the absolute position input mode. In these methods, the input mode is switched automatically to the relative position input mode or the coefficient of the absolute position input mode is changed. By the above-mentioned switching, it is possible to locate the cursor more smoothly and securely.

Further, the operability can be further improved when these decision examples executed by the central processing section 109 are combined with the decision examples executed in the mode decision step (in step S13) or in the position conversion step (in step S15a or S15b). In particular, it is preferable to combine the methods (j), (k), (l) and (m) with the methods (d), (e), (f), (h) and (i), respectively.

Successively, the operation of the arithmetic section 108 will be described hereinbelow with reference to a flowchart shown in FIG. 11. The feature of the control operation shown in FIG. 11 is to consider a virtual inertia conversion (in step S15c). The operation other than the above is basically the same as with the case of the control operation shown in FIG. 10 and the decision examples, so that the similar description thereof is omitted herein.

In the mode conversion (in step S13), the virtual inertia mode is prepared as one of the decision criteria.

In the virtual inertia mode, an object having an inertia (does not actually exist) is assumed to form a virtual reality in which a force is being applied to the assumed object via the compression surface. By this, when the user slides his finger quickly in the horizontal direction while applying a force against the compression surface for instance, it is possible to form a virtual reality in which a virtual inertia object is rotated (or slid) by a force applied thereto. Further, even after the finger has been released from the pressure receive portion, such a sense that the virtual inertia object is still rotating (or sliding) can be given to the user.

This virtual inertia object can be applied to the designated position (cursor position), for instance. In this case, when the designated position is required to be changed largely and quickly, the user can easily change the designated position by moving his finger quickly while applying a large compression pressure onto the pressure receive portion.

In FIG. 11, the virtual inertia mode is set in parallel to the relative position input mode and the absolute position input mode, so that any one of three modes can be selected in the same selection step. However, it is also possible to start a plurality of modes at the same time, for instance, by setting the virtual inertia mode in the relative position input mode. In this case, it is preferable to utilize the simultaneous modes in such a way that any modes can be selected freely according to the user's work contents.

By using the virtual inertia mode as described above, it is possible to further improve the user's operability and thereby to realize the signal transducing apparatus by which the designated position (e.g., a cursor) can be moved at user's own will.

The other decision examples executable by the central processing section 109 when the virtual inertia mode is set will be described hereinbelow.

(n) When the compression is stopped after application of the compression force, the movement speed and/or the position of the designated position (cursor) is calculated according to the compression force during compression and/or the movement speed of the compression position and the time elapsed after the compression stop.

(o) In addition to the above decision example (n), when the compression is stopped after application of the compression force, the movement speed to the designated position (cursor) is reduced according to a value obtained by multiplying a time elapsed after the compression stop by a predetermined value. This calculation realizes a virtual reality obtained as if a friction force would be applied to the designated position (cursor).

(p) When the designated position (cursor) reaches an end of the display during movement, the calculation is executed so that the designated position (cursor) is located at a position returned from the display end. This calculation realizes a virtual reality obtained as if the designated position would be rebounded from the display end when the designated position (cursor) reaches the display end during sliding or rolling. This can be obtained by combining the above-mentioned decision examples (n) and (o).

(q) When the designated position (cursor) reaches an end of the display during movement, the calculation is executed so that the designated position (cursor) is moved from the opposite end of the display (as a position continued from the display end). In this example, being different from the decision example (p), this calculation realizes a virtual reality obtained as if the designated position (cursor) would appear from the opposite end of the display again during sliding or rolling. This can be obtained by combining the above-mentioned decision examples (n) and (o).

As described above, when the construction as shown in FIG. 9 to FIG. 11 is adopted, it is possible to realize a quick mode change or an accurate location of the designated position (cursor) or the input operation close to the actual physical phenomenon, which have been all so far difficult to be executed in the prior art signal transducing apparatus. Therefore, since the operation is close to more human feeling or sense, it is possible to improve the user's operability markedly.

Figure 12:
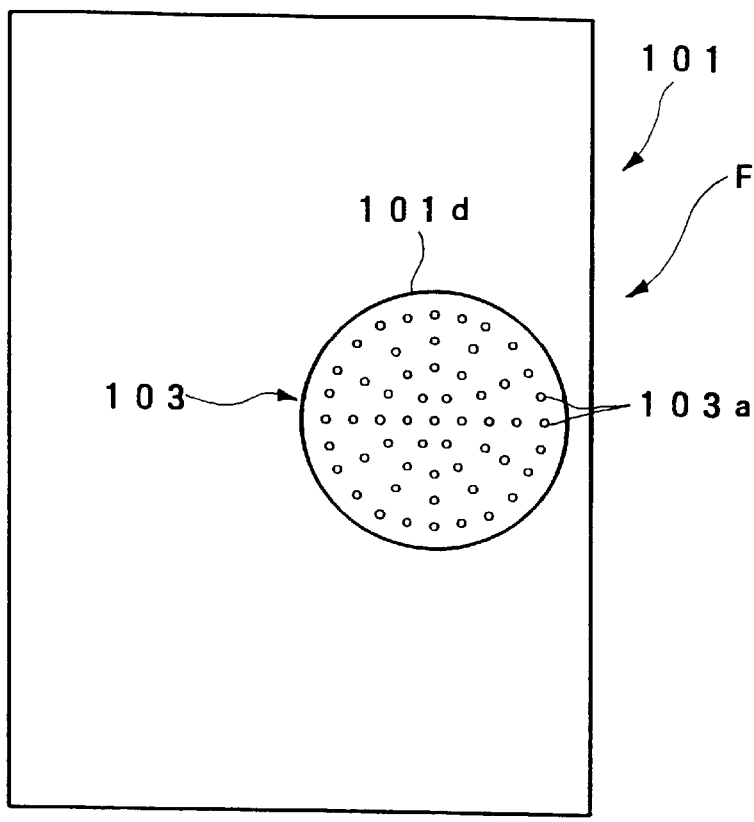
FIGS. 12(A) and 12(B) are a plane view and a cross-sectional view, respectively each showing a sixth embodiment of the signal transducing apparatus according to the present invention.
Figure 12:
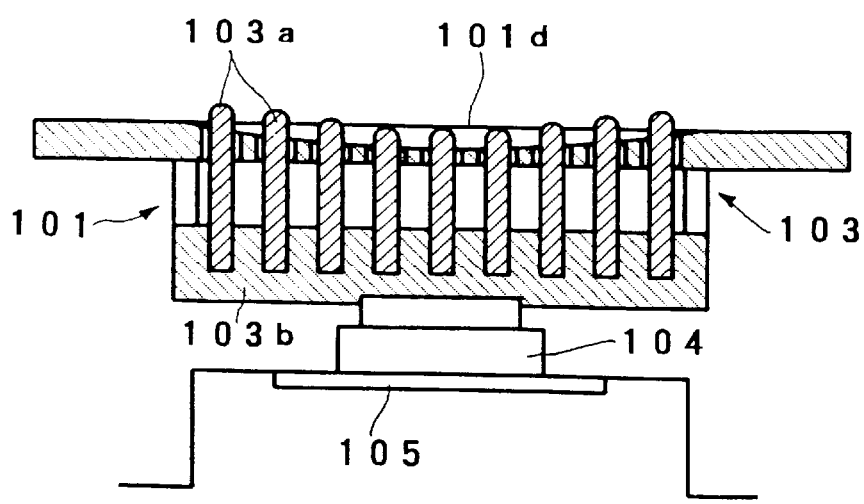

A sixth embodiment of the signal transducing apparatus according to the present invention will be described hereinbelow with reference to FIG. 12.

Figure 8:
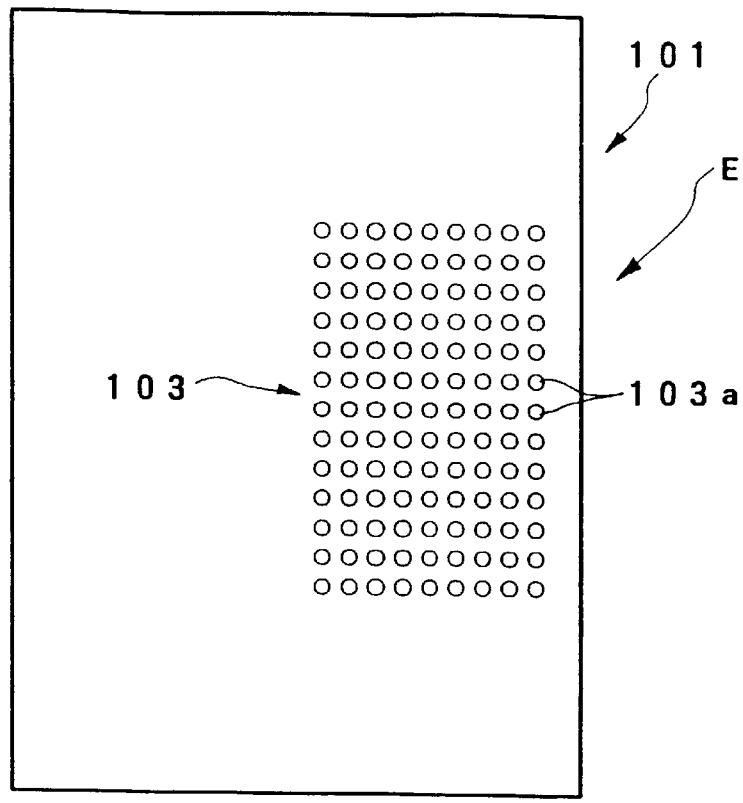
FIGS. 8(A) and 8(B) are a plane view and a cross-sectional view, respectively each showing a fifth embodiment of the signal transducing apparatus according to the present invention.
Figure 8:
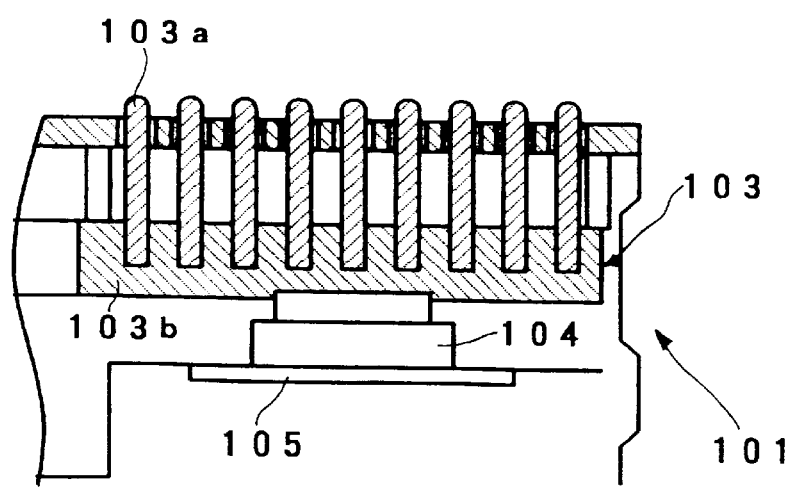

This sixth embodiment is different from the fifth embodiment shown in FIG. 8 in that the contact surfaces 103a of the pressure receive portion 103 are arranged so as to form a part of a spherical surface as a whole. In addition, a part of the casing 101 is formed into an arcshaped groove 101d so as to correspond to the arrangement of the outer ends of the contact surfaces 103a. In other words, the casing 101 is so formed that the contact surfaces 103a can be operated easily by the user's fingers.

In the signal converting apparatus F constructed as described above, when the signals generated by the force-electricity converting element 104 are processed in the same procedure as already above, it is possible to detect the position and the magnitude of the depression pressure or force.

Further, in this sixth embodiment, although the arrangement of all the ends of the contact surfaces 103a are arranged into a part of a roughly spherical surface, it is of course possible to design the arrangement of the ends of the contact surfaces 103 freely according to the shape of the apparatus to be operated. Further, it is also possible to apply this embodiment to the data processing apparatus such as a personal computer.

Figure 13:
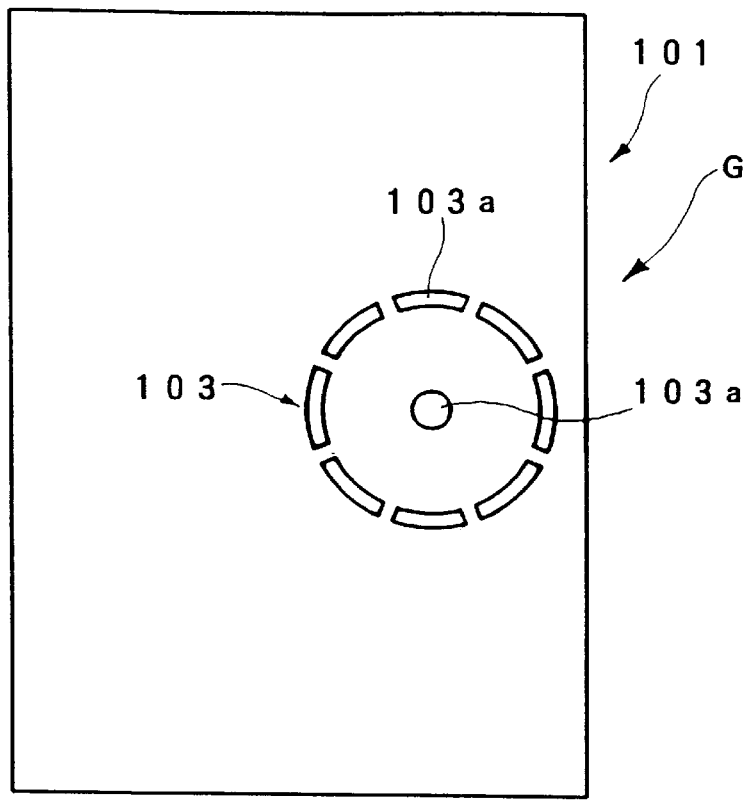
FIGS. 13(A) and 13(B) are a plane view and a cross-sectional view, respectively each showing a seventh embodiment of the signal transducing apparatus according to the present invention.
Figure 13:
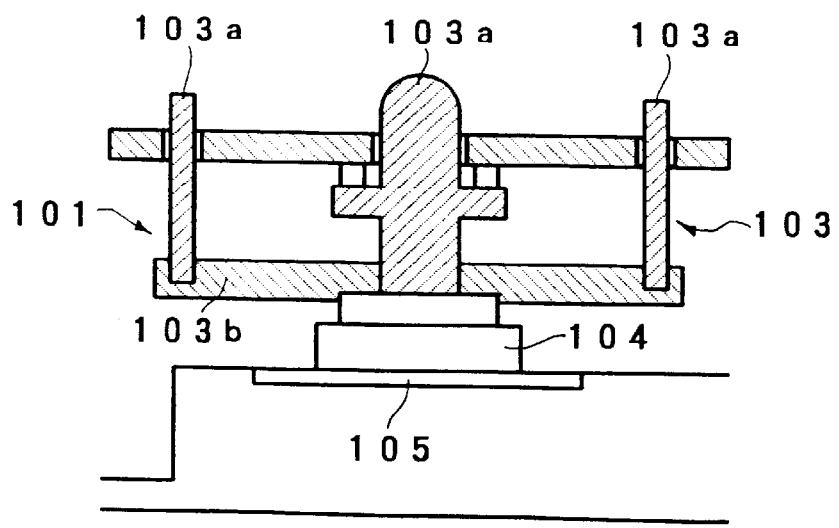

A seventh embodiment of the signal converting apparatus according to the present invention will be described hereinbelow with reference to FIG. 13.

In this seventh embodiment, the outer ends of the control surfaces 103a of the pressure receive portion 103 are arranged into roughly an annular shape by setting a single central contact surface 103a at the center thereof. All the contact surfaces 103a are connected to a base portion 103b in common, and then fixed on a single force-electricity converting element 104.

In the signal converting apparatus G constructed as described above, when the signals generated by the force-electricity converting element 104 are processed in the same procedure as already above, it is possible to detect the position and the magnitude of the depression pressure or force.

Further, in this seventh embodiment, it is also possible to assign different commands to the central-arranged contact surface 103a and the circumferentially-arranged contact surface 103a, separately. For instance, when a command assigned to the circumferential contact surfaces is added to the other command assigned to the central contact surface, it is possible to obtain such a function that the command of the central contact surface can be modified by the command of the circumferential contact surfaces.

Further, the above-mentioned embodiments can be widely applied to home appliances such as air conditioners, or information processing apparatus such as personal computers, etc.

Further, although the force-electricity converting element provided with four unit elements has been explained, four or more unit elements can be used for the force-electricity converting element. For instance, nine unit elements can be arranged so as to form a 3×3 matrix or sixteen unit elements can be arranged so as to form a 4×4 matrix. In these cases, it is also possible to detect the depression position and depression pressure or force on the basis of the same method as shown in FIGS. 3(A) to 3(D).

Still another modification of the present invention will be described hereinbelow with reference to FIG. 14.

Figure 14:
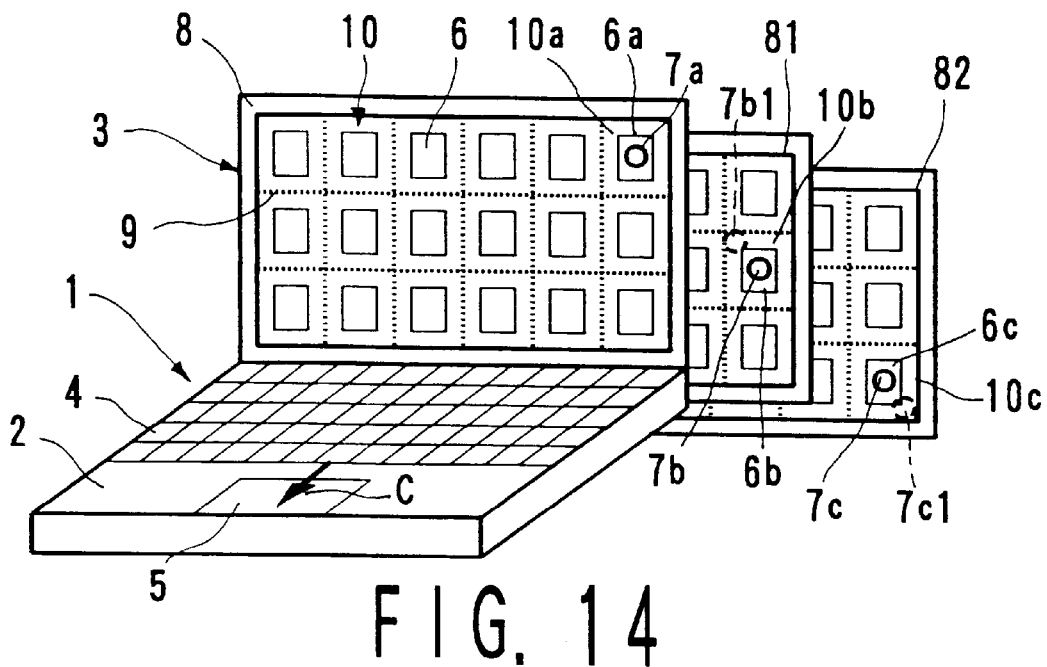
FIG. 14 is a perspective view showing an example to which another embodiment of the signal inputting apparatus according to the present invention is applied.

FIG. 14 is a perspective view showing an example to which the signal inputting apparatus according to the present invention can be applied. In this example, two pictures 81 and 82 are hidden under the picture 8 now being displayed on a display section 3. On each picture, an icon 6 selectable by a pointer 7 is arranged. Each icon 6 is arranged in an area 10 partitioned by boundary lines 9 formed virtually on the picture 8.

Now, the following case will be considered: from a state where a pointer 7a is put on an icon 6a in the picture 8, the picture 81 is selected; a pointer 7b is put on an icon 6b; further the picture 83 is selected; and a pointer 7c is put on an icon 6c.

Further, in the state where the pointer 7a is put on the iron 6a on the picture 8, a depression force is applied at a position C on the pad-type input section 5 (in this case, the position C corresponds to a position of the icon 6b on the picture 81). As a result, the picture 8 is switched to the picture 81, so that the pointer 7b is put on the icon 6b.

Although the operation is as described above from the ideal standpoint, there exists the case where even if the operator depresses the pad-type input section 5 at the position C, the pointer position is dislocated to another pointer position 7b1 on the picture 81 according to the finger angle of the operator. In this case, since the pointer 7b1 is not put on the icon 6b, the picture 8 cannot be switched to the picture 81. This is because since the picture 81 is hidden behind the picture 8, the feedback operation by the sense of sight is restricted.

In the signal inputting apparatus according to the present invention, however, there exists an area 10 partitioned by the boundary lines 9 for each picture 8, and further each icon is registered in each area separately in such a way that the icon 6a is registered in the area 10a; the icon 6b is registered in the area 10b; and the icon 6c is registered in the area 10c, respectively. As a result, even if the pointer 7b cannot point out the icon 6b accurately and thereby is dislocated to a pointer position 7b1, as long as the pointer position 7b1 lies within the area 10b, the icon 6b is regarded as being pointed out by the pointer 7b. Therefore, the succeeding switching from the picture 8 to the picture 81 and the designation of the icon 6b by the pointer 7b can be executed automatically.

Further, the picture 82 can be selected by the pointer 7c in the same way. That is, even if the pointer 7c is dislocated to a pointer position 7c1, as long as the pointer 7c1 lies within the area 10c, the icon 6c is regarded as being pointed out by the pointer 7c. Therefore, the succeeding switching from the picture 81 to the picture 82 and the designation of the icon 6c by the pointer 7c can be executed automatically.

Here, the picture is so designed that each icon is previously located in each area 10.

Figure 15:
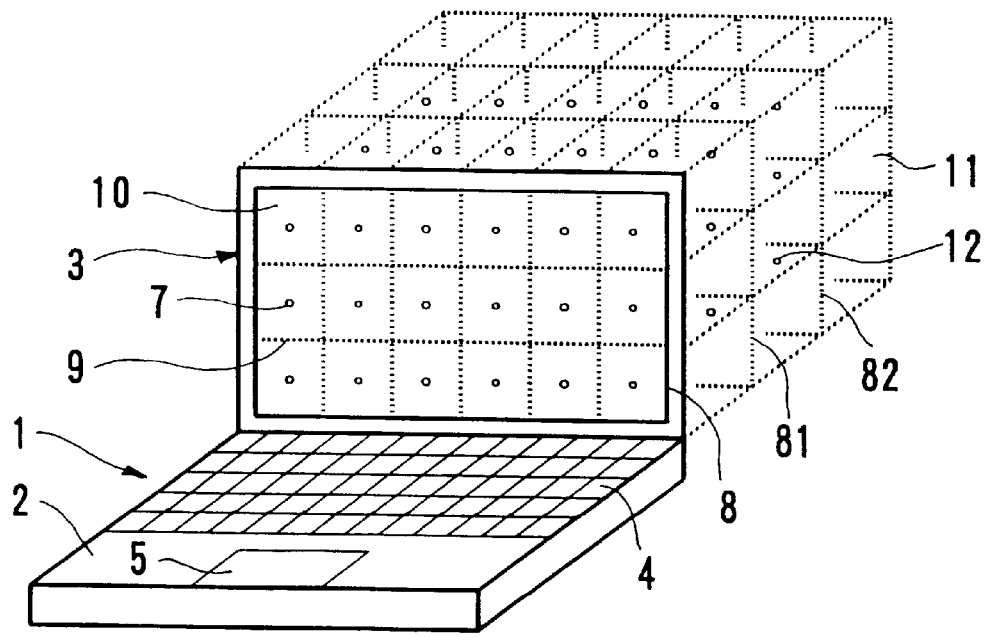
FIG. 15 is an illustration showing the generalized contents of the signal inputting apparatus shown in FIG. 14.

FIG. 15 is a generalized view of the contents shown in FIG. 14, in which a space is divided into a desired domain group 11, and a representative position 12 is set for each domain group 11 in such a way as to correspond to a position at which a force is applied to the pad-type input section 5.

Therefore, in this embodiment, a newly displayed picture can be designated on the basis of the magnitude of the depression force applied to the pad-type input section 5, without using a special command to switch the picture 8 now being displayed to the picture 81 or 82 now being not displayed. On the other hand, even if switched to any picture 8, 81 and 82, since the position of the pointer 7 can be regarded as being located at the representative position 12 in each domain group 11, the dislocation due to a slight difference in angle of application direction of the depression force applied to the pad-type input section 5 can be corrected automatically, so that it is possible to quickly select the icon by use of the pad-type input section 5.

FIG. 16 is a system block diagram for realizing the signal inputting apparatus according to the present invention. In FIG. 16, the pad-type input section 5 outputs an X-axis position signal x, a Y-axis position signal y, a signal indicative of a depression force, to signal amplifying means 13 on the basis of the position and the magnitude of the depression force applied by the operator's finger. The signal amplifying means 13 separates and amplifies the three-dimensional force data obtained by the pad-type input section 5 in accordance with a predetermined conversion rule, and transmits the obtained results to encode means 14. In this embodiment, the two-dimensional coordinates (x, y) and a force value (p) applied on the pad-type input section 5 are transmitted, so that one sort of code can be defined by a combination of (x, y, p).

On the other hand, the picture 8 now displayed on the display section 3 and the pictures hidden behind the picture 8 are defined as domain group 11 of spatially represented pictures, and a representative position 12 is set as $(X_i, Y_j, P_k)$ at each small domain group 11. That is, the relationship between the domain group 11 and the representative position 12 can be defined as $$X1 \in (X_{iS}/X_{iE})$$

where $X_{iS}$ and $X_{iE}$ denote start and end points of each domain group 11 on the coordinate axis X. When the pointer 7 is located within this range, the pointer 7 is regarded as being located at $X_i$ of the representative position 12. The same can be applied to $Y_j$ and $P_k$.

Domain registering means 15 registers the domain group 11 divided into n-units, m-units and r-units in each direction, and values at each representative position 12. In general, the number of the domain groups 11 is determined larger than the number of icons required to operate the picture. Therefore, when an icon is arranged on the picture, an appropriate position in each domain group 11 is selected to arrange the icon. In this embodiment, the pointer is moved by target coordinate setting means 16.

The three-dimensional force data decided by the operator's finger operation are converted by the encode means 14 to a significant command code of [x, y, p]. However, comparing means 17 executes such decisions as to which domain the target coordinate setting means 16 corresponds or whether an icon is present or absent in the corresponding domain.

Further, registration reproduction switching means 18 decides whether the decision result must be displayed on the picture 8 and further used to operate the apparatus (e.g., a personal computer), and executes the decided results.

In other words, when the reproduction is selected by the other means prepared separately, the operator's finger motion can be used as it is on the picture 8 of the apparatus to be operated.

On the other hand, when the registration is set to the registration reproduction switching means 18, the results decided by the comparing means 17 on the basis of the operator's finger motion are used via the registration reproduction switching means 18. Further, the decision results are transmitted to conversion coefficient registering means 19. The conversion coefficient registering means 19 is connected to the encode means 14 to transmit functions necessary to encode the signals [x, y, p] to the encode means 14. Here, the signals [x, y, p] are obtained by the operator's finger motion applied to the pad-type input section 5, and transmitted from the signal amplifying means 13 to the encode means 14. For instance, when the functions of $v_1=f(u_1)$, $v_2=g(u_2)$ and $v_3=h(u_3)$ are used for any given values of $u_1$, $u_2$ and $u_3$ as the conversion rules, the conversion coefficient registering means 19 applies the above-mentioned functions to the force-electricity conversion results [x, y, p] of the pad-type input section 5, and sets or registers the obtained results. For instance, when the respective functions f, g and h are registered in the conversion coefficient registering means 13 so as to be applied to the output [x, y, p] of the signal amplifying means 13, respectively, [f(x), g(y) and h(p)] can be obtained by the encode means 14.

After that, these functions are applied to the signals given from the signal amplifying means 13 to the encode means 14, and the applied results are compared with the contents of the target coordinate setting means 16 (in which icon positions are registered, for instance) by the comparing means 17.

Here, the functions are selected and used so that the operation can be made as intended by the operator when an appropriate force is applied to the pad-type input section 5. In practice, an optimum function is selected by use of a plurality of operators. That is, personal data recording means 20 is provided to record the functions selected and adjusted empirically by a plurality of the operators. On the basis of the data stored in this personal data recording means 20, the functions are registered to the conversion coefficient registering means 19. As a result, it is possible for the operator to use the optimized conversion rules.

Further, in the above description, a time series pattern of the finger depression force applied on the padtype input section 5 has been omitted. In practice, however, when the other operations (e.g., click operation) continue after the domain has been selected, a time series pattern indicative of depression force variation is to be used positively as a command code.

In the present embodiment, in the same way as with the case where the three-dimensional data related to the position and the magnitude of the depression force are registered in the domain registering means 15, time change registering means 21 registers force pattern data related to the change of depression force with respect to time as follows:

$$F_1[X_i(t), Y_j(t), P_k(t)]$$

Here, since the above-mentioned contents are also transmitted to the comparing means 17, the comparing means 17 compares the data [x(t), y(t), p(t)] outputted by the encode means 14 with the pattern data [$F_1$ [$X_i$ (t), $Y_j$ (t), $P_k$ (t)] outputted by the time change registering means 21, to obtain predetermined operations under consideration of the change of the depression force with respect to time. In addition, the conversion rules related to the time change can be registered in the conversion coefficient registering means 19. As a result, when the operator finds out the most suitable operation procedure of his own in comparison with the actual operation results and further registers it in personal data recording means 20, it is possible for the operator to obtain the optimized operation environment of his own.

Further, although the domain registering means 15 defines the picture spaces conforming to the actual picture 8 and further allows the contents thereof to correspond to the output results of the encode means 14, it is possible to use the coordinate axes of abstract multi-dimensional spaces, instead of the picture spaces. The abstract multi-dimensional spaces can be applied to any cases, as far as the spaces are independent from each other or as far as a hierarchical structure is adopted, for instance, as with the case of unit of file, unit of directory, unit of media, etc.

FIGS. 17(A), 17(B) and 17(C) show another embodiment of the signal inputting apparatus according to the present invention, which is so constructed as to be gripped and operated by a single hand. Further, FIG. 17(A) is a front view; FIG. 17(B) is a top view (plane view); and FIG. 17(C) is a bottom view (back view) thereof. As shown in these drawings, the signal inputting apparatus is composed of a body 22, an operating portion 23 operated by fingers, and an infrared ray transmitting portion 24 for transmitting the operated results to an apparatus to be controlled by infrared rays transmitted therefrom.

The signal inputting apparatus is so constructed as to be operated by the operator who has it by a single hand. In more detail, the body 22 can be held by the four fingers (i.e., index, middle, third and little fingers) and the palm of the operator, and further operating portion 23 is operated by the thumb thereof. In the operating portion 23, a plurality of projection portions 25 are arranged in a circular arc shape when seen from above. In this signal inputting apparatus, when the thumb is moved front and rear and right and left, the two-directional position data can be inputted. Further, when the depression force is changed, another data can be inputted. In other words, three-dimensional signals can be inputted in the same way as explained with reference to FIGS. 3(A), 3(B) and 3(D). The signals are coded by a circuit similar to the encode means 14, and then transmitted to the apparatus to be controlled, as infrared rays, through the infrared ray transmitting portion 24. Therefore, the signal inputting apparatus as described above can be used, as it is, for a TV set as a remote commander.

Figure 18:
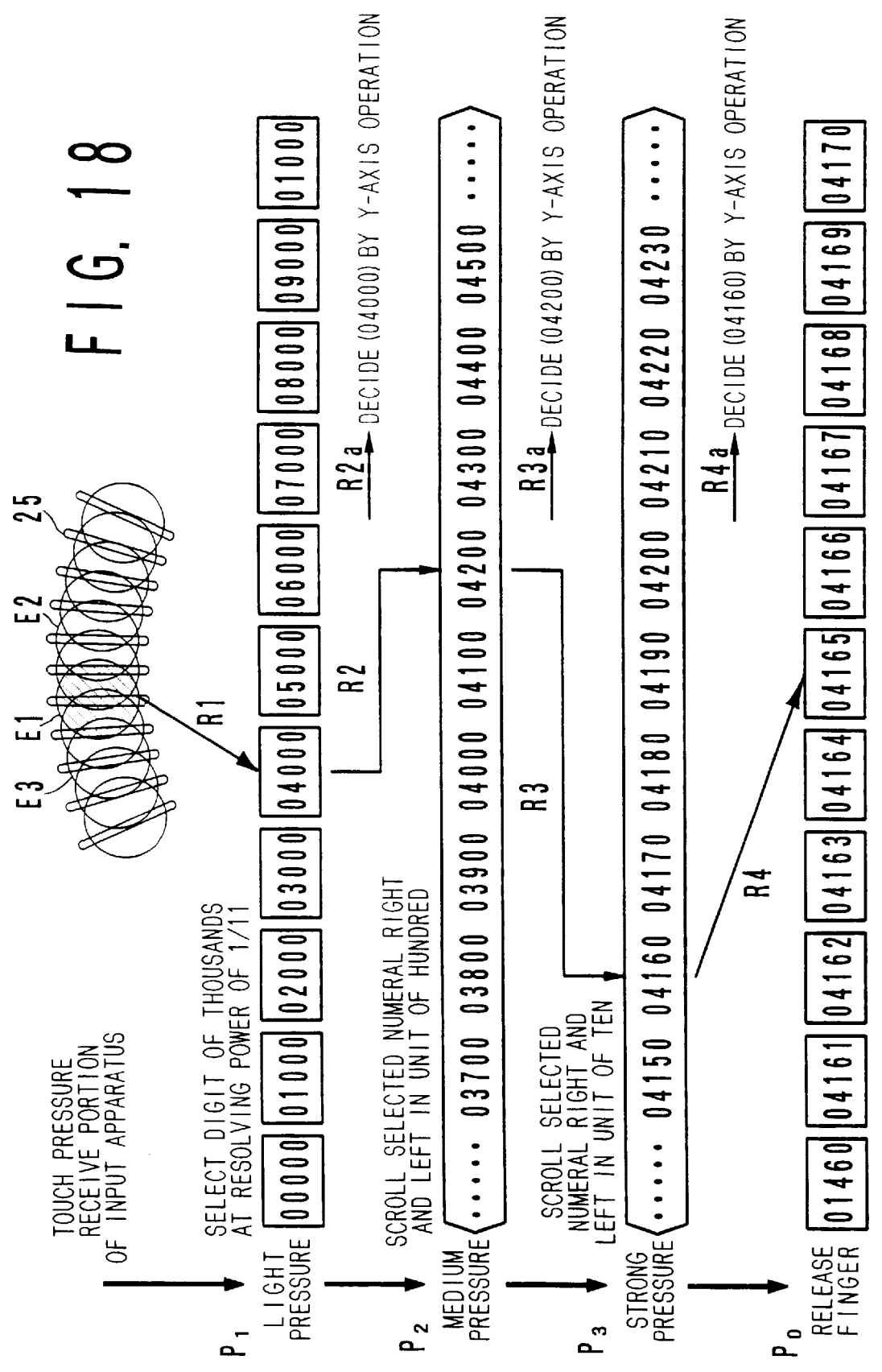

FIG. 18 in an illustration for assistance in explaining the functions of the signal inputting apparatus shown in FIGS. 17(A) to 17(C), in which some numerical values are used as practical input data.

First, each straight projection portion 25 of the operating portion 23 is assigned to each depression position data (x-axis data). Therefore, when a different projection portion 25 is depressed, the numerical value is increased or decreased. Further, data indicative of the magnitude of depression force (p-axis data) are assigned to data indicative of the number of digits (i.e., the resolving power). In other words, when the depression force is increased, the less significant digit can be selected; that is, the resolving power is increased. Further, y-axis data obtained when a depression force is applied to each projection portion 25 being moved in the front and rear direction are assigned to designate direct interruption commands, which can be used to decide the numerical values now selected or to switch the numerical range of data, for instance.

Here, four depression pressure such as light pressure $p_1$, medium pressure $p_2$, strong pressure $p_3$, no pressure $p_0$ (the fingers are released) are considered hereinbelow, separately.

When the operator depresses projection portion 25 by his finger at light pressure $p_1$ by moving his finger in the right and left direction (i.e., x-axis direction) and then stops his finger operation at a position $E_1$, a numerical value (one digit) indicative of only coarse resolving power is displayed. As a result, a numerical value (04000) can be obtained.

Further, when the finger depression force is increased to the medium pressure $p_2$ and the finger is moved in the right and left direction, a numerical value is increased or decreased to obtain a numerical value (two digits) indicative of a resolving power finer by one digit on the basis of the preceding numerical value. When his finger is stopped at a position $E_2$, two digits indicative of a resolving power one-digit finer than before is displayed. As a result, a numerical value (04200) can be obtained.

Further, when the finger depression force is increased to the strong pressure $p_3$ and the finger is moved in the right and left direction, a numerical value is increased or decreased to obtain a numerical value (three digits) indicative of a resolving power further finer by one digit on the basis of the preceding numerical value. When his finger is stopped at a position $E_3$, three digits indicative of a resolving power one-digit finer than before is displayed. As a result, a numerical value (04160) can be obtained.

Here, when the finger is released from the projection portion 25 and thereby the pressure is reduced down to $p_0$, the least significant digit can be displayed. As a result, a numerical value (04165) can be obtained.

In this case, although the numerical values are decided by way of R1, R2, R3 and R4 in FIG. 18, when the numerical value is required to be decided midway, the operator moves his finger at that moment in the front and rear direction. In other words, when the finger is moved in the y-axis direction, the numerical value can be decided as a coarse digit by way of R2a, R3a and R4a in FIG. 18, respectively.

The examples of the signal inputting apparatus as shown in FIGS. 17(A) to 17(C) and FIG. 18 are most suitable for browser operation such that electronic book is operated by such a sense as to turn over the leaves of an actual book; one of multi-media apparatus is selected on a picture; specific media data are selected by displaying a number of pictures at the same time; etc.

Figure 19:
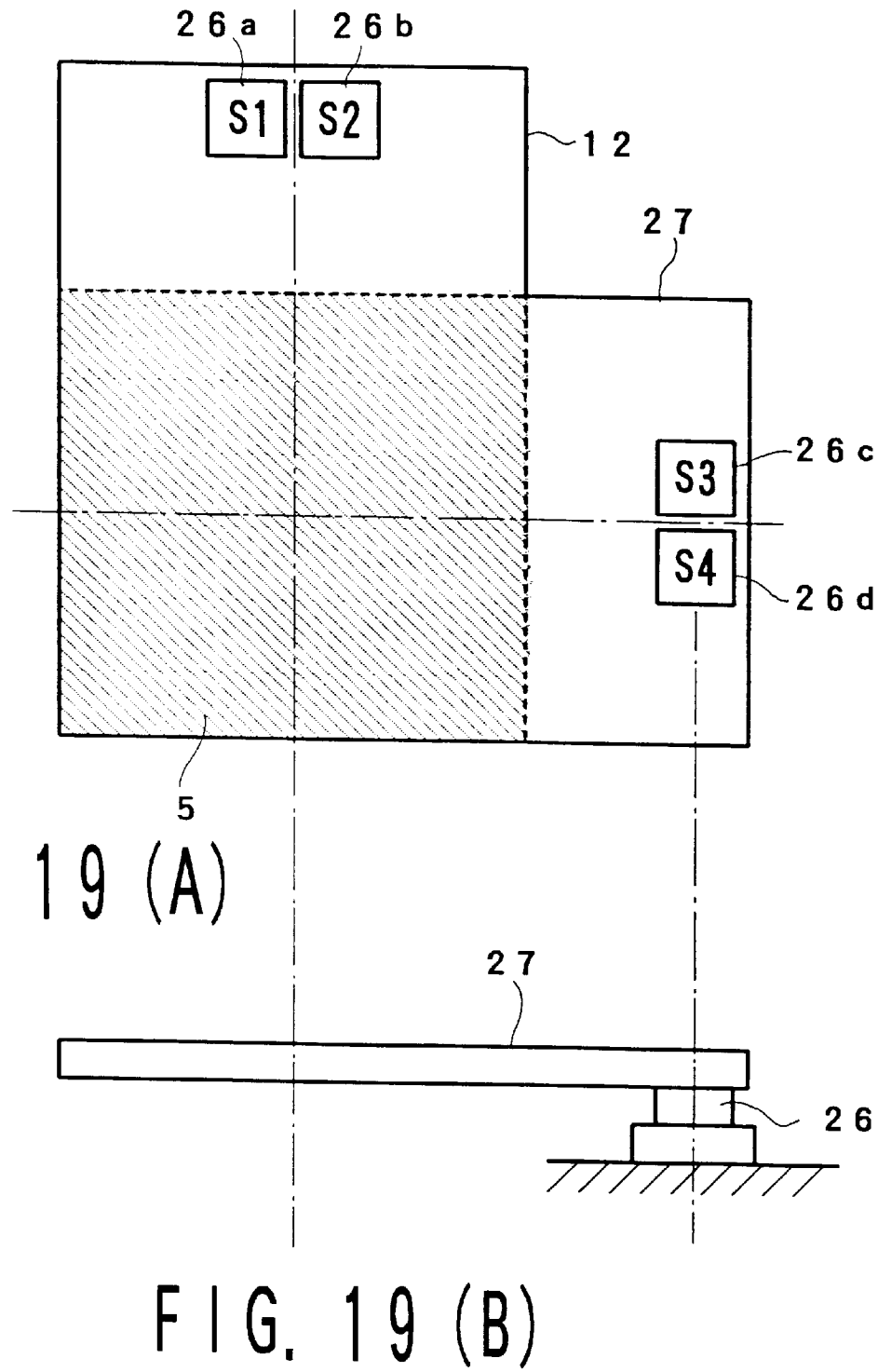
FIGS. 19(A) and 19(B) are a top view and a side view, each showing the construction of the pad-type input section 5 in FIG. 24.

Now, FIGS. 19(A) and 19(B) are a top view and a side view each for assistance in explaining an example of the constructions of the pad-type input section 5. As shown, a flat plate 27 is mounted on four sensors 26a, 26b, 26c and 26d, and the hatched portion is used as the pad-type input section 5 to which pressure is applied. Here, the four sensors 26a, 26b, 26c and 26d detect the depression force of the operator finger applied to the pad-type input section 5. In this case, the detected data are the position and the magnitude (pressure) of the depression force. Further, the detected data S1, S2, S3 and S4 of these sensors 26a, 26b, 26c and 26d are processed as explained with reference to FIG. 20.

In more detail, when a depression force having a magnitude of Nc is applied to a point Pc (Xc, Yc) on the plate 27, the direction 31 from the two sensors 26a and 26b to the pressure point Pc, that is, an angle θ2 of a line extending from the pressure point Pc to a middle point Pf between the two sensors 26a and 26b with respect to the horizontal line can be calculated on the basis of the output values of the two sensors 26a and 26b.

In the same way, the direction 32 from the two sensors 26c and 26d to the pressure point Pc, that is, an angle θ3 of a line extending from the pressure point Pc to a middle point Pg between the two sensors 26c and 26d with respect to the horizontal line can be calculated on the basis of the output values of the two sensors 26c and 26d.

Therefore, when the two angles θ2 and θ3 are calculated, it is possible to obtain the coordinates of the pressure point Pc on the pad-type inputting section 5. Further, the magnitude of the applied pressure can be obtained by the sum total of the absolute values of the depression force detected by the four sensors 26a, 26b, 26c and 26d.

Figure 20:
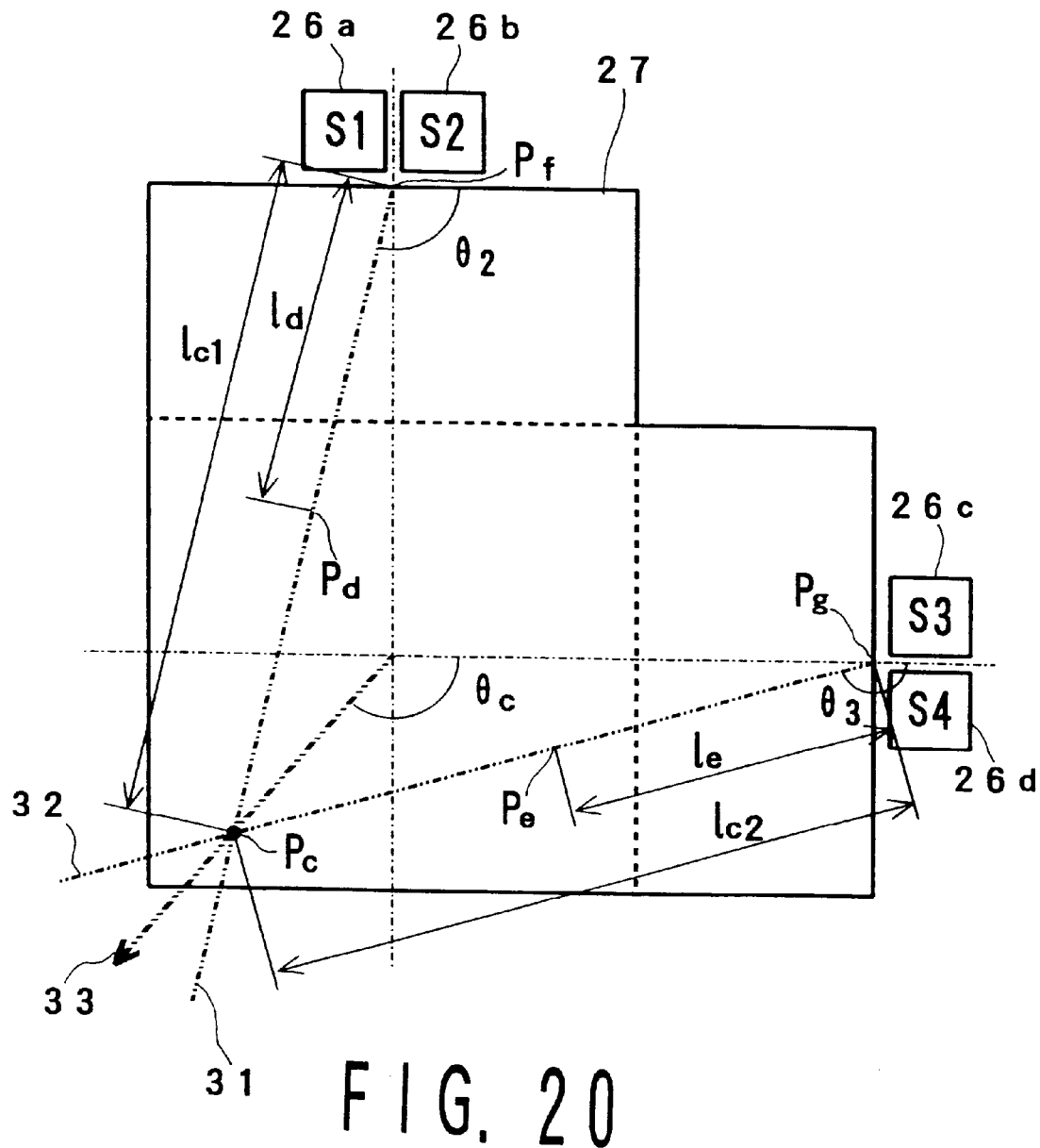
FIG. 20 is an illustration showing the input data processing of the pad-type input section 5 in FIG. 24.
Figure 21:
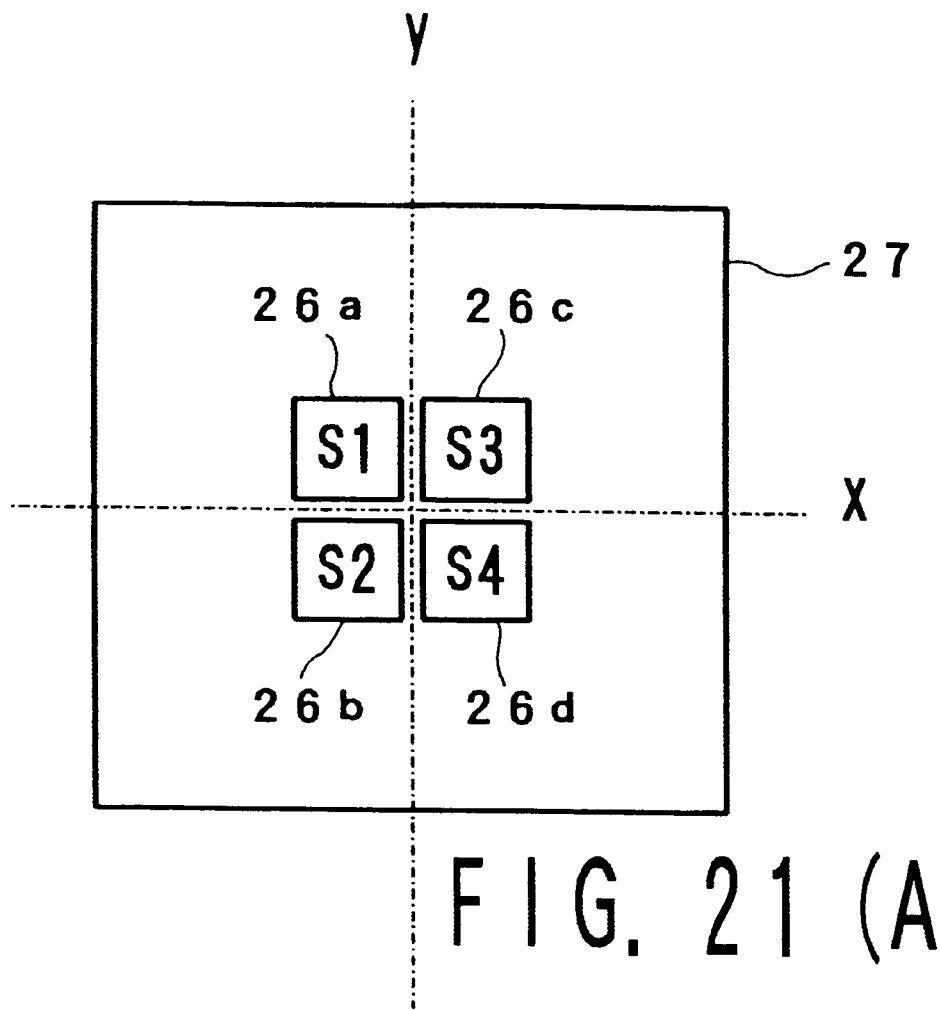
FIGS. 21(A) and 21(B) are a top view and a side view, each showing the construction of the pad-type input section which cannot detect the pressure point at a high precision.
Figure 21:
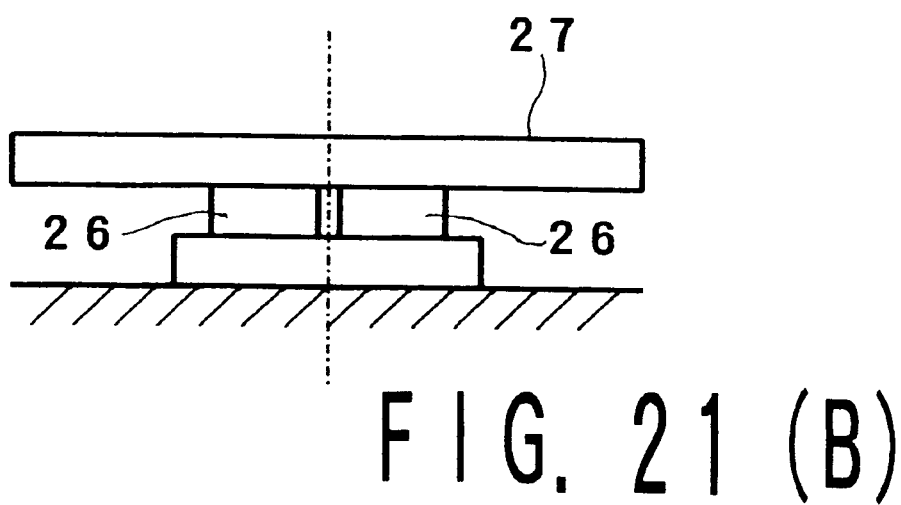
Figure 22:
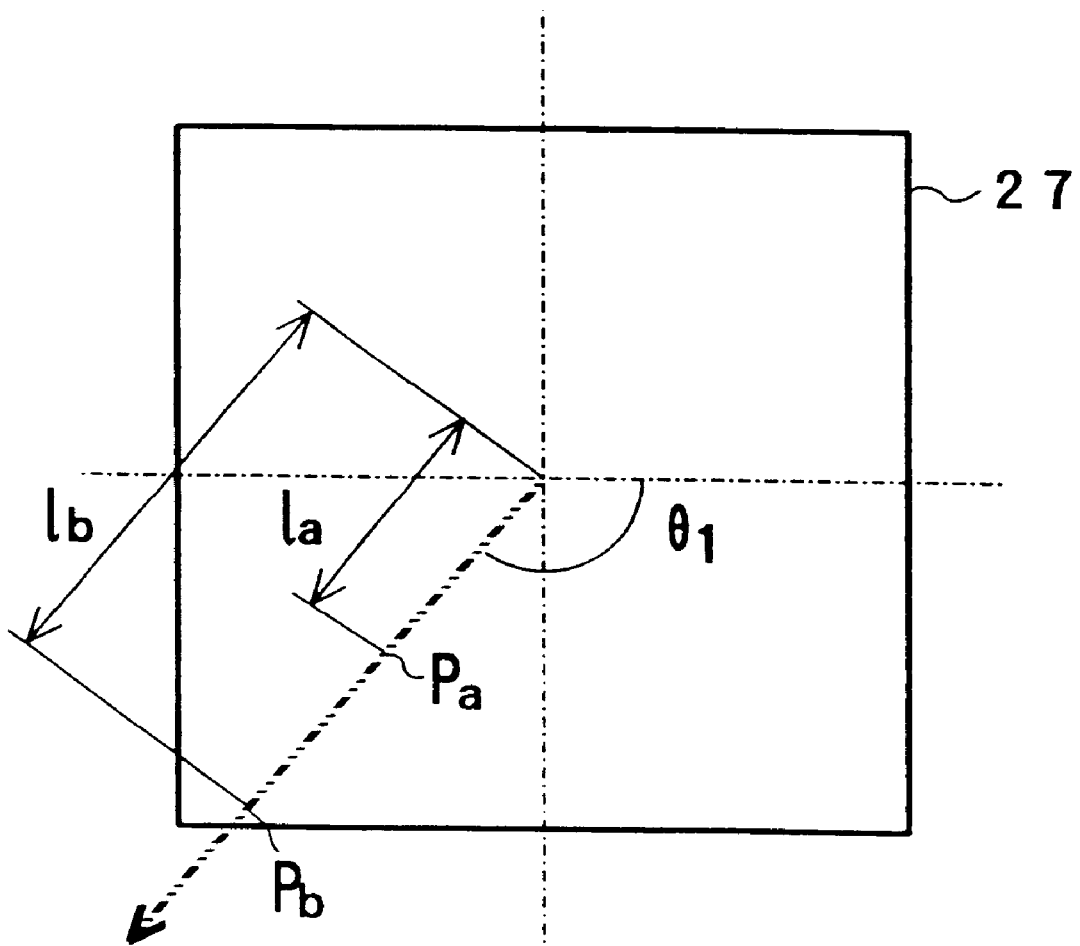
FIG. 22 is an illustration showing the input data processing of the case shown in FIG. 21(A) to 21(C)

Here, since the middle points Pf between the two sensors 26a and 26b and the middle point Pg between the two sensors 26c and 26d are arranged at two different positions, respectively in FIG. 20, it is possible to obtain a precise coordinate position of the pressure point. On the other hand, when the middle points of these four sensors 26a, 26b, 26c and 26d are concentrated at a point, it is impossible to obtain a precise coordinate position of the pressure point. The reason will be explained hereinbelow:

For instance, when the pad-type inputting section 5 is constructed by arranging four sensors 26a, 26b, 26c and 26d at a central position of the plate 27, as shown in FIGS. 21(A) and 21(B), the direction from the central point of the four sensors 26a, 26b, 26c and 26d to the pressure point Pb, that is, an angle θ1 of a line extending from the pressure point Pb to the central point with respect to the horizontal line can be obtained in every direction, as shown in FIG. 22. Further, the distance 1b between the pressure point Pb and the central point can be obtained as follows: first the outputs of the four sensors 26a, 26b, 26c and 26d are converted into X-axis component and Y-axis component, respectively as follow:

$$X = S3 + S4 - S1 - S2$$

$$Y = S1 + S3 - S2 - S4$$

Further, after that, the respective resultant force is divided by the sum total of the sensor outputs as follows:

$$1b = (X_2, Y_2)/(|S1| + |S2| + |S3| + |S4|)$$

Further, when the pressure point Pa is shifted to another pressure point Pa, the angle θ1 and the distance 1a can be obtained in the same way as above.

In general however, since an elastic junction member (e.g., elastic rubber, a spring, etc.) is interposed between the four sensors 26a, 26b, 26c and 26d and the plate 27 disposed over the sensors, when the junction member is deformed, there exists a possibility that the above-mentioned equation cannot be established.

In other words, when the central point is dislocated due to the deformation of the junction member, there exists a possibility that the fulcrum relative to the pressure point is dislodged. On the other hand, it is impossible to deny the presence of an uncertainty of the calculated distance 1b due to the non-linearity of the junction member. In particular, at a point far from the central arrangement point of the four sensors 26a, 26b, 26c and 26d, the influence of the non-linearity of the junction member is large. As a result, the precision of the obtained distance data deteriorates in comparison with the angular data.

To overcome this problem, in the sensor arrangement as shown in FIGS. 19(A) and 19(B), since the coordinate position of the pressure point Pc can be calculated on the basis of only the angular data, it is possible to improve the detection precision.

Further, in this case, the arrangement angle of 90 degrees is not necessarily required for the four sensors 26a, 26b, 26c and 26d. That is, the middle arrangement point Pf between the two sensors 26a and 26b is required to be different from that Pg between the two sensors 26c and 26d in such a way that the two middle arrangement points Pf and Pg are arranged at a predetermined constant angle.

Figure 23:
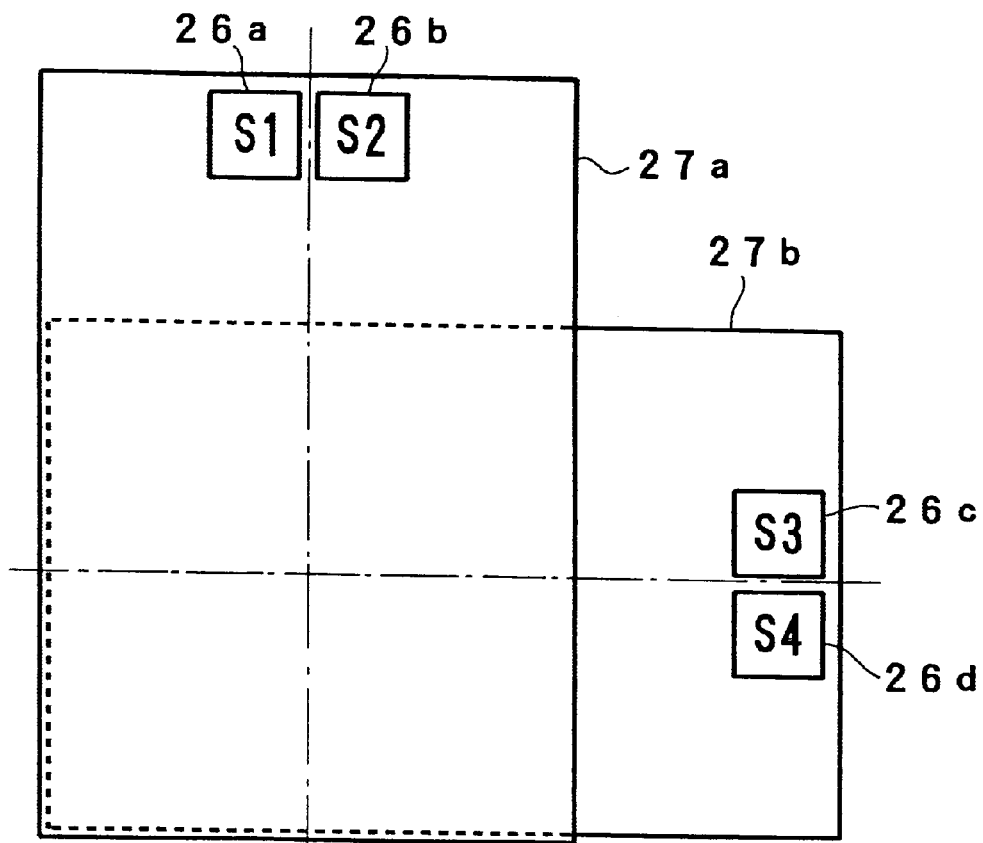
FIGS. 23(A) and 23(B) are a top view and a side view, each showing another construction of the pad-type input section 5.
Figure 23:
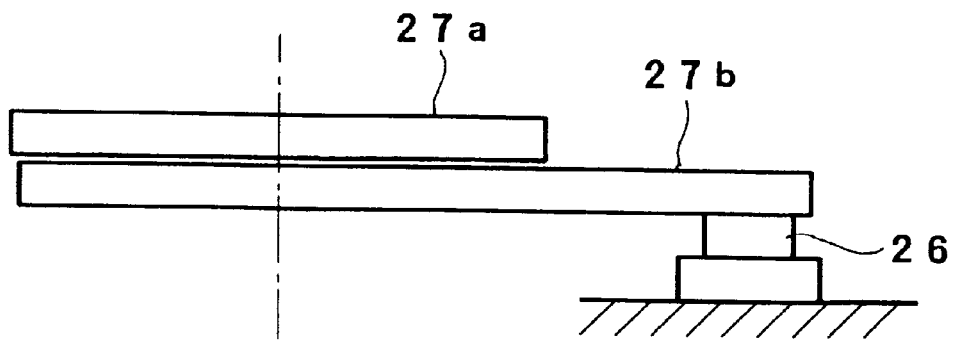
Figure 24:
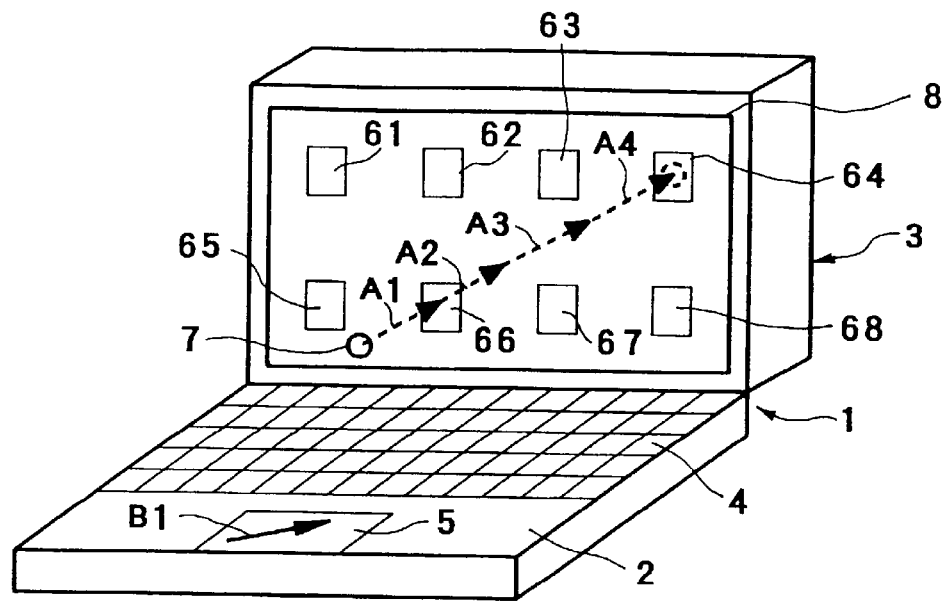
FIG. 24 is a perspective view showing a first prior art example of the signal inputting apparatus.
Figure 25:
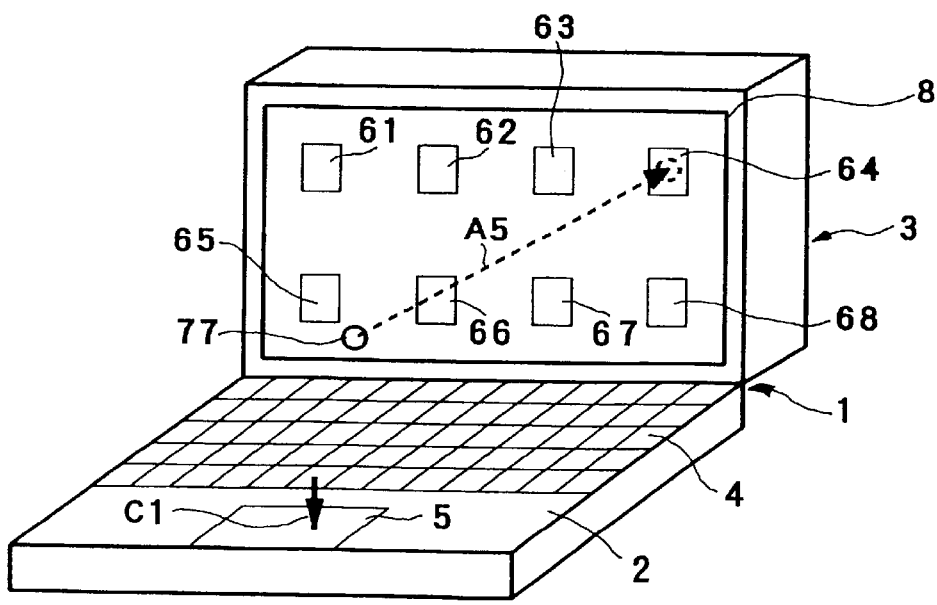
FIG. 25 is a perspective view showing an example of the pointer movement.
Figure 26:
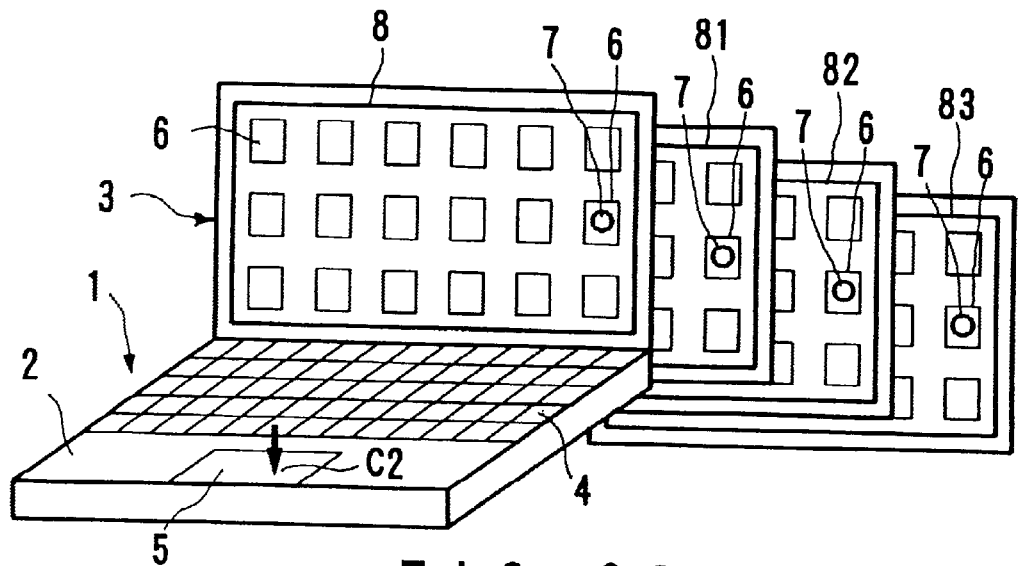
FIG. 26 is a perspective view showing a second prior art example of the signal inputting apparatus.
Figure 27:
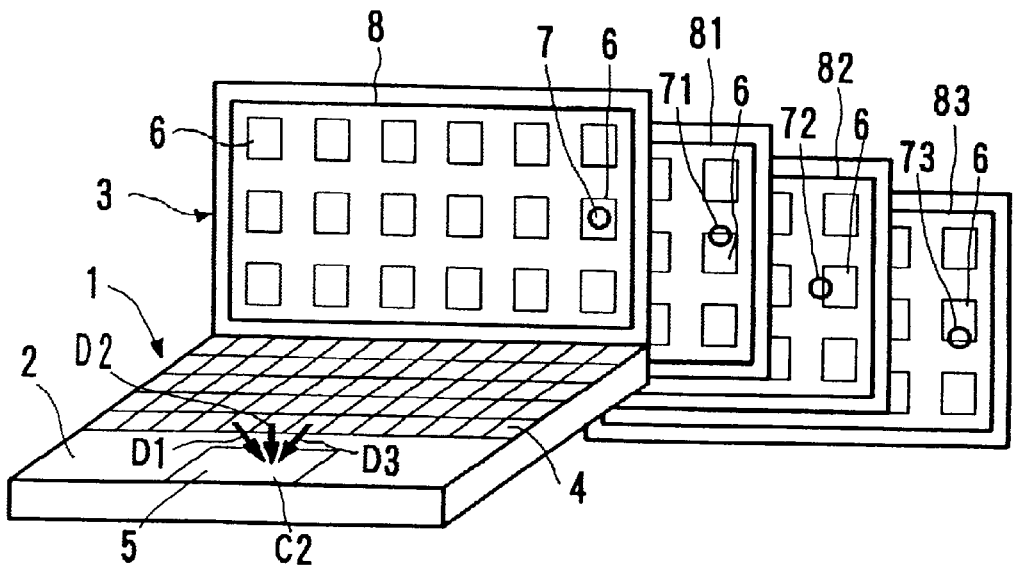
FIG. 27 is a perspective view for assistance in explaining the input status by the second prior art example of the signal inputting apparatus shown in FIG. 26.

Further, in the pad-type inputting apparatus shown in FIGS. 19(A) and 19(B), although only a single plate 27 is used for two pairs of the sensors 26a, 26b and 26c, 26d, it is of course possible to obtain the same effect even when a plate 27a is arranged for a pair of the sensors 26a and 26b and another plate 27b is arranged for another pair of the sensors 26c and 26d, separately, as shown in FIGS. 23(A) and 23(B).

Figure 28:
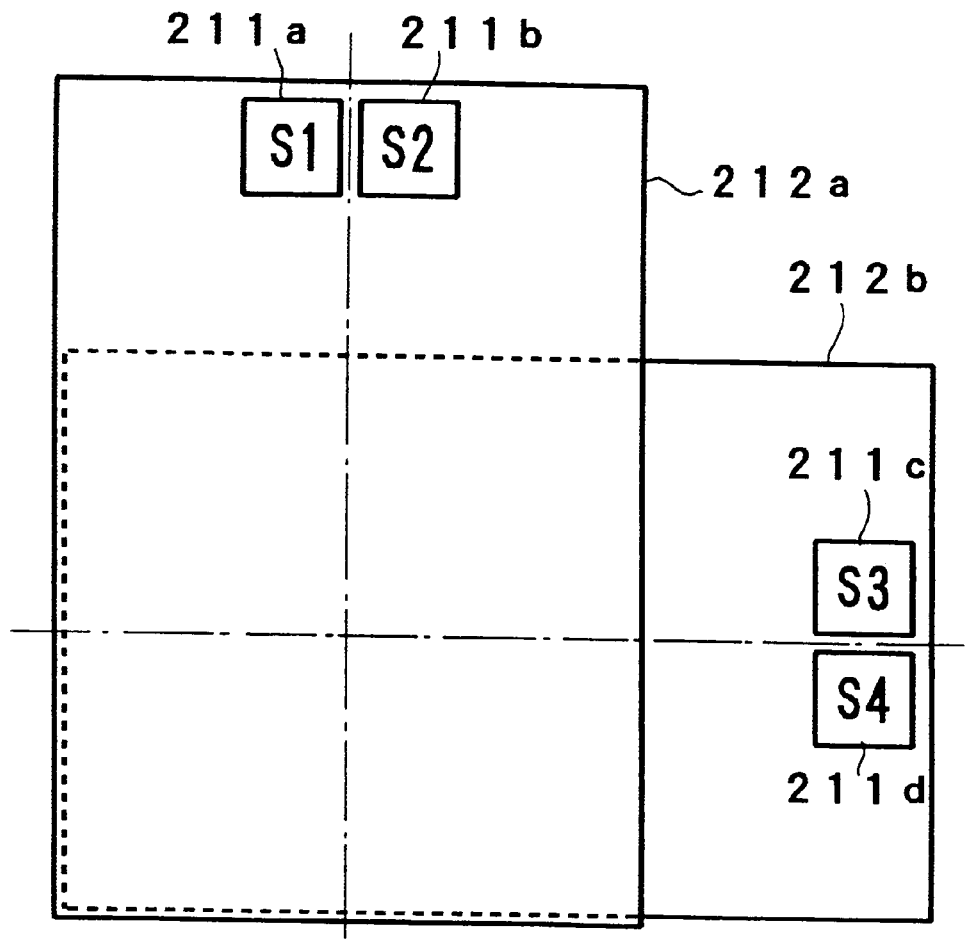
FIGS. 28(A) and 28(B) are a plane view and a side view, each showing an example of the force-electricity transducing apparatus according to the present invention.
Figure 28:
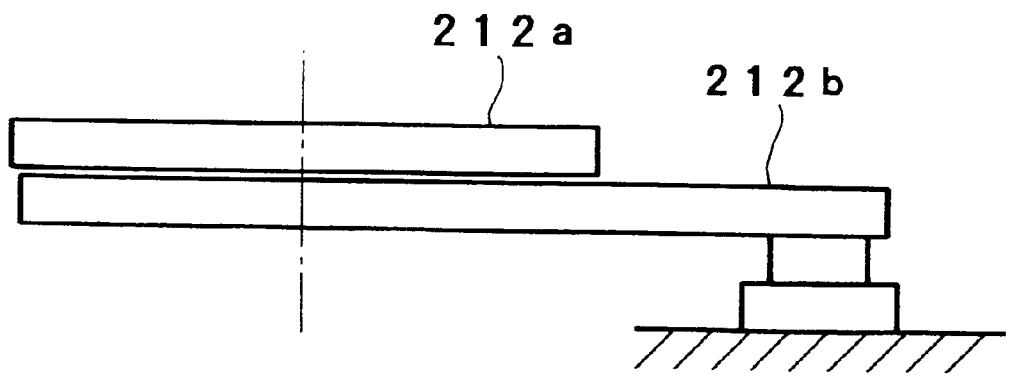

FIGS. 28(A) and 28(B) show an embodiment of the force-electricity converting apparatus (i.e., input data detecting device) according to the present invention. In this embodiment, four pressure sensitive sensors 211a to 211d for detecting four depression forces are divided into two pairs, and each pair is mounted on two different plates 212a and 212b to each of which a depression force is applied as input data, respectively. Here, the plate 212a or 212b is coupled to each pair of pressure sensitive sensors 211a, 211b or 211c, 211d via an elastic member (e.g., an elastic rubber, spring, etc.), respectively. Further, the plate 212a to which the two pressure sensitive sensors 211a and 211b are coupled and the plate 212b to which the two pressure sensitive sensors 211c and 211d are coupled are arranged so as to be overlapped each other.

Here, with reference to FIG. 29, a procedure for detecting the position and the magnitude of depression force applied as input data will be explained hereinbelow. Now, when a pressure of Nc is assumed to be applied to a pressure point Pc (Xc, Yc) on the plate 221, a direction 231 from the two pressure sensitive sensors 222a and 222b to the pressure point Pc, that is, an angle θ2 of a line extending from a middle point Pf of the two pressure sensitive sensors 222a and 222b to the pressure point Pc with respect to the X-axis direction can be calculated on the basis of the output values of the two pressure sensitive sensors 222a and 222b. In the same way, a direction 232 from the two pressure sensitive sensors 222c and 222d to the pressure point Pc, that is, an angle θ3 of a line extending from a middle point Pg of the two pressure sensitive sensors 222c and 222d to the pressure point Pc with respect to the X-axis direction can be calculated on the basis of the output values of the two pressure sensitive sensors 222c and 222d. When the two data areas are calculated, it is possible to obtain the coordinates of the pressure point Pc on the plate 221. Further, it is possible to obtain the magnitude of the input pressure on the basis of the sum total of the absolute output values of the four pressure sensitive sensors 222a to 222d.

Figure 29:
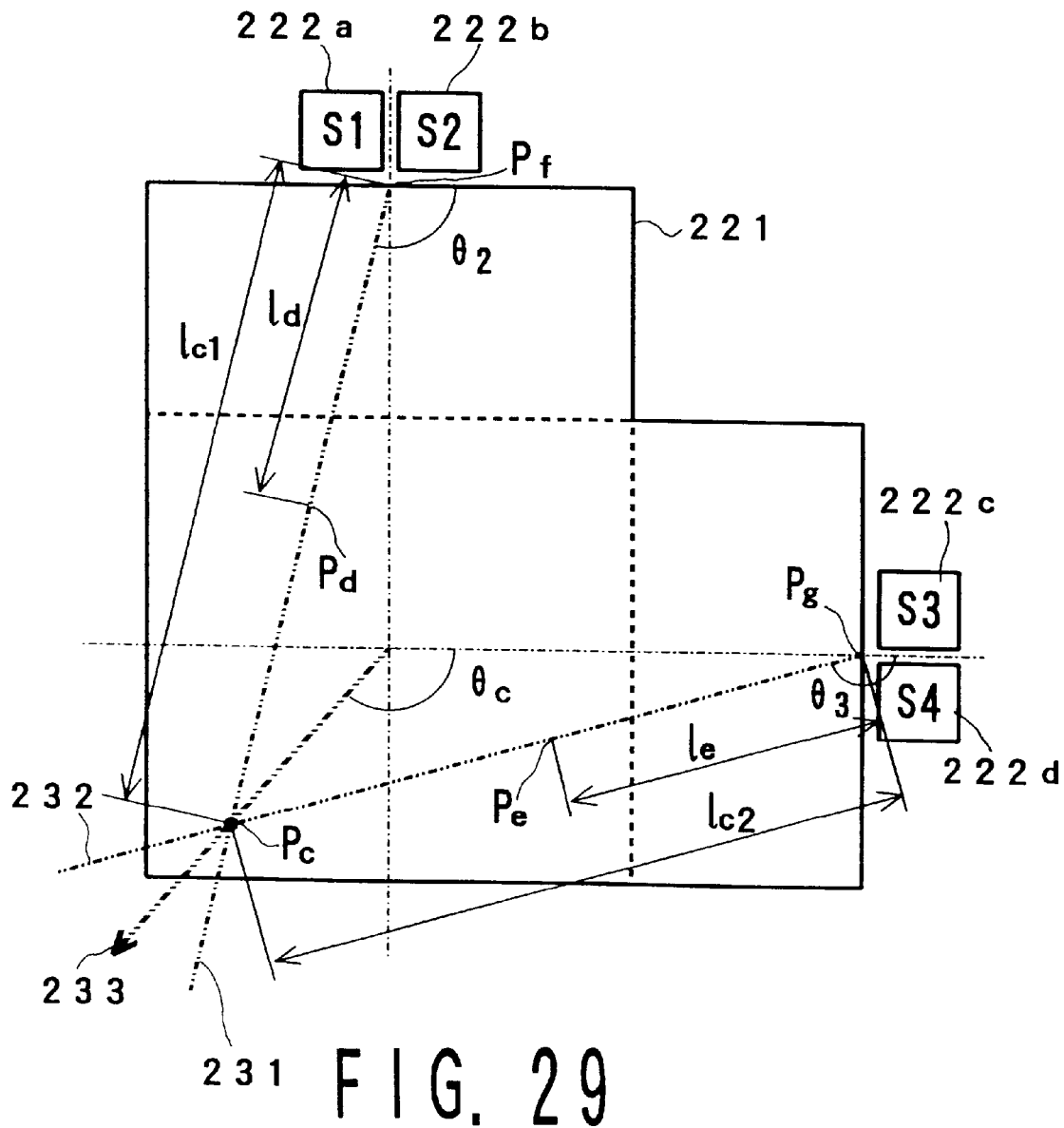
FIG. 29 is an illustration showing the detection procedure of the device shown in FIG. 28.
Figure 31:
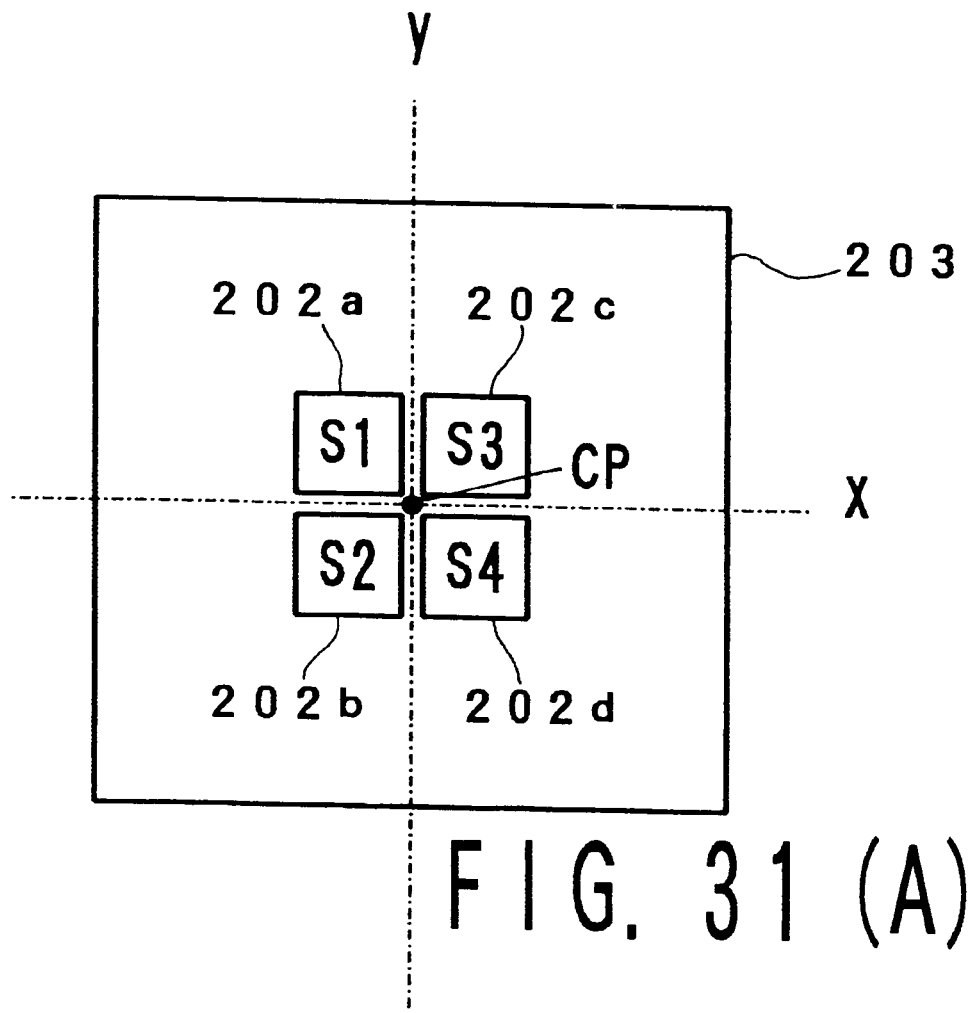
FIGS. 31(A) and 31(B) are a plane view and a side view, each showing an arrangement example of the pressure sensitive sensors which cannot detect the pressure point at a high precision.
Figure 31:
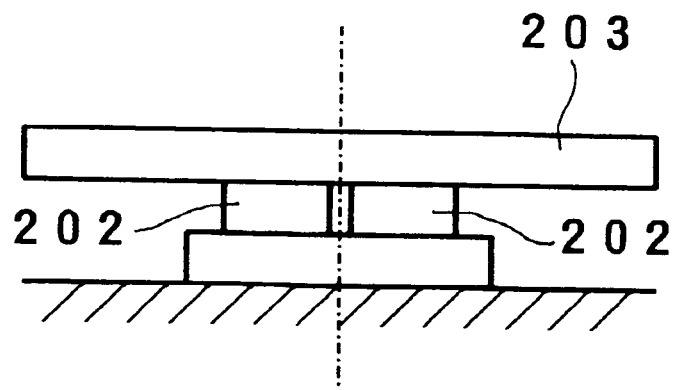
Figure 32:
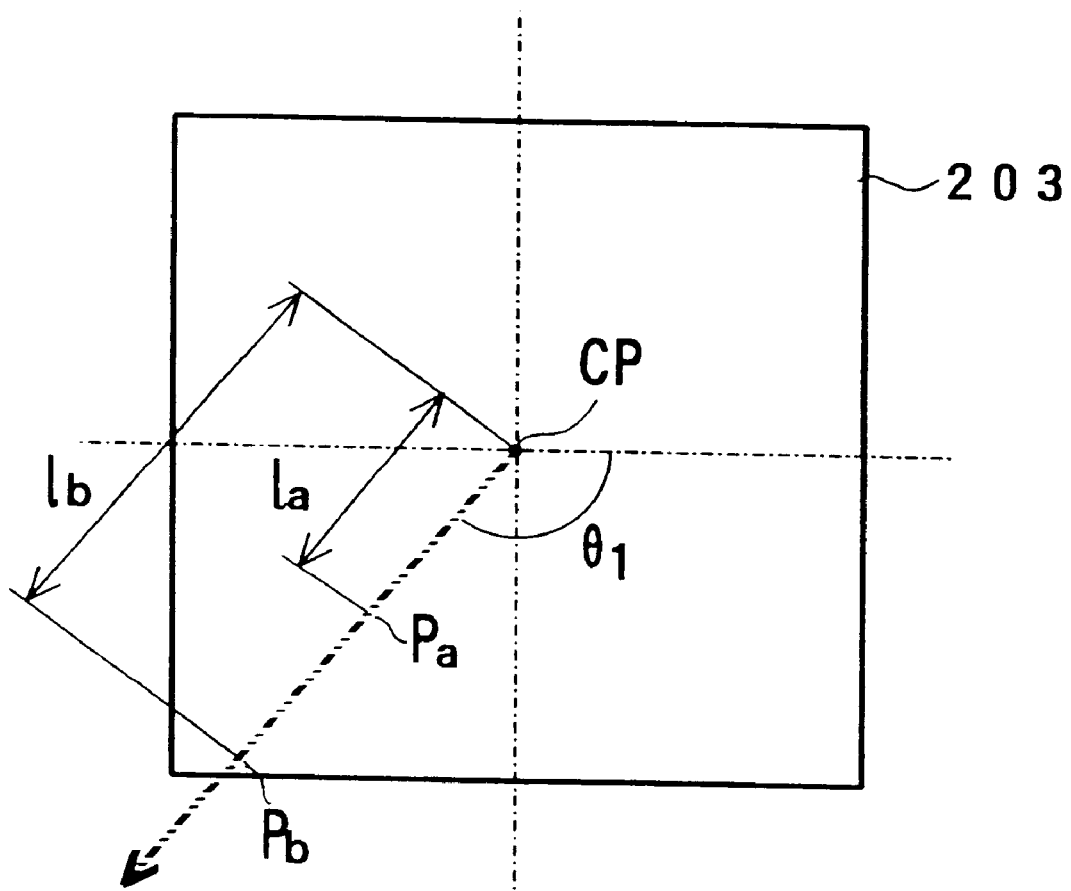
FIG. 32 is an illustration for assistance in explaining the operation of an arrangement example of the pressure sensitive sensors which cannot detect the pressure point at a high precision.

As described above, the coordinate position of the pressure point Pc can be obtained precisely by dividing the middle point Pf between the two pressure sensitive sensor pair 222a and 222b and the middle point Pg between the two pressure sensitive sensor pairs 222c and 222d into two different positions separately as shown in FIG. 29. On the other hand, when the two middle points Pf and Pg of the four sensors 26a, 26b, 26c and 26d are concentrated at a point, it is impossible to obtain the coordinate position of the pressure point Pc precisely. The reason is as follows:

For instance, the four pressure sensitive sensors 202a, 202b, 202c and 202d are assumed to be arranged at central position of a plate 203 as shown in FIGS. 31(A) and 31(B). In this case, as shown in FIG. 32, the direction from the central arrangement point of the four pressure sensitive sensors 202a to 202d to the pressure point Pb, that is, an angle θ1 of a line extending from the central point CP to the pressure point Pb can be obtained in every direction. Further, a distance 1b between the pressure point Pb and the central point CP can be obtained as follows: First, the outputs of the four pressure sensitive sensors 202a to 202d are converted into X-axis component and Y-axis component, respectively as follow:

X-axis component: $X = S3 + S4 - S1 - S2$

Y-axis component: $Y = S1 + S3 - S2 - S4$ where S1 to S4 denote the output value of the pressure sensitive sensors 202a to 202d, respectively.

Further, after that, the respective resultant forces are divided by the sum total of the pressure forces, respectively as follows:

$1b = (X_2 + Y_2)/(|S1| + |S2| + |S3| + |S4|)$

Further, when the pressure point Pb is shifted to another pressure point Pa, the angle θ1 and the distance 1a can be both obtained in the same way as above.

In general, however, since an elastic junction member (e.g., elastic rubber, a spring, etc.) is interposed between the four pressure sensitive sensors 202a to 202d and the plate 203 disposed over the sensors, when the elastic junction member is deformed, there exists an uncertainty of the calculation of the distance 1b, due to the dislocation of the mechanical fulcrum of the pressure point Pb relative to the central point CP or the non-linearity of the junction member deformation. In particular, when the distance between the central arrangement point CP of the sensors 202a to 202d is far from the pressure point Pb, the influence thereof is large. As a result, the precision of the obtained distance data deteriorates in comparison with the angular data.

In the present embodiment, however, since the coordinate position is calculated on the basis of only the angular data, the detection precision can be improved. Further, in this case, the arrangement angle of 90 degrees is not necessarily required for the middle points of these two sensors pairs. That is, the middle arrangement point Pf between the two sensors 222a and 222b is required to be different from that Pg between the other two sensors 222c and 222d in such a way that the two middle arrangement points Pf and Pg are arranged at two different positions at a predetermined constant angle.

Figure 30:
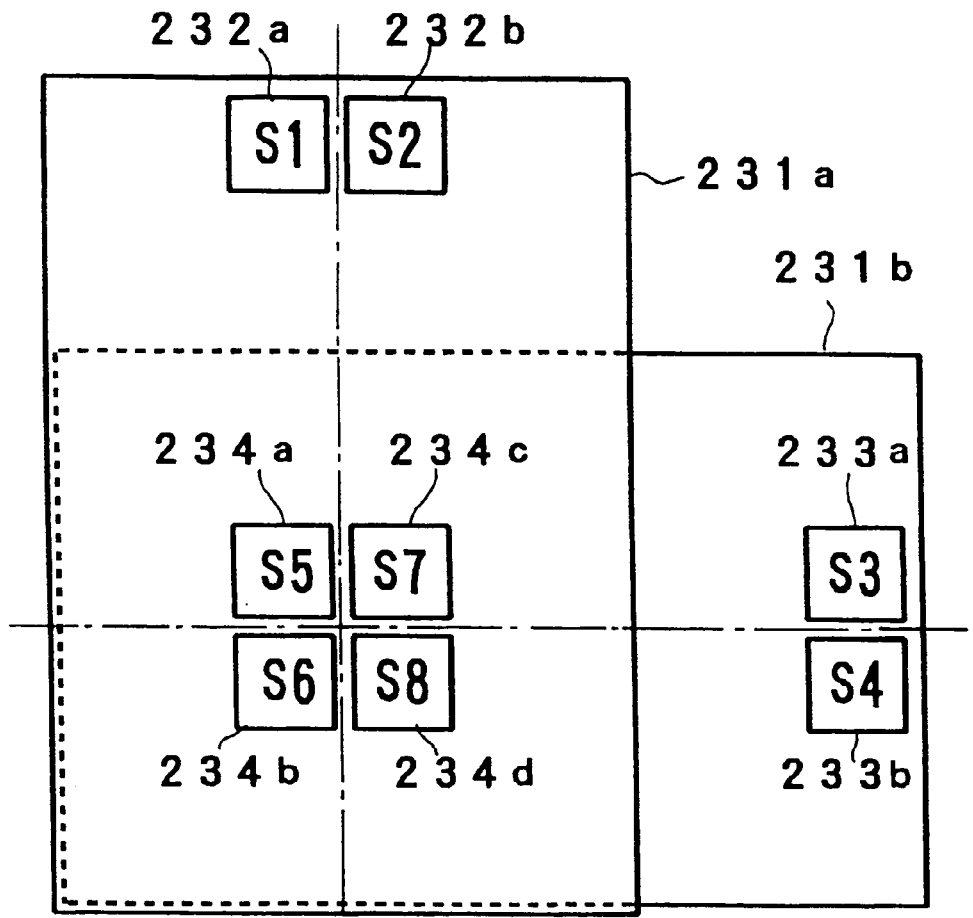
FIGS. 30(A) and 30(B) are a plane view and a side view, each showing another example of the force-electricity transducing apparatus according to the present invention.
Figure 30:
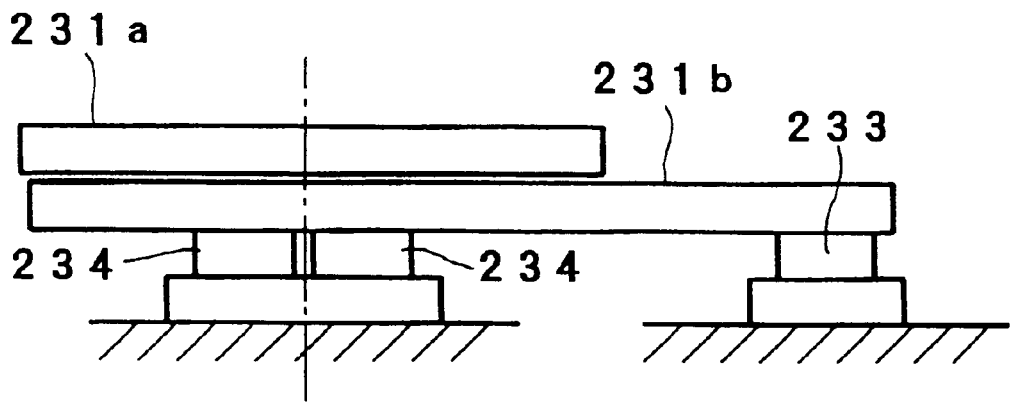

Another construction of the force-electricity converting apparatus according to the present invention will be described hereinbelow with reference to FIGS. 30(A) and 30(B), in which the sensors are composed of two pairs of pressure sensitive sensors 232a, 232b and 233a, 233b attached on each end of two plates 231a and 231b, respectively and additionally four (2×2 matrix) pressure sensitive sensors 234a to 234d arranged at a central point of the overlapped portion of the two plates 231a and 231b. In the construction as described above, it is possible to increase the detection precision.

Figure 33:
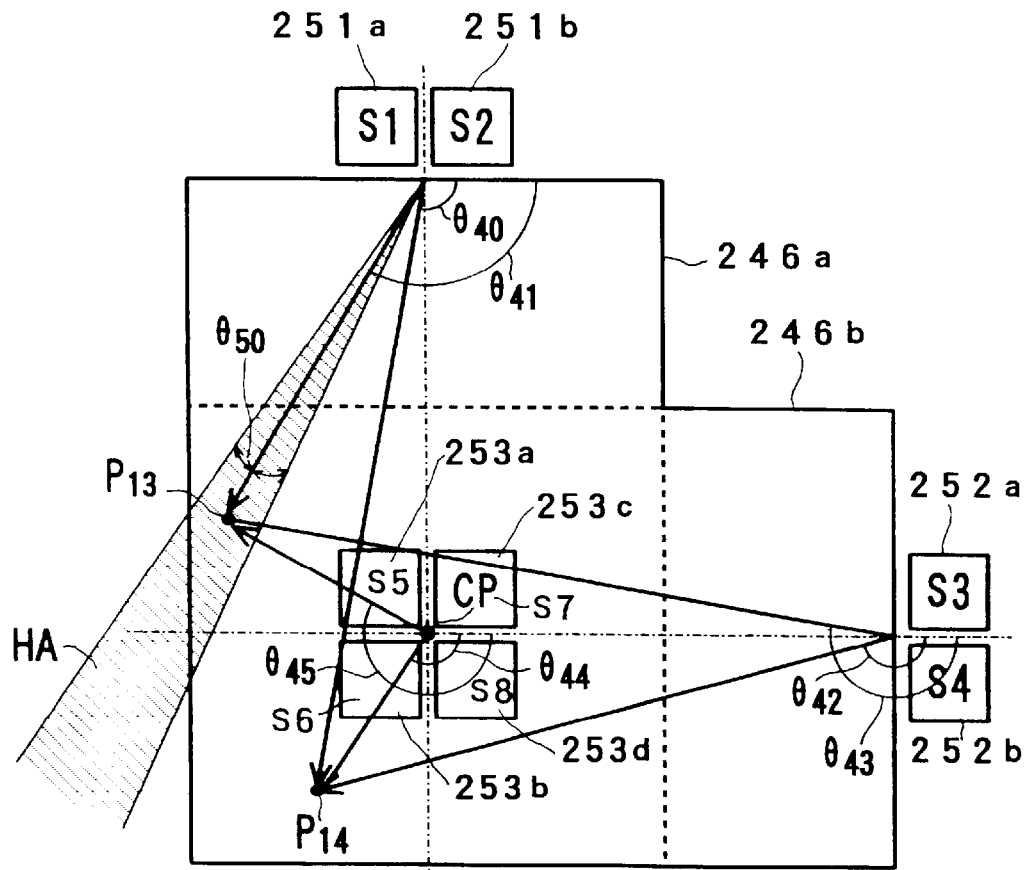
FIG. 33 is an illustration showing the procedure of detecting input data according to the present invention.

With reference to FIG. 33, the procedure of detecting the input data will be described hereinbelow. Now, input data are assumed to be applied at a point P13 on the two plates 246a and 246b. In this case, the angular data obtained by the two pressure sensitive sensors 251a and 251b have a constant angular error θ50 according to the resolving power of the two sensors 251a and 251b. The hatched portion shown in FIG. 33 denotes a range HA in which the input coordinate position is predicted on the basis of the angular data obtained by the pressure sensitive sensors 251a and 251b. When the pressure sensitive sensors of the same resolving power are used, the angular error is proportional to the distance from the central point CP of the pressure sensitive sensors. Therefore, in this embodiment, the input coordinate position is detected on the basis of three sensor values in total, that is, two values of the two pairs of pressure sensitive sensors 251$a$, 251$b$ and 252$a$, 252$b$ arranged on each end of the two plates 246$a$ and 246$b$, respectively and one value of the matrix-arranged pressure sensitive sensor set 253$a$ to 253$d$ arranged at the central point. In this case, the method of detecting the input coordinate position is as follows:

The value obtained by the matrix-arranged pressure sensitive sensors 253$a$ to 253$d$ arranged at the central point is considered as being the most precise data. Further, a center of the coordinate position obtained by the pressure sensitive sensors 253$a$ to 253$d$ and the coordinate positions obtained by the two pressure sensitive sensor pairs 251$a$, 251$b$ and 252$a$, 252$b$ is determined as the input coordinate position. In this method, when the data input position changes from a coordinate position P13 to another coordinate position P14, for instance, it is possible to detect the position data more precisely.

Figure 34:
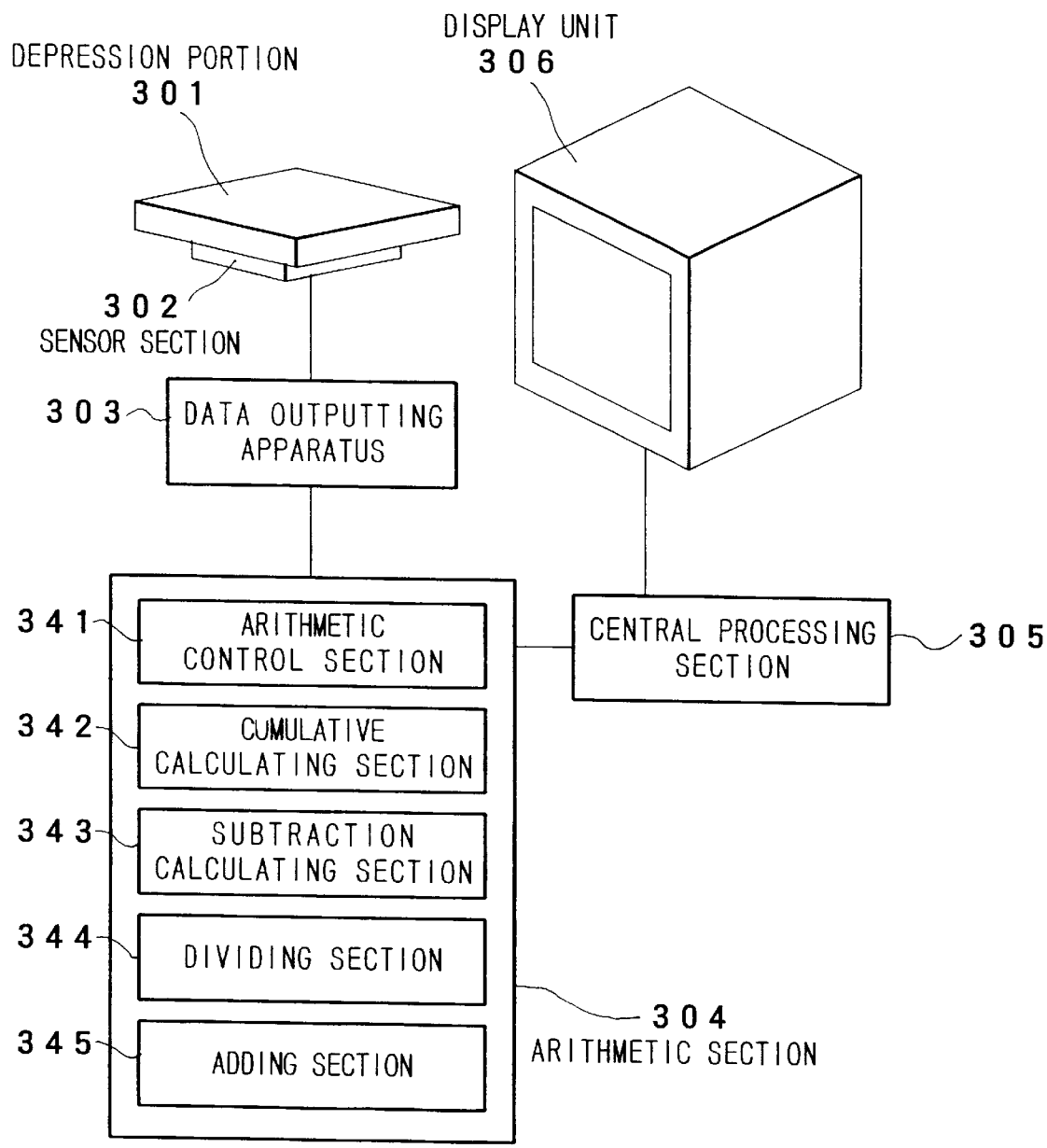
FIG. 34 is an example of the signal inputting apparatus according to the present invention.

Still another embodiment of the signal inputting apparatus according to the present invention will be described hereinbelow with reference to FIG. 34. In FIG. 34, a depression portion 301 is a plane having an area or a group of dots or lines arranged in two dimensions or a virtual surface formed by a group of lines arranged in one dimension. A sensor section 302 outputs signals corresponding to the depression force applied to the depression portion 301. An data outputting apparatus 303 outputs data indicative of the position and the magnitude of the depression force on the basis of the signals outputted by the sensor section 302. The signal conversion method will be described in detail later. This data outputting apparatus 303 can receive a mode setting signal from another sensor section (not shown) and outputs this mode setting signal as a switch signal.

An arithmetic section 304 decides the operation intended by the operator who applies a depression force, on the basis of the magnitude and the position of depression force outputted by the data outputting apparatus 303. Further, the arithmetic section 304 changes over switches or displays the decided results or the designated position as a cursor position on the display unit 306 on the basis of the decided operation results.

A central processing section 305 processes data on the basis of the signals given by the arithmetic section 304, and displays the processed results as a picture. Further, the central processing section 305 receives data from other signal inputting apparatus or transmits data to other signal outputting apparatus.

Further, a display unit 306 displays a picture in accordance with the central processing section 305. Here, the arithmetic section 304 is composed of at least an arithmetic control section 341, a cumulative calculating section 342, a subtract calculating section 343, a dividing section 344, and an adding section 345.

The arithmetic control section 341 controls the cumulative calculating section 342, the subtract calculating section 343, the dividing section 344, and the adding section 345, so that arithmetic operation can be executed appropriately at regular time intervals.

The cumulative calculating section 342 calculates the accumulative value according to the magnitude and the position of the inputted depression force, and outputs the calculated results. The subtraction calculating section 343 subtracts data in such a way that a predetermined absolute value of accumulative calculation result can be reduced, and outputs the subtracted result. The dividing section 344 divides the output of the substraction calculating section 343 by a predetermined value, and outputs the divided result. The addition calculating section 345 adds the output of the dividing section 344 to the current designated position, to obtain an updated designated position (cursor).

Figure 35:
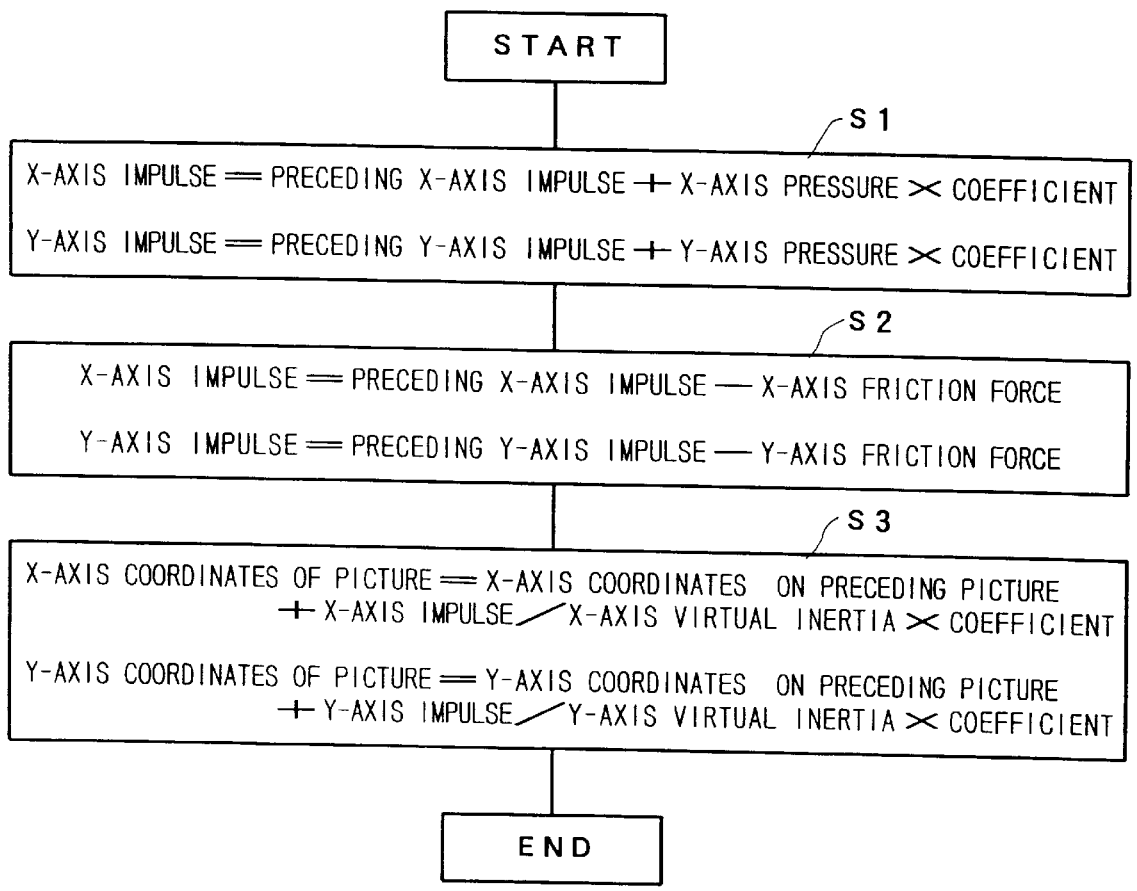
FIG. 35 is a flowchart showing the operation of the signal inputting apparatus shown in FIG. 34.

The operation of the input inputting apparatus shown in FIG. 34 will be explained hereinbelow with reference to a flowchart shown in FIG. 35.

In step S1, an X-axis impulse and a Y-axis impulse are obtained. That is, the values corresponding to the magnitude and the position of the inputted depression force are calculated accumulatively for each predetermined time in each of the X and Y directions. This step is executed by calculating two impulses of the depression force given to a virtual inertia assumed at the designated position in both the X and Y directions.

Further, in step S2, a predetermined value is subtracted from the accumulative calculation result in each of X- and Y-axis directions. This step is executed because a frictional force (a resistive force) is applied to the virtual inertia. Here, a value indicative of the virtual friction force (both in the X-axis friction force and Y- axis friction force) is always positive, so that the friction force is always applied in a direction that the absolute value of the impulse is reduced. After that, in step S3, when the obtained impulse is divided by a virtual inertia in both the X- and Y-axis directions, it is possible to obtain a value corresponding to speed, in each direction. Therefore, when the obtained value is converted to the preceding designated position for each predetermined time, it is possible to obtain a new designated position in sequence. Further, the friction force will not exceed the impulse, so that an object is never moved in an opposite direction by a friction force.

By the above-mentioned calculations, it possible to represent such a virtual reality that the designated position having a virtual inertia obtains an impulse by the depression force applied to the depression section 301 and thereby moves being decelerated by a friction force in both the X- and Y-directions.

Still another embodiment of the signal inputting apparatus according to the present invention will be described hereinbelow with reference to FIG. 36, in which the same reference numerals have been retained for similar elements or sections having the same functions as with the case of the signal inputting apparatus shown in FIG. 34. Here, since the feature of this embodiment resides in the operation of the arithmetic section 304A, only the arithmetic section 304A will be described in detail hereinbelow.

The arithmetic section 304A is composed of at least a mode deciding section 346 and a designated position calculating section 347.

The mode deciding section 346 decides any one of three input modes A, B and C. That is, when the depression position changes largely; the depression force is small; and the depression force magnitude changes largely, the input mode is decided as mode A (relative position input mode). Further, when the depression position changes small; the depression force is large; and the depression force magnitude changes small, the input mode is decided as mode B (absolute position input mode). Further, when the depression position changes large; the depression force is large or small; and the depression force magnitude changes large, the input mode is decided as mode C (virtual inertia input mode). When the mode deciding section 346 decides the input mode as A, the designated position calculating section 347 decides the designated position in such a way that the depression force and the depression position correspond to the movement speed of the designated position. When the mode deciding section 346 decides the input mode as B, the designated position calculating section 347 decides the designated position in such a way that the depression position corresponds to the position of the designated position. When the mode deciding section 346 decides the input mode as C, the designated position calculating section 347 decides the designated position in such a way that the depression force and the depression position correspond to the acceleration of the designated position.

Figure 37:
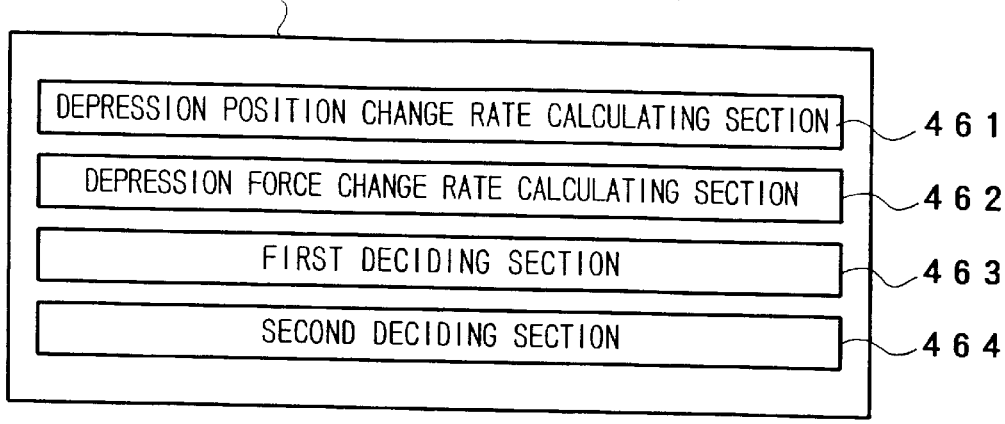
FIG. 37 is a detailed block diagram showing the mode control section 346 shown in FIG. 36.

Further, the operation of the mode deciding section 346 will be explained in further detail. As shown in FIG. 37, the mode control section 346 is composed of a depression position change rate calculating section 461 for calculating the change rate of the depression position, a depression force change rate calculating section 462 for calculating the change rate of the depression force, a first deciding section 463 for deciding whether the depression position change rate is smaller or larger than a predetermined value, and a second deciding section 464 for deciding whether the depression force change rate is smaller or larger than a predetermined value.

Figure 36:
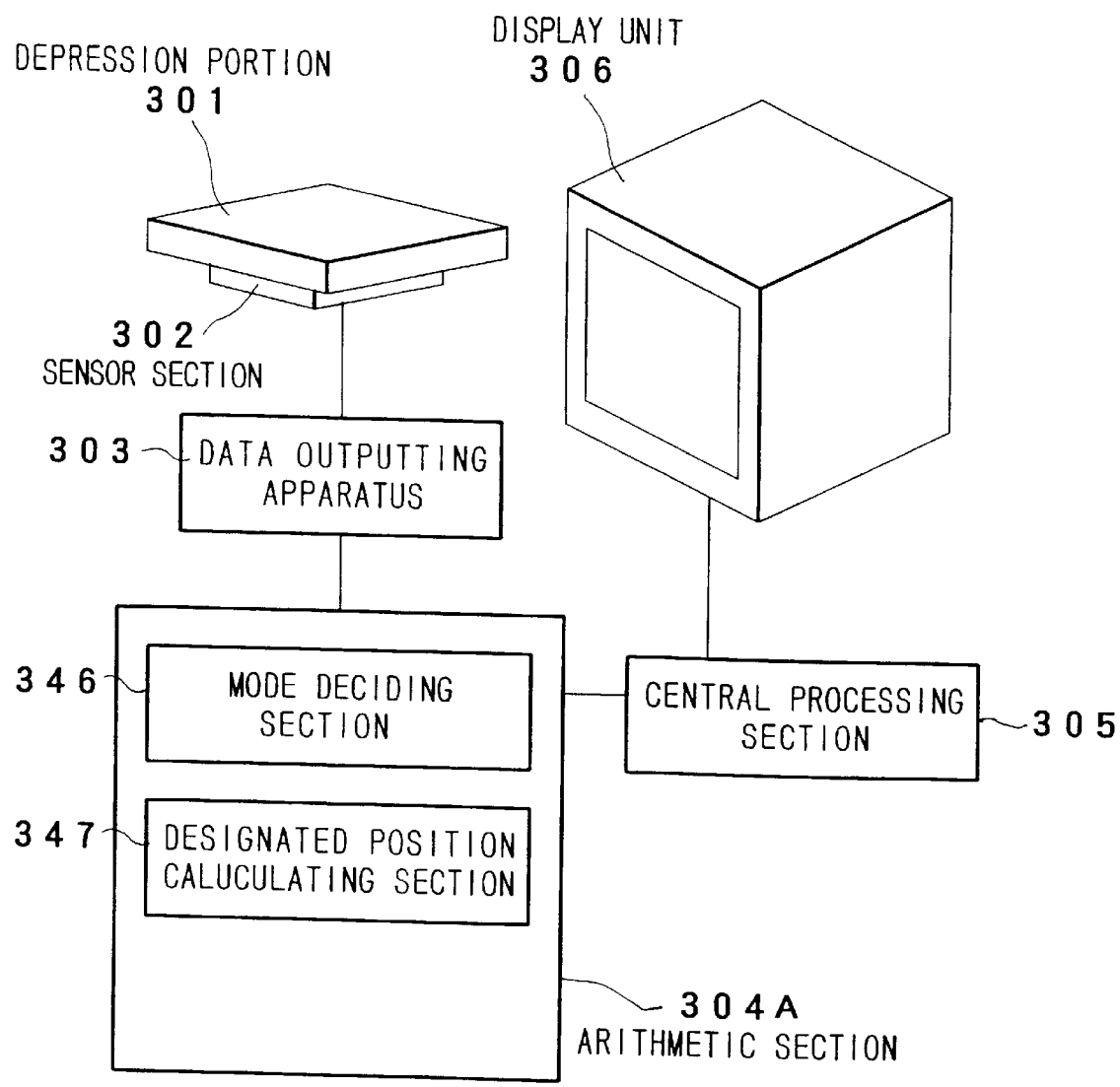
FIG. 36 is another example of the signal inputting apparatus according to the present invention.
Figure 38:
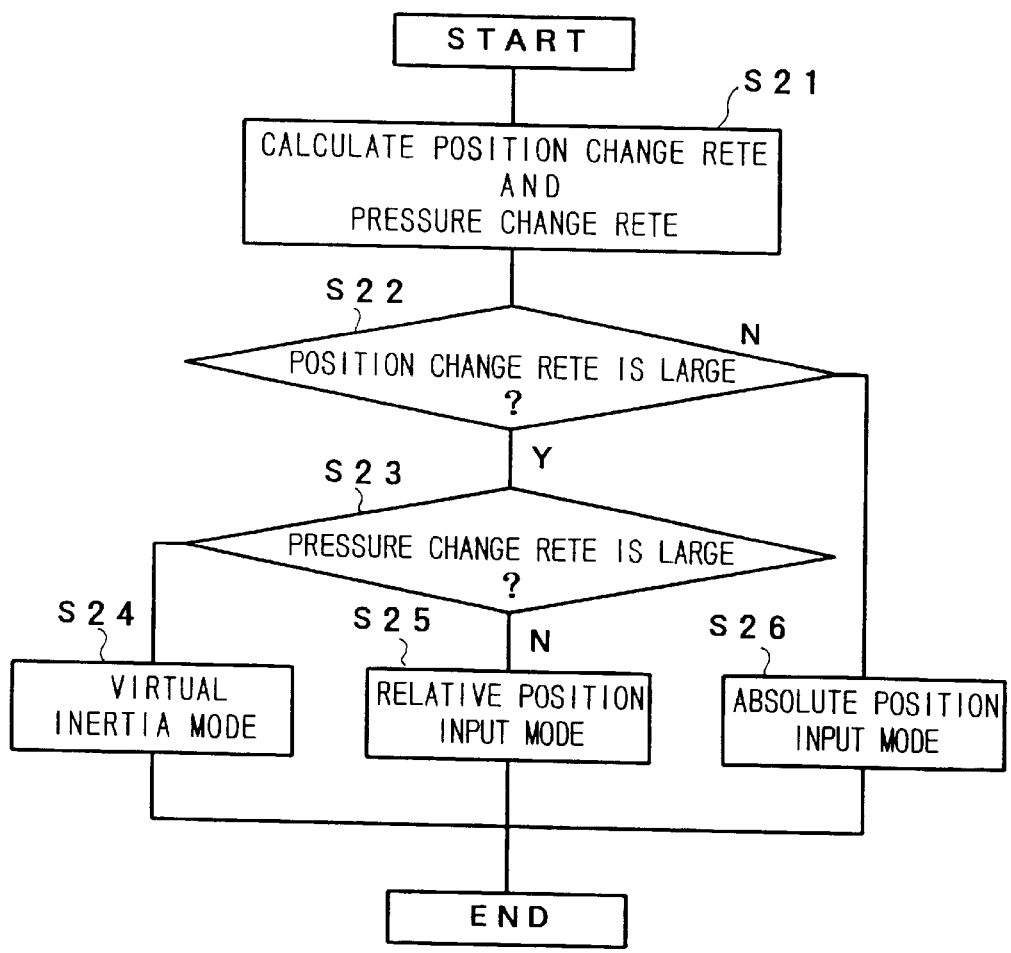
FIG. 38 is a flowchart for assistance in explaining the mode deciding procedure of the mode control section shown in FIG. 37.

FIG. 38 shows a flowchart for assistance in explaining the mode decision of the signal inputting apparatus shown in FIG. 36.

In step S21, the depression position change rate and the depression force change rate are obtained on the basis of the signals of the data outputting apparatus 303. In steps S22 and S23, these values are discriminated whether smaller or larger than a predetermined value, respectively. Further, in steps S24, S25 and S26, the mode is classified into three modes of the virtual inertia mode, the relative position input mode, and the absolute position input mode, respectively.

By the signal inputting apparatus as described above, it is possible to execute the decision of the three different modes and the calculations of the designated position.

Figure 39:
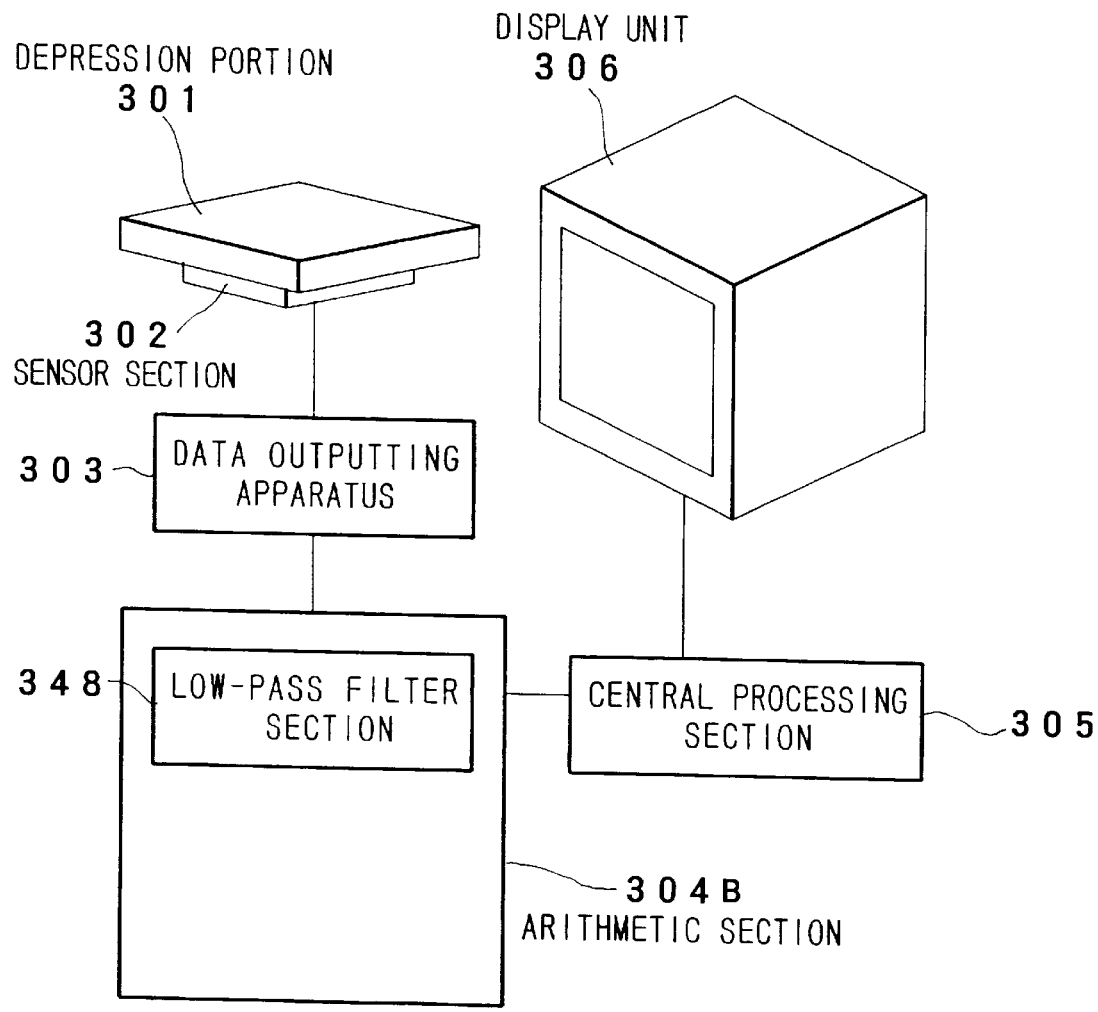
FIG. 39 is another example of the signal inputting apparatus according to the present invention.

Still another embodiment of the signal inputting apparatus according to the present invention will be described hereinbelow with reference to FIG. 39, in which the same reference numerals have been retained for similar elements or sections having the same functions as with the case of the apparatus shown in FIG. 34. Here, since the feature of this embodiment resides in the operation of the arithmetic section 304B, only the arithmetic section 304B will be described in detail hereinbelow.

The arithmetic section 304B includes a low-pass filter 348 for passing only the low frequency components of the data indicative of at least one of the position and the magnitude of the compression force.

By the construction as described above, it is possible to prevent an erroneous mode decision or an erroneous operation of the apparatus, caused by electric noise or by fluctuations in signal level at the natural vibration frequency of a spring-mass system constructed by the compression section and the sensors. In particular, in order to eliminate the fluctuations in signal level at the natural vibration frequency of a spring-mass system constructed by the compression section and the sensors, it is necessary to design the characteristics of the low frequency passing filter 348 in such a way that the natural vibration frequency of the spring-mass system constructed by the compression section and the sensors can be sufficiently suppressed or removed, while passing the frequency of the inputted signals sufficiently.

As the example of the low-pass filter 348, it is possible to consider such a digital filter that a predetermined number of sampled signals are added to each other and the sum total value thereof is divided by the same predetermined number.

Figure 40:
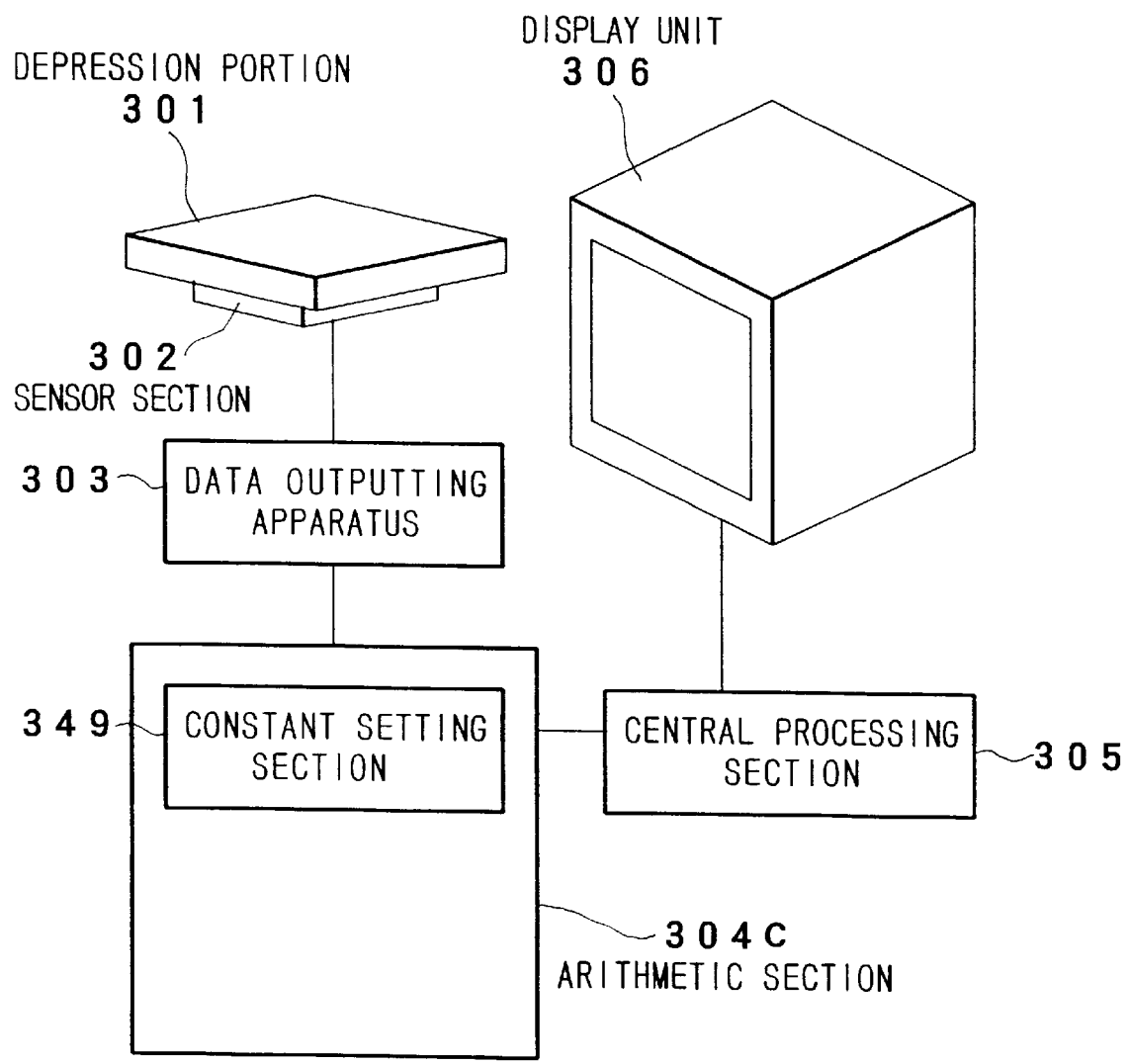
FIG. 40 is another example of the signal inputting apparatus according to the present invention.

Still the other embodiment of the signal inputting apparatus according to the present invention will be described hereinbelow with reference to FIG. 40, in which the same reference numerals have been retained for similar elements or sections having the same functions as with the case of the apparatus shown in FIG. 34. Here, since the feature of this embodiment resides in the operation of the arithmetic section 304C, only the arithmetic section 304C will be described in detail hereinbelow.

The arithmetic section 304C includes a constant setting section 349 for setting various constants used for calculations. The constant values to be set can be selected from the optimum values on the basis of the depression force characteristics obtained when the operator depresses the depression section 301 by his finger.

Figure 41:
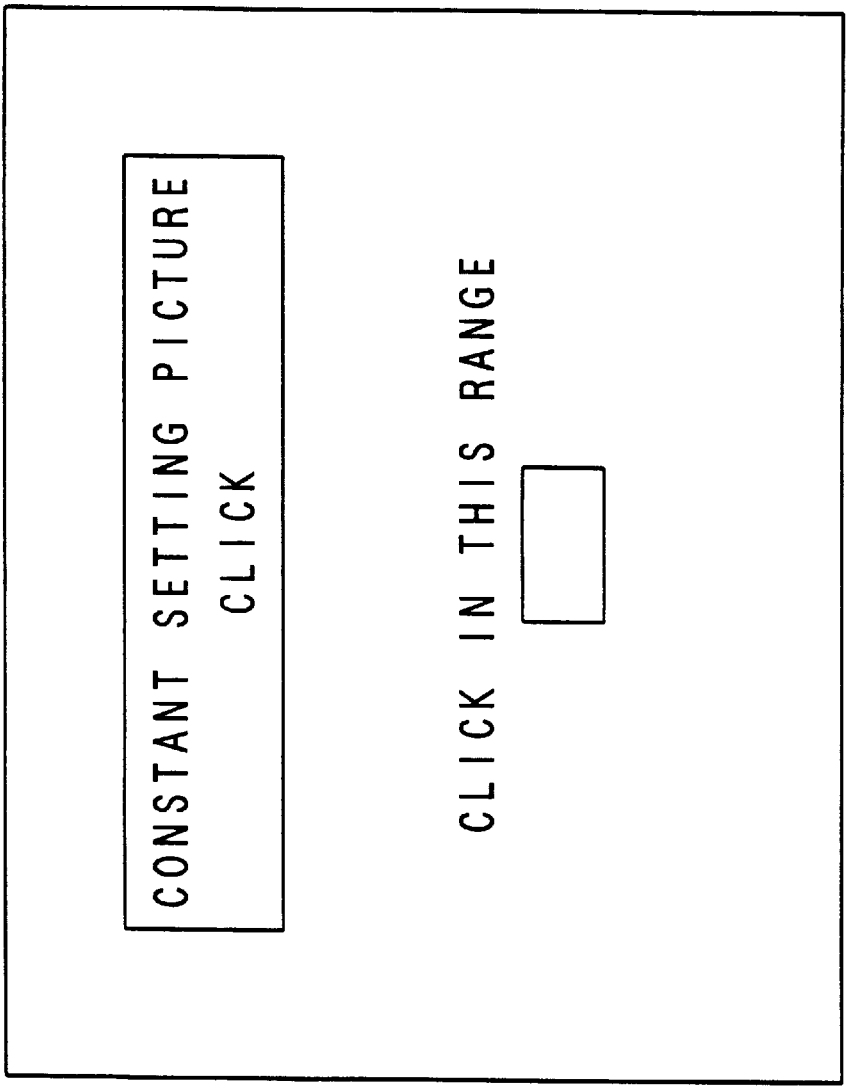
FIG. 41 is an illustration showing an example of the displayed picture of the constant setting section shown in FIG. 40.

The constant setting section 349 displays a picture as shown in FIG. 41, in which a trial operation to be performed next is displayed largely. Therefore, the operator can confirm the succeeding operation to be next performed. After that, the operator performs a predetermined trial operation. For instance, in the case of a single click operation, the operator clicks within the designated range as shown in FIG. 41. In this case, the constant setting section 349 detects the depression pattern of the trial operation. For instance, the continuous depression time in the single click operation is measured, and the measured time is used as a threshold value for deciding the single click. In other words, in the single click operation after the threshold value has been set, the single click operation is decided, only when depressed continuously below the detected continuous time.

As described above, since the set value can be decided on the basis of the actual operation data, it is possible to set a constant value according to the operator individual characteristics.

Further, without use of only one trial operation, it is also preferable to improve the reliability of the set constant value by performing the trial operation plural times. For instance, when the trial click operation is performed plural times, the maximum value of the continuous depression times is determined as the threshold value for deciding the single click. Or else, in the case of a double click, a maximum non-input time between the two depressions is set. That is, when the operator performs the trial double click operation plural times, a plurality of the maximum non-input times between the two double click operations are measured. Further, a time value longer than the maximum value of a plurality of these measured data is set as the maximum non-input time between the two depressions in order to decide the double click operation. As described above, since the set value can be decided on the basis of the actual operation data, it is possible to set a constant according to the operator individual characteristics.

Further, the constant setting section 349 executes a confirmation trial by using the set candidate value obtained by the above-mentioned trial operation as a constant, to allow the operator to confirm whether the set candidate value can be set as a final constant or not.

As a result, when the operator confirms that the set constant is not appropriate, the procedure is returned again to the setting picture. Therefore, the operator can obtain a better set value by repeating the above-mentioned trial operation. Or else, it is also possible to set a better constant by allowing the operator to increase or decrease the current set value appropriately.

As described above, since the arithmetic section 340 can be provided with various functions, it is possible to provide the signal inputting apparatus easy to use for the operator.

Figure 42:
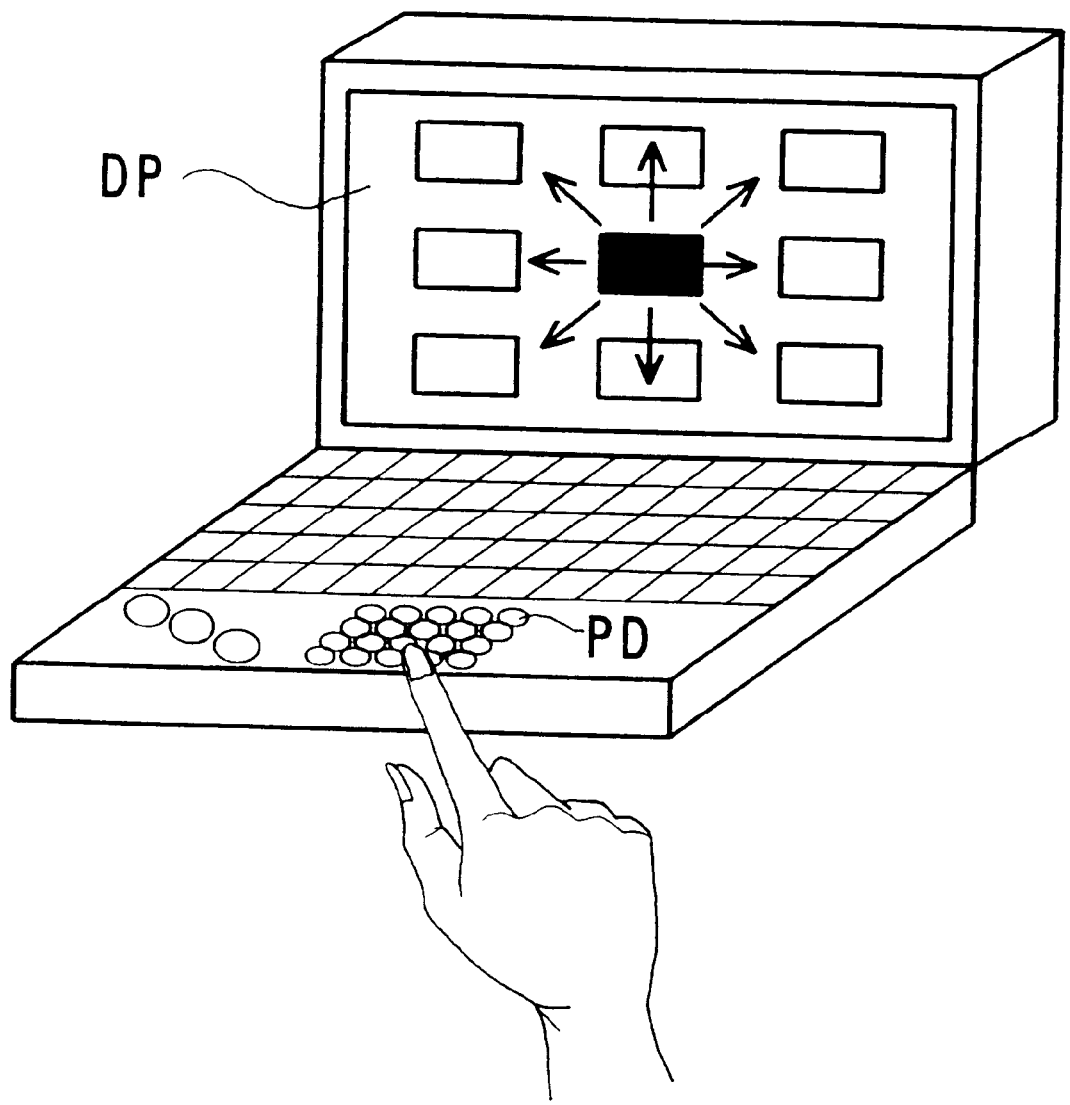
FIG. 42 is a perspective view showing a personal computer to which the apparatus according to the present invention is applied.

Here, an application example in which the signal inputting apparatus according to the present invention is applied to a personal computer PC as a pointing device PD will be explained with reference to FIG. 42.

This pointing device PD is so constructed as to input three modes of the absolute position input (1); the relative position input (2); and the virtual inertia input (3). In the case of the absolute position input (1), an operator's finger position is displayed on a displayed picture DP; in the case of the relative position input (2), the locus obtained when an operator rubs the pointing device PD with his finger is displayed on the displayed picture DP; and in the case of the virtual inertia input (3), when an operator rubs the pointing device PD with his finger, a cursor on the displayed picture DP is kept moving according to the magnitude and the direction of the depression force, even after the finger is released from the pointing device PD.

In the case of the virtual inertial input (3), prior to the finger rubbing, a virtual inertia (as a mass of the cursor) and a virtual friction (as the friction on the picture) are both previously determined. In this case, the cursor acceleration can be defined as constant×(depression force−virtual friction) /virtual inertia Further, the cursor movement distance can be defined as constant×(cursor acceleration×depression time)×depression time.

Figure 43:
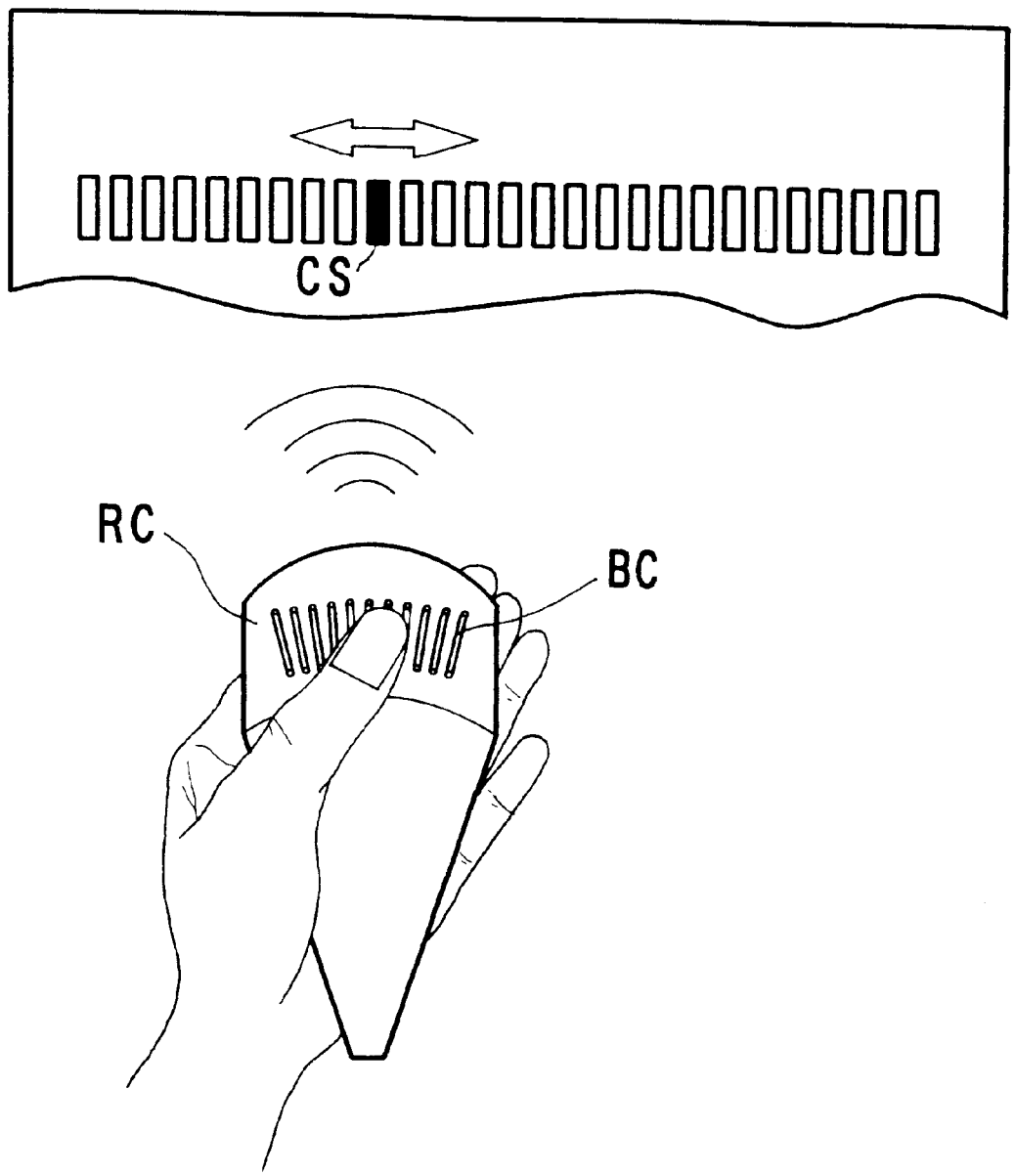
FIG. 43 is an illustration showing a remote controller and a personal computer to which the apparatus according to the present invention is applied.

Further, according to the present invention, it is possible to provide a browsing controller function for the remote controller. In more detail, as shown in FIG. 43, when the operator rubs the browsing controller BC of the remote controller (RC) type with his finger, in the same way as with the case of the personal computer, since a virtual inertia can be inputted, even after the finger is released from the controller RC, the cursor (inversion display) CS can run of itself by its inertia in the horizontal direction on the displayed picture. Further, after the cursor has been brought to a target position, the cursor can be decided thereat.

As described above, in the apparatus according to the present invention, it is possible to assign a relatively large number of commands to a predetermined number of buttons and further to allow the operator to operate the apparatus to be controlled on the basis of the operator's sense.

Further, in the signal inputting device according to the present invention, since a picture now being displayed and other pictures to be switched are arranged in three-dimensional pictorial space and further since the three-dimensional space is divided into a domain group in such a way that a representative position can be set for each domain, whenever the picture is switched, it is possible to directly select each picture and further to point out a specific position. In addition, when a mechanism for increasing the operation force applied to the pad-type input section is provided, it is possible to obtain a signal inputting apparatus which can further improve the operation precision.

Further, in the pad-type force-electricity converting apparatus according to the present invention, since a plurality of pairs of pressure sensitive sensors are arranged, it is possible to detect the coordinate position of the pressure point at a high precision.

Further, in the signal inputting apparatus according to the present invention, since the values corresponding to the magnitude and the position of the depression force applied to the depression portion are accumulatively added for each time, it is possible to display the designated position as if an object had a virtual inertia and as if the object would be moved being decelerated by a virtual friction force.

Further, in the signal inputting apparatus according to the present invention, since the input mode is divided into plural modes according to the mode of a force applied to the depression portion, that is, according to the magnitude of the depression force itself, the change rate of the depression force, and the change rates of the depression position, and further since the designated position can be decided according to the divided mode, it is possible to decide the designated position more appropriately.

Further, in the signal inputting apparatus according to the present invention, since only the low-frequency signal components can be passed, it is possible to prevent the signals from being fluctuated due to the natural vibration frequency of the spring-mass system of the force-electricity converting apparatus, so that the designated position can be obtained more accurately.

Further, in the signal inputting apparatus according to the present invention, since the set values can be decided on the basis of a single or plural actual trial operations, it is possible to set an appropriate constant according to each operator, so that the designated position can be obtained more accurately.

Further, in the signal inputting apparatus according to the present invention, since the force-electricity converting apparatus can be used as a pointing device for a personal computer in such a way that the cursor can be moved on the picture according to a virtual inertia on the basis of the depression force applied thereto, it is possible to obtain a pointing device actually usable conveniently for each operator.

What is claimed is:

1. A signal inputting apparatus, comprising:
input detecting means comprising transducing elements functioning as strain gauge, a number of the elements being smaller than that of X-Y coordinate points, for detecting two dimensional coordinates of a pressure point of an inputted depression force on the basis of a direction of a force applied to the input detecting means and a bending angle of the input detecting means, and pressure coordinates on the basis of the inputted compression force; and
coordinate detecting means for detecting a positional domain within a three-dimensional domain on the basis of the detected two dimensional coordinates and the detected pressure coordinates, and for assigning a representative point to each detected positional domain.

2. The signal inputting apparatus of claim 1, wherein said coordinate detecting means includes domain registering means for registering three-dimensional domains composed of a plurality of pictures corresponding to the pressure coordinates and partitioned pictures corresponding to the two-dimensional coordinates, and representative points each corresponding thereto.

3. The signal inputting apparatus of claim 2, wherein said input detecting means includes registering means for registering conversion coefficients used to convert the depression force to the two-dimensional coordinates and the pressure coordinates, respectively.

4. The signal inputting apparatus of claim 3, wherein said input detecting means and said coordinate detecting means both include data varying with the lapse of time as parameters, respectively.

5. The signal inputting apparatus of claim 1, wherein in said input detecting means, a group composed of a plurality of pressure detecting elements are arranged at each of a plurality of positions; the pressure coordinates are detected on the basis of angular data at the detection positions obtained by the pressure detecting elements; and a depression force is detected on the basis of all the outputs of said pressure detecting elements.

6. A signal inputting apparatus having a pressure receive portion for receiving an inputted depression pressure, a force-electricity converting section for converting pressure data sensed by the pressure receive portion into an electric signal, and a display unit for displaying a picture corresponding to the electric signal converted by the force-electricity converting section, which comprises:

encoding means provided between the force-electricity converting section and the display unit, for designating two-dimensional codes related to a display position on a picture displayed on the display unit and any operation codes other than the two-dimensional codes at the same time, on the basis of the pressure data converted into the electric signal; and means for allowing a plurality of codes generated by said encoding means to correspond to spatial picture domains, respectively, the spatial picture domains being composed of present picture domains obtained by dividing a picture now being displayed on the display unit and hidden picture domains obtained by dividing each picture now not yet displayed on the display unit but displayed by an input operation.

7. The signal inputting apparatus of claim 6, which further comprises depression data storing means for storing time-series change of the inputted depression force, said encoding means forming a time-series depression pattern on the basis of contents stored in said depression data storing means.

8. The signal inputting apparatus of claim 7, which further comprises a registering and reproducing section for registering and reproducing the contents of the encoding means, or a section for connecting said encoding means to a registering and reproducing apparatus.

9. The signal inputting apparatus of claim 6, wherein at least two sets of the force-electricity converting sections are mounted on the pressure receive portion in such a way that the pressure receive portion is supported by each set of the force-electricity converting sections in cantilever fashion, two axial lines of the two sets of the force-electricity converting sections substantially intersecting each other in a cantilever area on a plane including the pressure receive portion.

10. A signal inputting apparatus, comprising:

a depressed portion having an area to which a force is applied as an input;

a force-electric signal detecting section for detecting a force applied to said depressed portion and converting the detected force into an electric signal;

a data outputting section for outputting data indicative of at least a magnitude and a position of the force applied to said depressed portion on the basis of the electric signal outputted by said force-electricity signal detecting section; and an arithmetic section for deciding characteristics of the inputted force on the basis of the data outputted by said data outputting section, and for executing various calculations to set switching operations and to display the decided result and a designated position on a picture on the basis of the decided characteristic result, said arithmetic section comprising:

a repetitive arithmetic control section for controlling predetermined calculating processing repeatedly for each elapse of predetermined time;

a cumulative calculating section for calculating an cumulative addition of the magnitudes and the positions of the inputted depression forces, respectively and outputting the calculated results;

a subtraction calculating section for subtracting a value from the calculated result of said cumulative calculating section and outputting the calculated result;

a dividing section for dividing the output of the subtracting calculating section by a predetermined value and outputting the divided result; and an addition section for adding the output of said dividing section to a present designated position, and outputting the added result as an updated designated position, said cumulative calculating section, said subtracting calculating section, said dividing section and said adding section being all controlled with respect to time by said repetitive arithmetic control section.

11. The signal inputting apparatus of claim 10, wherein in all said cumulative calculating section, said subtracting calculating section, said dividing section and said adding section, data are calculated being divided into x-axis direction components and y-axis direction components, respectively.

12. A signal inputting apparatus, comprising:

a depressed portion having an area to which a force is applied as an input;

a force-electric signal detecting section for detecting a force applied to said depressed portion and transducing the detected force into an electric signal;

a data outputting section for outputting data indicative of at least a magnitude and a position of the force applied to said depressed portion on the basis of the electric signal outputted by said force-electricity signal detecting section; and an arithmetic section for deciding characteristics of the inputted force on the basis of the data outputted by said data outputting section, and for executing various calculations to set switching operations and to display the decided result and a designated position on a picture on the basis of the decided characteristic result, said arithmetic section comprising:

a mode deciding section for deciding an input mode as a mode A when change in the force applied position is large, the magnitude of the compression force is small; and change in magnitude of the compression force is small; as a mode B when change in the compression position is small, the magnitude of the compression force is large; and change in magnitude of the compression force is small; and as a mode C when change in the compression position is large, the magnitude of the compression force is large or small; and change in magnitude of the compression force is large; and a designated position calculating section for deciding a designated position in such a way that the compression force and the compression position correspond to a moving speed of the designated portion when said mode deciding section decides the input mode as the mode A; a designated position in such a way that the compression position correspond to a position of the designated portion when said mode deciding section decides the input mode as the mode B; and for deciding a designated position in such a way that the compression force and the compression position correspond to an acceleration of the designated portion when said mode deciding section decides the input mode as the mode C.

13. The signal inputting apparatus of claim 12, wherein said mode deciding section comprises:

a compression position change rate calculating section for calculating a change rate of the compression position;

a compression force change rate calculating section for calculating a change rate of the compression force;

a first deciding section for deciding whether the calculated compression position change rate is smaller or larger than a predetermined value; and a second deciding section for deciding whether the calculated compression force change rate is smaller or larger than a predetermined value.

14. A signal inputting apparatus of a remote controller for a personal computer such that a cursor on a picture displayed on a separated display unit can be shifted by applying a tracing force onto a pointing device, wherein the cursor can be shifted on the picture by a distance at an acceleration determined on the basis of a compression force applied onto the pointing device, a shift direction of the compression force on the pointing device, a compression time, a virtual inertia of a previously set cursor mass, and a virtual friction generated by the cursor movement on the previously set picture, wherein the acceleration can be determined by an expression as:

(compression force−virtual friction)/ virtual inertia.

15. A signal inputting apparatus of a remote controller for a personal computer such that a cursor on a picture displayed on a separated display unit can be shifted by applying a tracing force onto a pointing device, wherein the cursor can be shifted on the picture by a distance at an acceleration determined on the basis of a compression force applied onto the pointing device, a shift direction of the compression force on the pointing device, a compression time, a virtual inertia of a previously set cursor mass, and a virtual friction generated by the cursor movement on the previously set picture, wherein the distance can be determined by an expression as:

cursor acceleration×compression time×compression time.

16. A signal transducing apparatus, having a pressure receive portion for receiving pressure, and a force-electricity transducing section connected to the pressure receive portion to convert pressure received by the pressure receive portion into an electric signal corresponding thereto:

said force-electricity transducing section is provided with at least four unit transducing elements functioning as a strain gauge all fixed to a member rigid enough against pressure received by the pressure receive portion;

wherein the pressure receive portion is mounted on the force-electricity transducing section and has an overhanging structure.

17. The signal transducing apparatus of claim 16, wherein the pressure receive portion has a lengthy shape and the both ends thereof are overhang portions.

18. The signal transducing apparatus of claim 17, wherein the unit elements of the force-electricity transducing section are arranged in a matrix form.

19. The signal transducing apparatus of claim 17, wherein the pressure receive portion is formed with a plurality of projections.

20. A signal transducing apparatus, comprising:

a pressure receive portion for receiving pressure;

a force-electricity transducing section composed of at least four unit elements and connected to said pressure receive portion, for transducing pressure received by said pressure receive portion into electric signals corresponding thereto;

a base fixed to said force-electricity transducing section and so formed as to be rigid enough against pressure applied to a plurality of said unit elements via said pressure receive portion; and a calculating section for allowing pressure data received by said pressure receive portion to correspond to a specific operation command on the basis of output signals of said force-electricity transducing section, wherein said calculating section processes the electric signals converted by the unit elements of said force-electricity transducing section by adding vectors of the electric signals according to the following steps S1–S3:

S1:

X-AXIS IMPULSE=PRECEDING X-AXIS IMPULSE+X-AXIS PRESSURE×COEFFICIENT

Y-AXIS IMPULSE=PRECEDING Y-AXIS IMPULSE+Y-AXIS PRESSURE×COEFFICIENT

S2:

X-AXIS IMPULSE=PRECEDING X-AXIS IMPULSE−X-AXIS FRICTION FORCE Y-AXIS IMPULSE=PRECEDING Y-AXIS IMPULSE−Y-AXIS FRICTION FORCE

S3:

X-AXIS COORDINATES OF PICTURE=X-AXIS COORDINATES ON PRECEDING PICTURE+X-AXIS IMPULSE/ X-AXIS VIRTUAL INERTIA×COEFFICIENT

Y-AXIS COORDINATES OF PICTURE=Y-AXIS COORDINATES ON PRECEDING PICTURE+Y-AXIS IMPULSE/ Y-AXIS VIRTUAL INERTIA×COEFFICIENT.

* * * * *